United States Patent [19]
Ying et al.

[11] Patent Number: 5,958,367
[45] Date of Patent: Sep. 28, 1999

[54] METHODS FOR PREPARING POROUS METAL OXIDES

[75] Inventors: Jackie Y. Ying, Winchester; David M. Antonelli; Tao Sun, both of Cambridge, all of Mass.

[73] Assignee: Massachusetts Institute of Technology, Cambridge, Mass.

[21] Appl. No.: 08/729,059

[22] Filed: Oct. 10, 1996

Related U.S. Application Data

[63] Continuation-in-part of application No. 08/415,695, Apr. 3, 1995, abandoned.

[51] Int. Cl.⁶ .................................................. C01B 37/00
[52] U.S. Cl. .................... 423/701; 423/702; 423/703; 423/704; 423/705; 423/706; 423/707; 423/708; 423/713
[58] Field of Search .................................... 423/701–708, 423/713

[56] References Cited

U.S. PATENT DOCUMENTS

| | | | |
|---|---|---|---|
| 5,098,684 | 3/1992 | Kresge et al. | 423/277 |
| 5,102,643 | 4/1992 | Kresge et al. | 423/328 |
| 5,211,934 | 5/1993 | Kresge et al. | 423/706 |
| 5,250,282 | 10/1993 | Kresge et al. | 423/705 |
| 5,264,203 | 11/1993 | Beck et al. | 423/703 |
| 5,300,277 | 4/1994 | Kresge et al. | 423/703 |
| 5,304,363 | 4/1994 | Beck et al. | 423/328.1 |
| 5,308,602 | 5/1994 | Calabro et al. | 423/705 |
| 5,362,695 | 11/1994 | Beck et al. | 423/706 |

FOREIGN PATENT DOCUMENTS

| | | |
|---|---|---|
| WO96/14269 | 5/1996 | WIPO . |
| WO 96/29284 | 9/1996 | WIPO . |
| WO 96/29285 | 9/1996 | WIPO . |
| WO 96/29286 | 9/1996 | WIPO . |
| WO96/31434 | 10/1996 | WIPO . |
| WO96/39357 | 12/1996 | WIPO . |

OTHER PUBLICATIONS

A. Stein et al., "Salt–Gel Synthesis of Porous Transition Metal Oxides," Chem. Mater., 7(2) pp. 304–313 (1995). No Month!

D. M. Antonelli and J. Y. Ying, "Synthesis of Hexagonally Packed Mesoporous $TiO_2$ by a Modified Sel–Gel Method," Angew. Chem. Int. Ed. Engl. 34(18):2014–2017 (1995) no month. provided.

D. M. Antonelli and J. Y.Ying. "Synthesis and Characterization of Hexagonally Packed Mesoporous Tantalum Oxide Molecular Sieves," Chem. Mater. 8:874–881 (1996) no month provided.

D. M. Antonelli and J. Y. Ying, "Synthesis of Stable Hexagonally Packed Mesoporous Niobium Oxide Molecular Sieve Through a Novel Ligand–Assisted Templating Mechanism," Angew. Chem. Int. Ed. Engl. 35(4):426–430 (1996) no month provided.

V. Luca, et al. "Synthesis and Characterization of Mesostructured Vanadium Oxide," Chem. Mater. 7:2220–2223 (1995) no month provided.

(List continued on next page.)

Primary Examiner—Mark L. Bell
Assistant Examiner—Louis M. Troilo
Attorney, Agent, or Firm—Hamilton, Brook, Smith & Reynolds, P.C.

[57] ABSTRACT

The present invention relates to a composition and a method for producing hexagonally-packed mesoporous metal oxides wherein the metal oxide is selected from transition metals and lanthanide metals. The composition includes hexagonally packed metal oxide mesostructures that are resistant to pore collapse upon removal of surfactant and are thermally stable. The composition can include a surfactant complexed with the metal. Also described are methods for producing the hexagonally-packed mesoporous metal oxides. The present invention also relates to compositions and methods for producing porous metal oxides. The compositions include microporous and mesoporous metal oxides that are resistant to pore collapse upon removal of surfactant and are thermally stable. Also described are methods for producing microporous metal oxides.

56 Claims, 30 Drawing Sheets

OTHER PUBLICATIONS

Q. Huo et al. "Generalized Synthesis of Periodic Surfactant/Inorganic Composite Materials," Nature, 368:317–321 (Mar. 1994).

Q. Huo, et al., "Organization of Organic Molecules with Inorganic Molecular Species in Nanocomposite Biphase Arrays," Chem. Mater. 6:1176–1191 (1994) no month provided.

T. Abe, et al. "Non–Silica–Based Mesostructured Material. 1. Synthesis of Vanadium Oxide–Based Materials," Chem. Mater. 7:1429–1430 (1995) no month provided.

N. K. Raman, et al., "Template–Based Approaches to the Preparation of Amorphous, Nanoporous Silicas," Chem. Mater. 8:1682–1701 (1996) no month provided.

6115 — High–Tech Materials Alert, 10(11):2, (Nov. 1993), Englewood, NJ, US.

Monnier, A., et al., "Cooperative Formation of Inorganic–Organic Interfaces in the Synthesis of Silicate Mesostructures," Science, 261:1299–1303 (Sept. 3, 1990).

Chen, C., et al., "Studies on Mesoporous Materials . I. Synthesis and Characterization of MCM–41," Microporous Materials, 2:17–26 (1993).

Beck, J. S., et al., "Molecular or Supramolecular Templating: Defining the Role of Surfactant Chemistry in the Formation of Microporous and Mesoporous Molecular Sieves," Chem. Mater., 6:1816–1821 (1994).

Beck, J. S., et al., "A New Family of Mesoporous Molecular Sieves Prepared with Liquid Crystal Templates," J. Am. Chem. Soc., 114 (27):10834–10842 (1992).

Tanev, P. T., et al., "Titanium–Containing Mesoporous Molecular Sieves for Catalytic Oxidation of Aromatic Compounds," Nature, 368:321–323 (1994).

Huo, Q., et al., "Generalized Synthesis of Periodic Surfactant/Inorganic Composite Materials," Nature, 368:317–321 (1994).

Tanev, P. T. and Pinnavaia, T. J., "A neutral Templating Route to Mesoporous Molecular Sieves," Science, 267:865–867 (Feb. 10, 1995).

Huo, Q., et al., "Organization of Organic Molecules with Inorganic Molecular Species into Nanocomposite Biphase Arrays," Chem. Mater., 6:1176–1191 (1994). No month available.

Kresge, C. T., et al., "Ordered Mesoporous Molecular Sieves Synthesized by a Liquid–Crystal Template Mechanism," Nature, 359:710–712 (Oct. 22, 1992).

Abe, T., et al., "Non–Silica–Based Mesostructed Materials. 1. Synthesis of Vanadium Oxide–Based Materials," Chem. Mater., 7:1429–1430 (1995). No month available.

METHODS FOR PREPARING POROUS METAL OXIDES

RELATED APPLICATIONS

This is a Continuation-in-Part of application Ser. No. 08/415,695, filed Apr. 3, 1995 now abandoned the teachings of which are incorporated herein in their entirety.

GOVERNMENT FUNDING

This invention was made with government support under Grant Number 9257223-CTS awarded by the National Science Foundation. The Government has certain rights in the invention.

BACKGROUND OF THE INVENTION

Porous inorganic solids have found great utility as catalysts and separation media for industrial applications. The openness of the microstructure allows molecules access to the surface area of the materials that enhance their catalytic and sorption activity. The porous materials in use today can be sorted into several categories based on their microstructure, molecular sieves being one of these.

Molecular sieves are structurally defined materials with a pore size distribution that is typically very narrow because of the crystalline nature of the material's microstructure. Examples of molecular sieves are zeolites and mesoporous materials. Zeolites are generally aluminosilicate materials with pore sizes in the microporous range which is between two to twenty Angstroms.

Zeolites have been demonstrated to exhibit catalytic properties. Zeolites are porous crystalline aluminosilicates which have a definite crystalline structure within which a large number of smaller cavities may be interconnected by a number of still smaller channels or pores. Relatively little advance has been achieved in fine chemical synthesis with zeolite-based catalysis due, at least in part, to the limitations of redox activity in currently available molecular sieves (B. Notari, Stud. Surf. Sci. Catal. 37 (1988) 413; P. Roftia, Stud. Surf. Sci. Catal. 55 (1990) 43; N. Herron, et al. J. Am. Chem. Soc. 109 (1987) 2837; R. F. Parton, et al. Nature 370 (1994) 541; P. T. Tanev, et al. Nature 368 (1994) 321; M. Iwamoto et al. Chem. Lett. (1989) 213; Y. Li et al. J. Phys. Chem. 94 (1990) 9971; and Y. Li et al. Appl. Catal. B. 1 (1992) L31). In most redox reactions, a catalyst with variable oxidation states is required to assist in charge or electron transfer between reactant molecules. To use inert aluminosilicate-based zeolites as redox catalysts, metal cations need to be introduced into the zeolitic matrices. This can be achieved only in very limited concentration in the form of dopants without affecting the crystallinity of the zeolitic structure. More commonly, metal cations are introduced into the zeolitic cage structure by cation exchange or metal salt impregnation. The metal cations introduced into zeolites have been found capable of catalyzing some redox reactions. The turnover frequency (TOF) of the catalyst is, however, very restricted by the number of catalytically active sites that can be introduced, which is in turn limited by the Si/Al ratio in the zeolite framework structure. Furthermore, the catalytic activity of the zeolite materials can be severely reduced due to aggregation of metal cations caused by hydration of the metal cations and/or dealumination of the zeolite framework in the presence of water vapor at temperatures of 500–800° C.

Mesoporous materials, however, generally have larger pore sizes. Mesoporous materials have a pore size from about 10 to 500 Angstroms. Examples of conventional mesoporous solids include silicas and modified layered materials, but these are amorphous or 2-dimensional crystalline structures, with pores that are irregularly spaced and broadly distributed in size. Pore size has been controlled by intercalation of layered clays with a surfactant species, but the final products have typically retained the layered nature of the precursor material.

Porous transition metal oxides have been the subject of increasing interest as materials which can be utilized in partial oxidation, complete combustion, $NO_x$ decomposition, hydrodesulfurization, photocatalytic decomposition of organic compounds and solid acid catalysis. Most attempts, however, to prepare mesoporous materials suitable for such purposes have typically led to lamellar phases where surfactant and metal oxide phases are layered.

Efforts to synthesize hexagonally-packed mesoporous oxides have focused on an inverse-micelle template mechanism. Inorganic precursors, pH and surfactant head groups have been adjusted to achieve optimal electrostatic charge balance between the organic and inorganic phases during the self assembly process. This led to the synthesis of silica-based mesoporous materials as disclosed in U.S. Pat. No. 5,098,684. Efforts to extend this approach to non-silica or alumina-based systems have mostly led to formation of layered phases. The few hexagonally-packed mesostructures derived by such approaches, composed of tungsten, antimony, lead and iron oxides, were not found to be thermally stable upon surfactant removal or thermal treatment (Huo et al. Chem. Mater. 6:1176 (1994)). High surface areas and well-defined porosities for transition metal products could not be achieved in these systems upon surfactant removal in contrast to alumina- and silicate-based systems mentioned above.

One reported example of a transition metal-containing hexagonally packed mesoporous material has only a small percentage of titanium dioxide incorporated into a silica structure. (Tanev et al. Nature 368:321 (1994)). The method used to form the hexagonal mesoporous materials utilized a primary, rather than a quaternary ammonium ion surfactant as the templating reagent. The titanium-doped silicate-based hexagonal mesoporous materials were found to be more active in the catalytic oxidation of arenes than the conventional microporous titanium silicate zeolites.

Therefore, a need exists for a thermally stable mesoporous transition metal material and a method for forming mesoporous transition metal materials which overcome or minimize the above mentioned problems. A need also exists for a crystalline microporous metal oxide having a dimensionally consistent pore structure and a method for forming crystalline microporous metal oxide materials which overcome or minimize the above mentioned problems.

SUMMARY OF THE INVENTION

The present invention relates to a composition and a method for producing stable hexagonally-packed metal oxide mesostructure (TMS1) wherein the metal oxide is selected from transition metal oxides and lanthanide metal oxides.

A method for producing a stable hexagonally-packed mesoporous metal oxide includes combining a transition metal oxide precursor or lanthanide metal oxide precursor and a surfactant, having an appropriate head group, under conditions which are suitable for causing the formation of a complex between the head group of the surfactant and the metal oxide precursor in the substantial absence of water.

Water is then added to the complex and the reaction mixture is maintained at conditions suitable for micelle formation and hydrolysis of the oxide precursor. The hydrolysed complex is aged for a period of time at a temperature suitable for causing the formation of hexagonally-packed mesostructures. The surfactant, or organic portion of the surfactant, is removed from the metal oxide mesostructure, resulting in the stable mesoporous material. The metal oxide is selected from transition metal oxides and lanthanide metal oxides.

In a second embodiment of the method of the present invention, a stable hexagonally-packed mesoporous metal oxide is prepared by combining a transition metal oxide precursor or lanthanide metal oxide precursor, a surfactant having an appropriate head group under conditions suitable for causing the formation of a complex between the head group of the surfactant and the metal oxide precursor, an aqueous solvent and a chelating agent (such as a 2,4-diketone) added in an amount to decrease, without arresting, the rate of hydrolysis. The complex is then maintained under conditions suitable for controlled micelle formation and hydrolysis of the metal oxide precursor. The hydrolysed complex is aged for a period of time at a temperature suitable for causing the formation of a hexagonally packed metal oxide mesostructure. The surfactant, or organic portion of the surfactant, is removed from the metal oxide mesostructure, resulting in the stable mesoporous material. The metal oxide is selected from transition metal oxides and lanthanide metal oxides.

The present invention also relates to molecular sieves comprising a crystalline microporous or mesoporous metal oxide having a dimensionally consistent pore structure. The metal of the metal oxide can be either silicon oxide, aluminum oxide, transition metal oxides, lanthanide metal oxides, or combinations thereof. These metal oxides can have either, for example, a hexagonal or a cubic arrangement. Further, the dimensionally consistent pore structure can be rod-shaped.

In another embodiment, the invention is related to method for synthesizing a crystalline porous metal oxide having a dimensionally consistent pore structure by combining a metal oxide precursor and a small organic moiety, having at least one head group, under conditions which are suitable for causing the formation of a complex between the head group of the small organic moiety and the metal oxide precursor. The complex is hydrolyzed and the reaction mixture is aged for a period of time and at a temperature suitable for causing the formation of the crystalline porous metal oxide having a dimensionally consistent pore structure. The small organic moiety can be removed from the crystalline porous metal oxide by washing or by calcination, resulting in the crystalline porous metal oxide having a dimensionally consistent pore structure.

In yet another embodiment, the invention is related to a method of synthesizing a crystalline mesoporous metal oxide having a dimensionally consistent pore structure by combining a metal oxide precursor with water for a sufficient period of time to form a gel. The gel is combined with a surfactant, having at least one head group, under conditions suitable for physical interaction between the head group of the surfactant and the gel. The combination of the gel and surfactant is aged for a period of time at a temperature suitable for causing the formation of the crystalline mesoporous metal oxide having a dimensionally consistent pore structure.

In still another embodiment, the present invention relates to the synthesis of a crystalline porous metal oxide having a dimensionally consistent pore structure by combining a metal oxide precursor with water for a sufficient period of time to form a gel. The gel is combined with a small organic moiety having at least one head group, under conditions suitable for physical interaction between the head group of the small organic moiety and the gel. The combination of the gel and the small organic moiety is aged for a period of time at a temperature suitable for causing the formation of the crystalline porous metal oxide having a dimensionally consistent pore structure.

In still another embodiment, the present invention relates to a method of synthesizing a crystalline porous metal oxide having a dimensionally consistent pore structure by combining a metal oxide precursor in a non-polar organic solvent with an alcoholic aqueous solution of a surfactant, having at least one head group with stirring to create an oil-in-water emulsion. The emulsion is aged for a period of time and at a temperature suitable for causing the formation of the crystalline porous metal oxide having a dimensionally consistent pore structure.

This invention has the advantage, for example, of enabling the formation of hexagonally-packed mesoporous metal oxides that are stable. In contrast to available materials, hexagonally packed transition metal oxide or lanthanide metal oxide mesostructures prepared by the present method are stable, i.e. they substantially retain the hexagonal mesostructure upon removal of the surfactant, thereby presenting a hexagonally packed mesoporous structure with well-defined pore diameter and morphology.

This invention also has the advantage, for example, of enabling the formation of crystalline porous metal oxides having a dimensionally consistent pore structure that are stable. In contrast to available materials, crystalline porous metal oxides which have a dimensionally consistent pore structure prepared by the present method are stable, i.e. they substantially retain a dimensionally consistent pore structure upon removal of the small organic moiety. Furthermore, the metal oxide precursors can include transition metal oxides or lanthanide metal oxides, thereby producing transition metal oxide or lanthanide metal oxide crystalline porous metal oxides having dimensionally consistent pore structures that are stable.

This invention also has the advantage of enabling the formation of a wide variety of stable crystalline porous metal oxides having a dimensionally consistent pore structure. In contrast to known materials, crystalline porous metal oxides prepared by the present method are stable, retaining a dimensionally consistent pore structure and morphology.

Figure 1:
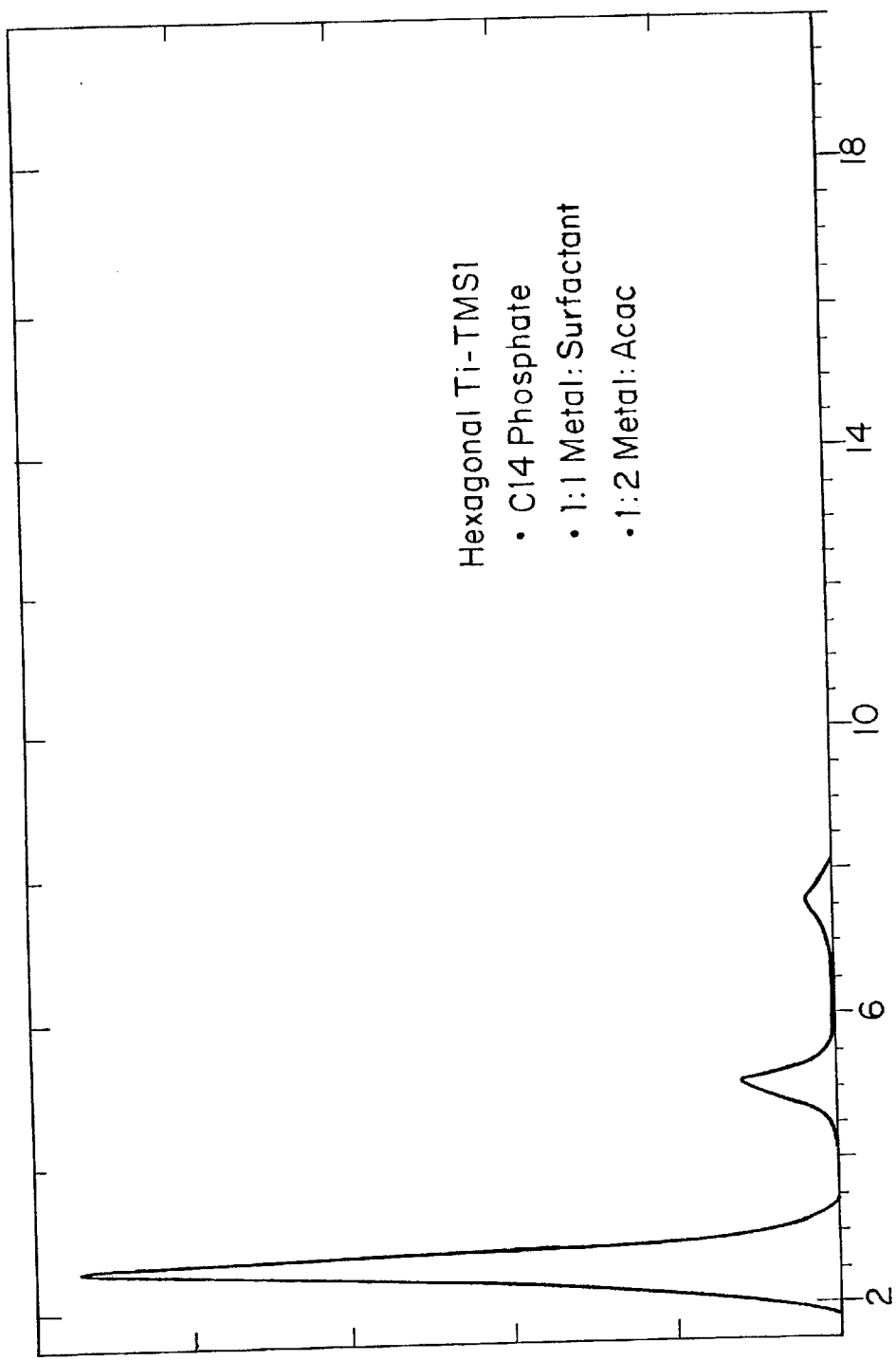
FIG. 1 is XRD (powder X-ray diffraction) data of Ti-TMS1 obtained using a phosphate surfactant with a chain length of 14 carbons atoms.

Example 25 shows XRD patterns of as-prepared Nb-TMS6 synthesized with (a) 1,7-diaminoheptane, (b) 1,8-diaminooctane, (c) 1,10-diaminodecane and (d) 1,12-diaminododecane as templating agents. The samples were prepared with a niobium ethoxide:diamine ratio of 1:0.5 and aged at 150° C. for 4 days (see synthesis of Example 15).

Example 26 shows XRD patterns of as prepared Nb-TMS5 synthesized with (a) N,N-dimethylhexylamine, (b) N-methylhexylamine and (c) hexylamine as templating agents. The samples were prepared with a niobium ethoxide:amine ratio of 1:0.75 and aged at 180° C. for 4 days (see synthesis of Example 12).

DETAILED DESCRIPTION OF THE INVENTION

The features and other details of the method of the invention will now be more particularly described with reference to the accompanying Figures and pointed out in the claims. It will be understood that particular embodiments of the invention are shown by way of illustration and not as limitations of the invention. The principle features of this invention can be employed in various embodiments without departing from the scope of the invention.

It is reported herein that hexagonally packed transition metal oxide molecular sieves can be synthesized by a ligand-to-metal surfactant interaction in which the propagating metal fragment is incorporated into the surfactant head group. A metal oxide precursor is chemically linked to one or more heteroatoms in the head group of a surfactant molecule. The resulting organometallic species is then subsequently hydrolyzed and subjected to conditions which result in micelle formation, thereby resulting in the hexagonally-packed mesostructure. These hexagonally-packed mesostructures are stable enough so that the structure is substantially maintained after the surfactant is removed under conditions which break the chemical interaction between the metal and the head group heteroatom of the surfactant such that the surfactant is removed from the structure.

It is also reported herein that crystalline porous metal oxides having dimensionally stable pore structures can be synthesized by a ligand-to-metal interaction in which the propagating metal fragment is incorporated into the head group of a small organic moiety. A metal oxide precursor is chemically linked to one or more heteroatoms in the head group of the small organic moiety. The resulting organometallic species is then subsequently hydrolyzed and subjected to conditions which result in the tightly-packed rod-shaped porous metal oxide. These crystalline porous metal oxides which have dimensionally consistent pore structures are stable enough so that the structure is substantially maintained after the small organic moiety is removed under conditions which break the chemical interaction between the metal and the head group heteroatom of the small organic moiety such that the small organic moiety is removed from the structure.

Further, it is reported that crystalline porous metal oxides having dimensionally consistent pore structures can be synthesized by combining a metal oxide precursor with water for a sufficient period of time to form a gel. The gel, a partially hydrolyzed metal oxide precursor, is combined with a compound, such as a surfactant, having at least one head group, under conditions suitable for physical interaction between a head group of the surfactant and the gel. The combination of the gel and the compound is aged for a period of time at a temperature suitable for causing the formation of the crystalline porous metal oxide having a dimensionally consistent pore structure. The compound, or surfactant, or organic portion of thereof, can be removed from the porous metal oxide, resulting in a stable crystalline porous metal oxide having a dimensionally consistent pore structure. Surprisingly, the compound can also include small organic moieties, such as, described below.

One embodiment of the present invention is a composition comprising a hexagonally-packed mesoporous metal oxide, wherein the metal oxide is selected from transition metals and lanthanide metals, in which a heteroatom on the head group of a surfactant is coordinated or complexed with the metal. A "mesoporous structure" is a structure with a regular array of channels having a substantially uniform diameter or "pore" size ranging from about 10 Å to about 500 Å, preferably from about 20 Å to about 200 Å, more preferably from about 20 Å to about 50 Å. A "microporous structure" is a structure with a regular array of channels having a substantially uniform diameter or "pore" size ranging from about 2 Å to about 20 Å, preferably from about 2 Å to about is 15 Å, more preferably from about 2 Å to about 10 Å.

Another embodiment of the present invention is a composition comprising a crystalline porous metal oxide having a dimensionally consistent pore structure, such as a microporous or a mesoporous structure. "Crystalline," as used herein, means a fixed array of unit structures which are regularly repeating and spaced. A "dimensionally consistent pore structure," as used herein, means a pore structure throughout the composition which is uniform in pore size, preferably with minimal interconnecting between channels by smaller cavities or pores within the composition. The metal of the metal oxide can be, for example, silicon, aluminum, or combinations thereof.

The arrangement of the crystalline microporous metal oxide can be either hexagonal, as defined above, or cubic. A "hexagonally packed" structure is a structure with a regular hexagonal array of channels having a substantially uniform diameter or "pore" size. A "cubic" mesoporous structure is a structure with a regular cubic packing of pores which can be an intersecting array of channels having a substantially uniform diameter or "pore" size. Further, the crystalline microporous metal oxide can be rod-shaped. "Rod-shaped," as used herein, means that the channel formed by the crystalline packing of the microporous structure is a hollow tube.

Yet another embodiment of the invention is a composition comprising a crystalline porous transition metal oxide or lanthanide metal oxide having a dimensionally consistent pore structure. The metal oxide can be niobium, titanium, zirconium, cerium, tantalum or yttrium. The pore structure can be either microporous or mesoporous and can be a regular hexagonal array or cubic array of channels having a substantially uniform diameter or "pore" size.

A "transition metal", as used herein, is an element designated in the Periodic Table as belonging to Group IIIB (e.g. scandium and yttrium), Group IVB (e.g. titanium, zirconium and hafnium), Group VB (e.g. vanadium, niobium and tantalum), Group VIB (e.g. chromium, molybdenum and tungsten), Group VIIB (e.g. manganese, technetium and rhenium), Group VIIIB (iron, ruthenium, osmium, cobalt, rhodium, iridium, nickel, palladium and platinum), Group IB (e.g. copper, gold and silver) and Group IIB (zinc, cadmium and mercury). A "lanthanide metal" is a metal belonging to the lanthanide series in the Periodic Table (e.g. lanthanium, cerium, praseodymium, neodymium, promethium, samarium, europium, gadolinium, terbium, dysprosium, holmium, erbium, thulium, ytterbium and lutetium). Preferred metals include titanium, niobium, cerium, yttrium, zirconium and tantalum.

A "transition metal oxide", as used herein, is a transition metal bonded to one or more oxygen atoms. A "lanthanide metal oxide", as used herein, is a lanthanide metal bonded to one or more oxygen atoms.

"Coordinated" or "complexed" with the metal refers to a strong ligand interaction between one or more atoms within the head group of the surfactant and the metal that is greater than typical electrostatic interactions, van der Waals interactions or hydrogen bonding. In one aspect, the strength of the interaction can be on the order of covalent bonding. The "head group" is the polar or hydrophilic functional group of the surfactant. The "tail" is the hydrophobic group of the surfactant.

Another embodiment of the present invention are stable porous metal oxides, such as microporous or mesoporous structures, wherein the metal can be selected from transition metals and lanthanide metals. As used herein, a "stable porous metal oxide," is one in which the porous metal oxide structure is substantially maintained following removal of the compound, such as a surfactant or small organic moiety, or tail group of the compound (hereinafter collectively referred to as removal of the surfactant). The porous metal oxide structure is maintained with a narrow range of pore diameter following removal of the surfactant or tail group of the surfactant. Following removal of the surfactant, the stable porous metal oxide the present invention would have an accessible surface area of 50–1200 $m^2/g$. A stable porous metal oxide structure is also indicated by the substantial preservation of the porous structure as evidenced by the lack of substantial pore collapse by powder X-ray diffraction patterns (XRD) of metal oxide after removal of the surfactant compared with prior to removal. Typically, the stable porous metal oxides of the present invention would correspond to a narrow pore size distribution with at least 50 $m^2/g$ of B.E.T. (Brunauer-Emmett-Teller) surface area.

In one aspect, "stable" refers to thermal stability. As used herein, "thermally stable" means that the porosity and B.E.T. surface area of the surfactant-free porous structures remain substantially unchanged at temperatures above about 50° C. and below about 900° C., preferably below about 600° C. and more preferably below about 900° C. Preferably, the loss of accessible surface area of the porous structure upon thermal treatment is less than 20%, more preferably less than 5%.

In another aspect, "stable" refers to the stable preservation of a porous structure upon surfactant removal by calcination. Porous structures are resistant to calcination when heated in an oxidizing atmosphere below about 500° C. for surfactant removal.

Optionally, the porous metal oxide structures of the present invention can additionally comprise one or more different inorganic oxides or metal salts. Suitable inorganic oxide dopants include oxides of transition metals, lanthanides, alkali metals (Group IA), alkaline earth metals (Group IIA), and main group metals (Group IIIA—VIIA). Preferably, the inorganic oxides are oxides of Y, V, Ti, Zr, Ir, Os, Rh, Pt, Pd, Au, Fe, Rc, Ru, Cu, Co, Hg, Tl, Ni, and/or Cr. Suitable metal salts include alkali metal salts, alkaline earth metal salts and transition metal salts. Preferred salts include alkali metal halides, such as KCl and NaCl. Such porous metal oxides can be prepared by "doping" as is generally known in the art, for example, or including a corresponding inorganic precursor in the processes described herein. Suitable concentrations of the inorganic oxide are from about 0.1 mole % to about 50 mole %, preferably from about 1 to about 10 mol %.

The preparation of hexagonally-packed mesoporous metal oxides involves first complexing a heteroatom with the metal of a metal oxide precursor before allowing substantial micelle formation and/or hydrolysis to occur. In contrast, previous methods of preparing a hexagonally-packed mesoporous transition metal oxide involve preformation of a miceller template around which the metal oxide assembles, drawn by electrostatic forces (Huo et al., Chem. Mater. 6:1176 (1994)). However, hexagonally-packed transition metal oxide mesostructures prepared by this method have not been stable, i.e. the mesostructure is not maintained after removal of the surfactant.

One embodiment of the present invention is a method of preparing a hexagonally-packed mesoporous metal oxide wherein the metal oxide is selected from transition metals and lanthanide metals. A transition metal oxide precursor or lanthanide metal oxide precursor and a surfactant are combined under conditions which cause the formation of a complex between a heteroatom in the head group of the surfactant and the metal of the metal oxide precursor in the substantial absence of water. The reactants can be contacted in the presence of a suitable organic solvent, such as in an alcoholic solvent (Example 2) or can be carried out neat (Example 4). The complex thus formed is subjected to conditions suitable for micelle formation and hydrolysis of the metal oxide precursor. This reaction product is then allowed to age for a period of time and at a temperature suitable for causing the formation of a hexagonally-packed metal oxide mesostructure.

Optionally, a metal salt is added to the mixture being aged in an amount sufficient to accelerate the formation of hexagonally-packed metal oxide mesostructure. Suitable metal salts include Group IA metal salts (alkali metal salts), Group IIA metal salts, transition metal salts and lanthanide metal salts. Alkali halides (e.g., potassium chloride) are preferred. Typically, about 0.1–20.0 equivalents of metal salt are sufficient to cause an increase in the crystallization rate; about 0.5–2.0 equivalents are preferred.

Alternatively, the metal oxide precursor can be contacted with the surfactant in the presence of water. In this embodiment, prior to precursor addition, the surfactant and precursor are contacted in a quantity of water such that the surfactant concentration is above the critical micelle concentration, i.e. the concentration of surfactant below which micelles do not form. The "critical micelle concentration" (i.e., the concentration at which micelles form) varies dependent upon the surfactant and can be determined, for example, by applying varying amounts of the surfactant to a constant quantity of water and determining the concentration at which micelles do not form. In certain instances, it is advantageous to additionally add a chelating agent, such as a 2,4-diketone (e.g. acetylacetone) to the metal oxide precursor (preferably prior to contacting the precursor with surfactant and/or water) in order to prevent premature hydrolysis of the metal oxide precursor. It is preferable to use acetylacetone when using metal oxide precursors of yttrium, titanium and zirconium. Typically, about 0.1 to about 10 equivalents of acetylacetone to metal oxide precursor, preferably about one equivalent, are added to the reaction mixture.

A transition metal oxide precursor is a compound comprising a transition metal which as a result of a chemical reaction (such as hydrolysis and polycondensation) forms a transition metal oxide. Examples include transition metal alkoxides, transition metal salts, transition metal hydroxides, or colloidal dispersions of transition metal oxides or transition metal hydroxides. Transition metal alkoxides are preferred.

A lanthanide metal oxide precursor is a compound comprising a lanthanide metal which as a result of a chemical reaction (such as hydrolysis and polycondensation) forms a lanthanide metal oxide. Examples include lanthanide metal alkoxides, lanthanide metal salts, lanthanide metal hydroxides, or colloidal dispersions of lanthanide metal oxides or lanthanide metal hydroxides. Lanthanide metal alkoxides are preferred.

A suitable surfactant is a straight chain hydrocarbon having a head group, wherein the head group is defined above. The straight chain hydrocarbon can have from about 8 to 24 carbon atoms, preferably from about 12 to 18 carbon atoms. The size of the micelles is determined, in part, by the size or length of the surfactants used. The length of the hydrocarbon tail of the surfactant can be used to vary the pore size of the hexagonally packed mesostructure.

Swelling agents can be added to the hydrophilic regions of the micelles to further increase the pore diameters. Examples of swelling agents include cyclohexane, mesitylene, xylene, toluene and ethanol. In general, the swelling agent is hydrophobic and resides within the tail group regions of the inverse micelle upon addition to the surfactant solution. Pore sizes made according to this process can range from about 20 Å to about 200 Å, and preferably 20 Å to about 40 Å.

The preparation of crystalline porous metal oxides having dimensionally consistent pore structure involves either: 1) complexing a heteroatom of a head group of a small organic moiety with the metal of a metal oxide precursor before allowing substantial micelle formation and/or hydrolysis to occur, or 2) combining a metal oxide precursor with water for a sufficient period of time to form a gel and thereafter combining the gel with a small organic moiety, having at least one head group, under conditions suitable for a physical interaction to take place between the head group of the small organic moiety and the gel.

"Under conditions suitable for physical interaction" between a head group of a surfactant or a small organic moiety and a gel (formed by hydrolysis of a metal oxide precursor) refers to an interaction between one or more atoms within the head group of the surfactant or small organic moiety and the metal oxide. Electrostatic interactions, van der Waals interactions or hydrogen bonding are encompassed by the physical interaction between the metal oxide of the gel and the head group, thereby forming a supermolecular template. The strength of the physical interaction is less than that of typical covalent bonding.

One embodiment of the present invention is a method of preparing a crystalline porous metal oxide having a dimensionally consistent pore structure. A metal oxide precursor and a small organic moiety are combined under conditions which cause the formation of a complex between a heteroatom in the head group of the surfactant and the metal of the metal oxide precursor in the substantial absence of water. The reactants can be contacted in the presence of a suitable organic solvent, such as in an alcoholic solvent (Example 16) or can be carried out neat (Example 12). The complex thus formed is subjected to conditions suitable for micelle formation and hydrolysis of the metal oxide precursor. This reaction product is then allowed to age for a period of time and at a temperature suitable for causing the formation of a crystalline porous metal oxide having dimensionally consistent pore structure.

Another embodiment of the present invention is a method of preparing of a crystalline porous metal oxide having a dimensionally consistent pore structure by combining a metal oxide precursor with water for a sufficient period of time to form a gel. The gel is combined with a small organic moiety, having at least one head group, under conditions suitable for physical interaction between the head group of the small organic moiety and the gel (Example 13). The combination of the gel and the small organic moiety is aged for a period of time at a temperature suitable for causing the formation of the crystalline porous metal oxide having a dimensionally consistent pore structure.

Still another embodiment of the present invention is a method of preparing a crystalline mesoporous metal oxide having a dimensionally consistent pore structure by combining a metal oxide precursor with water for a sufficient period of time to form a gel. The gel is combined with a surfactant, having at least one head group, under conditions suitable for physical interaction between the head group of the surfactant and the gel. The combination of the gel and surfactant is aged for a period of time at a temperature suitable for causing the formation of the crystalline mesoporous metal oxide having a dimensionally consistent pore structure.

Yet another embodiment of the present invention is a method of preparing a crystalline porous metal oxide having a dimensionally consistent pore structure by combining a solution of a metal oxide precursor in a non-polar organic solvent with an aqueous alcohol solution of a compound, such as a surfactant or small organic moiety, with stirring to create an oil-in-water emulsion. The emulsion is aged for a period of time at a temperature suitable for causing the formation of the crystalline mesoporous metal oxide having a dimensionally consistent pore structure. Suitable non-polar organic solvents include cyclohexane, hexane, benzene, mesitylene, etc.

Optionally, a metal salt is added to the mixture being aged in an amount sufficient to accelerate the formation of crystalline porous or mesoporous metal oxide having dimensionally consistent pore structures. Suitable metal salts include Group IA metal salts (alkali metal salts), Group IIA metal salts, transition metal salts and lanthanide metal salts. Alkali halides (e.g., potassium chloride) are preferred. Typically, about 0.1–20.0 equivalents of metal salt are sufficient to cause an increase in the crystallization rate; about 0.5–2.0 equivalents are preferred.

A suitable "small organic moiety," as used herein, includes small organic molecules, such as hydrocarbons, substituted by at least one head group, wherein the head group is defined above. The hydrocarbon can have a carbon atom chain length from about two to eight carbon atoms, preferably from about three and seven carbon atoms. The hydrocarbon chain can be branched or linear. Examples of suitable small organic moieties include linear and branched propyl groups, linear and branched butyl groups, linear and branched pentyl groups, linear and branched hexyl groups, linear and branched heptyl groups and linear and branched octyl groups.

Additionally, wherein the small organic moiety includes at least one head group, a neutral amine component can be further substituted. For example, the amine can be mono or disubstituted with alkyl groups, such as methyl, ethyl, propyl etc. A particularly preferred amine is 2-aminoadamantane.

Alternatively, the small organic moiety can include at least two head groups, located at ends of a hydrocarbon chain. For example, 1,7-diaminoheptane, 1,8-diaminooctane, 1,10-diaminodecane, 1,12-diaminododecane, etc. are suitable as templating agents for organizing the supermolecular structure. These small organic moieties, which have head groups located at the respective ends of a hydrocarbon chain, are believed to fold so that both amine head groups interact with the inorganic oxide precursor.

The metal oxide precursor can also have an effect on the pore size of the porous composition. The length and steric bulk of the hydrocarbon portion of the precursor can be used to vary the pore size of the porous metal oxides having dimensionally consistent pore structures. Examples of suitable metal oxide precursors include alkoxides such as ethoxide, iso-propoxide, butyloxide and pentyl oxide. Additional examples of suitable functional groups attached as metal oxide precursors include esters, amides, alkylamines, etc. Pore sizes made according to these processes, can range from about 2 Å to about 200 Å, preferably 20 Å to about 40 Å, most preferably 2 to 20 Å.

The materials of the present invention are characterized by the regularity of its large open pores in arrangement and size (pore size distribution within a single phase of, for example, ±25%, usually ±15% or less of the average pore size of that phase). The term "hexagonal" is intended to encompass materials that exhibit a hexagonal symmetry including significant observable deviations, for example ±25% random deviation from the repeat distance between adjacent channels. The term "cubic" is intended to encompass materials that exhibit a cubic symmetry including significant observable deviations, for example ±25% random deviation from the repeat distance between adjacent channels. The term "rod-shaped" is intended to encompass materials that exhibit a rod-shape symmetry, i.e. hollow tubes wherein the tube or rod portion is composed of the metal oxide.

Suitable head groups include phosphate, carboxylate, sulfate, amino and acetylacetonate. The stability of hexagonally-packed mesostructure formation can be dependent on the optimization of the head group of the surfactant and the precursor. That is, the surfactant head group is selected to form an optimal complex with the precursor (e.g., a strong ligand interaction). For example, titanium, cerium and zirconium containing metal oxide precursors (e.g. titanium isopropoxide, cerium isoproxide and zirconium n-propoxide) formed stable hexagonally packed mesostructures when combined with surfactants having phosphate head groups. Stable hexagonally packed niobium and tantalum mesostructures were prepared with niobium and tantalum oxide precursors (e.g., niobium ethoxide and tantalum ethoxide) and neutral amine surfactants. Sulfate surfactants formed strong ligand interactions with yttrium oxide precursors, such as yttrium isopropoxide. The optimal surfactant head groups for each metal can be determined by routine experimentation in which the method of preparing hexagonally packed metal oxide mesostructures is carried out in the presence of various surfactants having different head groups. Such an optimization is described in Example 7. Surfactant/metal oxide precursor ratios can vary from about 1:1 to about 1:9 and is preferably about 1:1, e.g., for the titanium oxide precursor (Example 6).

Conditions suitable for micelle formation and hydrolysis of the metal oxide precursor refer to adding sufficient water to the surfactant/metal oxide complex such that the concentration of surfactant is above the critical micelle concentration. Micelle formation is preferably carried out with cooling to temperatures of about −78° C. to about 0° C., following which water is added and the mixture is allowed to warm to room temperature to promote hydrolysis. Temperatures as high as about 50° C. can be used.

The period of time suitable for causing the formation of hexagonally packed metal oxide mesostructures, and crystalline porous and mesoporous metal oxides having dimensionally consistent pore structures varies according to the metal oxide precursor and temperature selected. In general, aging lasts from about 1 minute to about 14 days, preferably from about one hour to about fourteen days, and more preferably about 3–7 days. Suitable temperatures for aging can range between about 15° C. to about 200° C. Optimal time periods can be determined from the XRD pattern through comparison of intensities and resolution of the peaks corresponding to the hexagonal or cubic structure. Time periods are chosen to maximize the distinctness of these peaks. For example, a XRD pattern for hexagonally packed titanium oxide mesostructure made with 0.5–1 mol equivalents of potassium dodecyl phosphate isolated after one day aging at room temperature had a diffraction pattern in which the (100) peak was broad and the smaller peaks were not clearly distinguished. The low-intensity (110), (200), and (210) peaks became more intense and distinct when the sample was aged for longer periods.

In general, materials aged at room temperature generally had broad humps at around 2° 2θ in the XRD. When the aging temperature is increased to over 100° C., decomposition of the mesostructure occurs with the premature removal of surfactants in the case of Zr, Ce, and Ti oxides with phosphate surfactants. For Nb and Ta oxides with amino surfactants, aging temperatures below about 180° C., can be used without porous metal oxide structural decomposition. For Si oxides with amino surfactants, suitable aging temperatures include ambient conditions. Additionally, for Ti oxides with amino surfactants, aging temperatures of about 80° C. can be used without porous metal oxide structural decomposition. Optimal aging temperatures can be readily determined by one skilled in the art by carrying out the aging process at various temperatures and then examining the XRD peaks of the hexagonal pattern for sharpness, as described above. Optimal aging temperatures and aging times for hexagonally-packed niobium oxide, silicon oxide, cerium oxide, yttrium oxide, zirconium oxide, titanium oxide and tantalum oxide mesostructures are given in the Examples.

The pH and ionic strength of the solution in which the hydrolysis, micelle formation and aging occur can vary over a wide range. However, the rate of hydrolysis, the rate of aging or polycondensation and the quality of the hexagonally-packed mesostructures, as determined by the intensity and resolution of the hexagonal XRD pattern, is affected by these parameters and can vary according to the metal oxide precursor. Generally, the pH used in the aging process can range from about 1–14, but is preferably between about 3–8. In the specific case of titanium oxide precursors, the preferred pH ranges between about 4–6. Preferred pHs for hexagonally-packed niobium oxide, titanium oxide, cerium oxide, yttrium oxide, zirconium oxide, and tantalum oxide mesostructures are given below in the Examples. One of ordinary skill in the art can determine optimal pHs and ionic strengths for other metal oxide precursors using the methods described herein, for example.

As set forth above, the invention relates to the formation of a strong ligand interaction or complex between the surfactant head group and the metal oxide precursor prior to the substantial formation of micelles, hydrolysis and polycondensation of the metal oxide. This favors the ligand assisted templating of hexagonal mesostructure formation instead of layered or amorphous phase formation. The chemical or ligand bond can be subsequently broken by suitable treatment to allow surfactant removal without significant disturbance of the mesostructure.

In a preferred embodiment, the surfactant is removed by chemical means. Typically, this is carried out by washing the hexagonally-packed mesostructure with a solution which is capable of breaking the coordination between the metal and the head group of the surfactant without substantially disturbing the hexagonal metal oxide mesostructure. One example of a chemical means of removing the surfactant from the hexagonally-packed mesostructures is by washing with a suitable solvent under acidic or basic conditions. For example, the titanium oxide mesostructure of Example 1 can be washed with an alcohol solvent, such as ethanol, in the presence of a strong base, such as potassium hydroxide. The resulting B.E.T. surface area from a sample prepared from $C_{14}H_{29}$ phosphate was 420 $m^2/g$.

In another example of a chemical means of removing the surfactant, hexagonally-packed niobium oxide mesostructures prepared as described herein are washed with a strong acid, such as nitric acid, in a suitable solvent, such as ethanol. Evidence that the material had retained the hexagonal mesostructure was provided by the resulting B.E.T. surface area, which was 434 $m^2/g$. In addition, the $N_2$ adsorption-desorption isotherms of Nb-TMS1 (FIG. 3$a$) presented no hysteresis, indicating the cylindrical nature of the pores. The pore size distribution of this material (FIG. 3$b$) involved one narrow peak at 27 Å. Washing the surfactant containing niobium oxide mesostructure with ethanol produced material with a B.E.T. surface area of about 5 $m^2/g$, contrasting with recent results which showed that amine surfactants could be removed from samples of silica- and alumina-based mesoporous materials prepared using the micelle assisted-crystallization procedure by stirring them in ethanol at room temperature (Tanev et al., *Nature* 267:865 (1995)). This result indicated that the interaction between the surfactant head group and the metal was significantly stronger in mesostructures prepared by the method of the present invention than the electrostatic interactions between the silicon or aluminum and the surfactant head group in mesostructures prepared by Tanev et al.

In another aspect, the surfactant can be removed by calcination. This process is carried out by heating the sample at a sufficient temperature and for a sufficient period of time to combust the surfactant. Suitable temperatures are up to about 600° C., preferably at about 200° C. to about 500° C. Sufficient time periods vary from about 1 hour to about 24 hours, and are preferably from about 6 hours to about 10 hours. Hexagonally-packed titanium oxide mesoporous structures were substantially preserved in calcination at 550° C. under air or oxygen. Some structural collapse occurred as illustrated by some broadening of the XRD pattern of the calcined sample as compared to the as synthesized sample which still retains the surfactants. This damage could be due to a light-off which occurs at about 170° C., possibly catalyzed by the titania, which has been found to be an effective catalyst in C—H bond oxidation processes (Neumann et al., *J. Chem. Soc. Commun.* 22:1685 (1993)). The B.E.T. surface area of calcined mesoporous $TiO_2$ was obtained by using $N_2$ adsorption and was found to be 150 $m^2/g$. Similarly, calcination of synthesized niobium mesostructures at 500° C. for five hours yielded a material with partial pore collapse and a surface area of 61 $m^2/g$.

As set forth above, the invention relates to the formation of a strong ligand interaction or complex between the surfactant head group and the metal oxide precursor prior to the substantial formation of micelles, hydrolysis and polycondensation of the metal oxide. This favors the ligand assisted templating of crystalline porous and mesoporous metal oxide formation instead of layered or amorphous phase formation. The chemical or ligand bond can be subsequently broken by suitable treatment to allow surfactant removal without significant disturbance of the crystalline porous or mesoporous metal oxide.

Also, as set forth above, the invention relates to the formation of a physical interaction between a metal oxide gel (partially hydrolyzed metal oxide precursor) and surfactant or small organic moiety head groups. This favors the supermolecular assisted templating of crystalline porous, microporous and mesoporous metal oxide formation instead of layered or amorphous phase formation. The association can be subsequently broken by suitable treatment to allow surfactant or small organic moiety removal without significant disturbance of the crystalline porous, microporous or mesoporous metal oxide.

In a preferred embodiment, the surfactant is removed by chemical means. Typically, this is carried out by washing the crystalline porous or mesoporous metal oxide with a solution which is capable of breaking the coordination between the metal and the head group of the surfactant without substantially disturbing the crystalline porous or mesoporous metal oxide structure. One example of a chemical means of removing the surfactant from the crystalline porous or mesoporous metal oxide structures is by washing with a suitable solvent under acidic or basic conditions. For example, microporous niobium oxide of Example 12 can be washed with an alcoholic solvent, such as isopropanol, at a pH of 0.5–3.0 adjusted by addition of nitric acid.

In another example of a chemical means of removing the surfactant, hexagonally-packed niobium oxide mesostructures prepared as described herein are washed with a strong acid, such as nitric acid, in a suitable solvent, such as ethanol. Evidence that the material had retained the hexagonal mesostructure was provided by the resulting B.E.T. surface area, which was 184 $m^2/g$. In addition, the $N_2$ adsorption-desorption isotherms of Nb-TMS5 (FIG. 9($a$)) presented no hysteresis, indicating the cylindrical nature of the pores. The pore size distribution of this material (FIG. 9($b$)) involved one narrow peak at 7.4 Å. Washing the surfactant containing a hexagonal structure with ethanol produced material with a B.E.T. surface area of about 22 $m^2/g$, contrasting with recent results which showed that amine surfactants could be removed from samples of silica- and alumina-based mesoporous materials prepared using the inverse micelle assisted-crystallization procedure by stirring them in ethanol at room temperature (Tanev et al., *Nature* 267:865 (1995)).

In another aspect, the surfactant or small organic moiety can be removed by calcination. This process is carried out by heating the sample at a sufficient temperature and for a sufficient period of time to combust the surfactant or small organic moiety. Suitable temperatures are up to about 900° C., preferably at about 200° C. to about 500° C. Sufficient time periods vary from about 1 hour to about 24 hours, and are preferably from about 6 hours to about 10 hours. Porous, microporous and mesoporous structures were substantially preserved in calcination at 550° C. under air or oxygen. Some structural collapse occurred as illustrated by some broadening of the XRD pattern of the calcined sample as compared to the as synthesized sample which still retains the surfactants. This damage could be due to a light-off which occurs at about 170° C., possibly catalyzed by the titania, which has been found to be an effective catalyst in C—H bond oxidation processes (Neumann et al., *J. Chem. Soc. Commun.* 22:1685 (1993)). Similarly, calcination of microporous silica (Experiment 17) at 500° C. for two hours yielded a material with a surface area of 498 m²/g.

Calcining of hexagonally-packed titanium oxide mesostructures before extensive drying gave an extensive degree of structural collapse, most likely due to low hydrothermal stability. This was also evidenced by the fact that aging in the presence of water at temperatures in excess of 100° C. led to degradation of the mesoporous structure and concomitant formation of amorphous material. Transmission Electron Micrographs (TEM) of the material showed dried Ti-TMS1 with its hexagonal structure substantially intact after calcination. Similar structural stability has been noted for the zirconium, niobium and tantalum systems, but not the yttrium system, which converted to a layered phase at 100° C. The XRD of calcined Ti-TMS1 shows a substantially broadened (100) peak with poorly defined (110), (200), and (210) peaks.

A hexagonally-packed niobium oxide mesostructure was prepared by the method of the present invention. A solution of niobium ethoxide (Nb(OEt)$_5$) (5.0 g) in isopropanol (10 ml) was treated with tetradecyl amine (3.4 g, 1 equivalent), resulting in a octahedral niobium amino ethoxy complex (Mehrotra et al., *Inorg. Chim. Acta* 16:237 (1976)). When this solution was further treated with water (20 ml), a rapid polymerization reaction ensued giving a white gelatinous precipitate. Aging this gel at 150° C. for ten days yielded a white powder (Nb-TMS1) with the characteristic hexagonal X-ray powder diffraction pattern (XRD) shown in FIG. 2, similar to those recorded for MCM-41. The TEM of Nb-TMS1 confirmed that a pure transition metal oxide structural analogue of hexagonally packed mesoporous MCM-41 was obtained.

The preparation and characterization of surfactant-free Nb-TMS1 is described in the application. Surfactant-free Nb-TMS1 has novel and useful properties. This material exhibits a high thermal and hydrothermal stability as indicated by nitrogen adsorption, revealing that this material has a stable mesoporosity and surface area to at least 400° C. These results indicated that Nb-TMS1 synthesized by this novel approach would be useful as a high surface area catalytic material with thermal stability and uniform pore sizes. As a transition metal oxide with variable oxidation states, Nb-TMS1 would also offer additional unique catalytic properties not possible in the conventional alumina- or silicate-based MCM-41 systems.

Figure 4A:
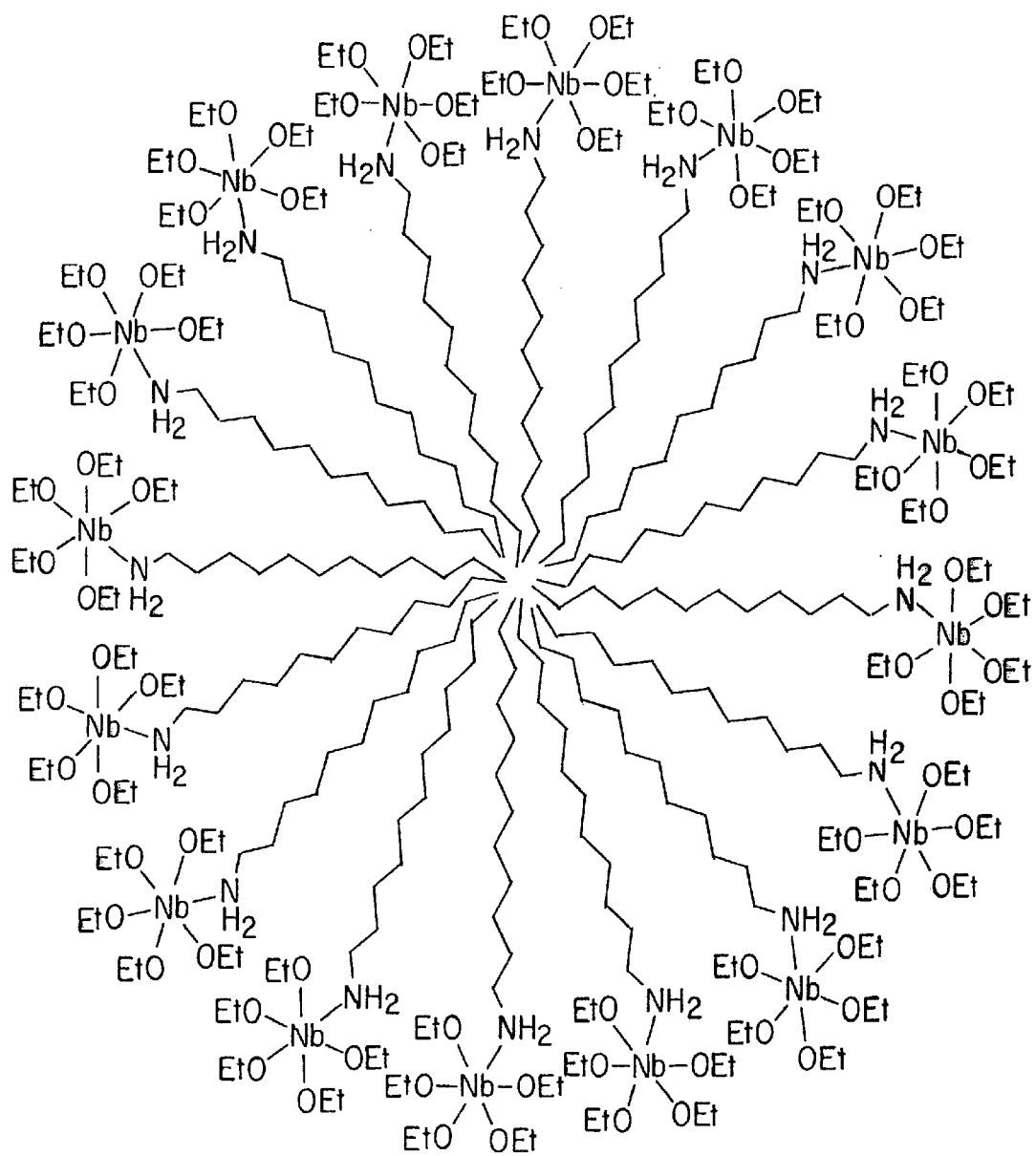
FIG. 4A represents the micellar array of $(C_{12}H_{25}NH_2)Nb(OEt)_5$.
Figure 4B:
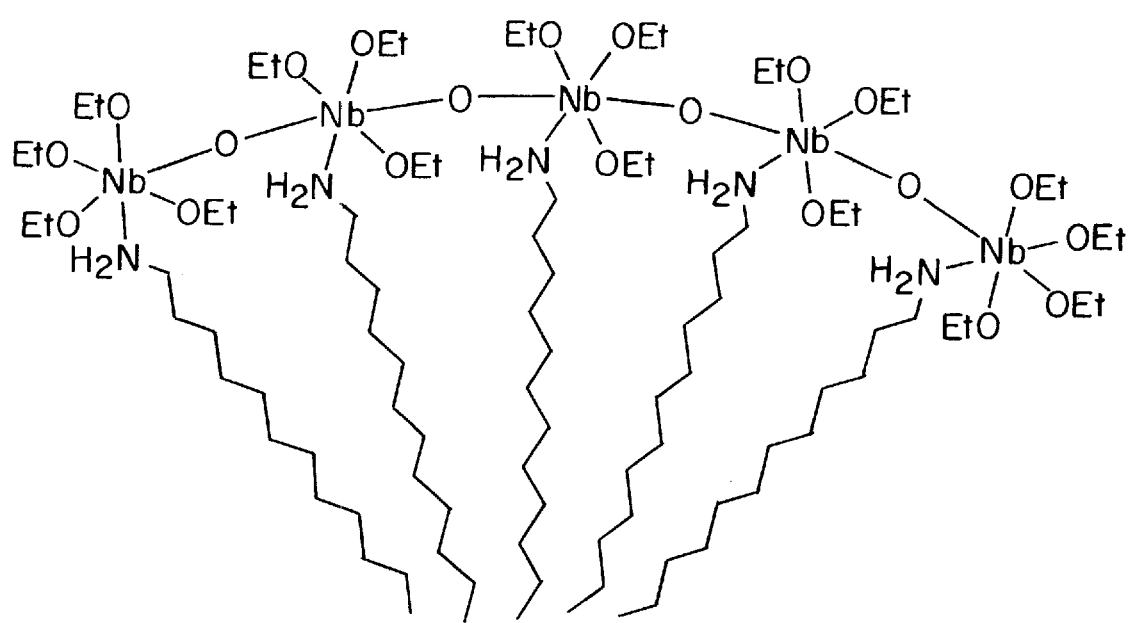
FIG. 4B represents the micellar array of alkoxide.
Figure 4C:
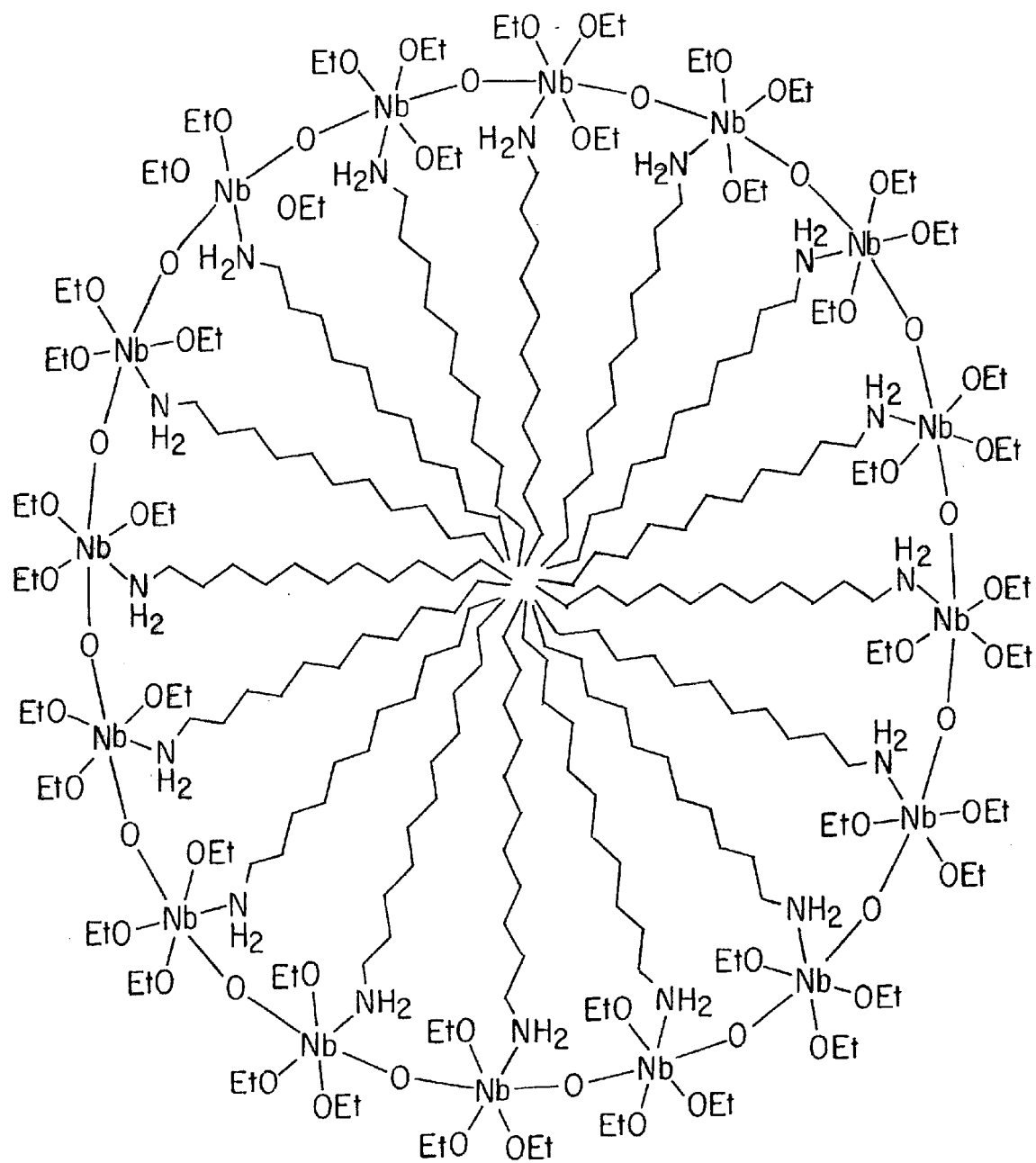
FIG. 4C represents Nb-TMS1.

The mechanism of forming Nb-TMS1, C, (shown in FIG. 4C, is depicted below:

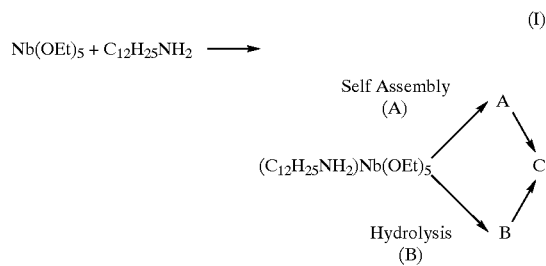

(I)

The mechanism of forming Nb-TMS1 shown in FIG. 4 represents a novel approach to the synthesis of mesoporous materials in that the surfactant is chemically bonded to the metal atom in the precursor and possibly throughout the entire aging process. This mechanism contrasts to that proposed for the synthesis of MCM-41, where a ligand interaction between the tetraalkylammonium surfactant head group and the Si center is neither present nor possible. For the latter case, it has been proposed that the surfactant phase templates the assembly of the inorganic phase via either preformed micelles (Chen et al., *Microporous Mater.* 2:27 (1993)) or electrostatic charge matching between the silicate oligomers and the individual surfactant head groups (Huo et al. *Nature* 368:317 (1994); Monnier et al. *Science* 261:1299 (1993); Huo et al. *Chem. Mater.* 6:1176 (1994)). In the synthesis of Nb-TMS1, such a mechanism is not feasible since the surfactant is not soluble in water under the synthesis conditions applied. Employing the described ligand-assisted templating mechanism, the Nb—N bond present in the precursor is believed to remain intact during at least the initial phase of the synthesis. If the ammonium form of the surfactant was dominant, Nb-TMS1 could be formed starting from the alkyl ammonium salt. At the neutral pH regions that favored Nb-TMS1 formation, however only amorphous materials were produced with these alternate surfactants. Also, while the organic phase in samples MCM-41 prepared with amine surfactants at neutral pH can be removed by stirring in ethanol for one hour, little if any surfactant is removed from Nb-TMS1 under these conditions. This suggests that Nb—N bonds may well be intact in the as-synthesized material.

FIG. 4 is a schematic representation of two possible synthesis pathways for Nb-TMS1 under a ligand assisted templating mechanism. In A, the organometallic precursor self-assembles in ethanol prior to hydrolysis and this micellar array holds the Nb-containing head groups in place during subsequent hydrolysis. Although alcohol can disrupt micelle formation, this phenomenon is largely dependent on concentration of the surfactant and the dielectric constant of the medium. Due to the high concentrations of the niobium precursor used in the synthesis of Nb-TMS1 and the polar nature of ethanol, micelle formation is possible. Although the niobium head group is not hydrophilic, it is believed that because of ethoxy exchange with the free ethanol in the solvent, it would prefer to occupy regions of the solution rich in ethanol while the hydrophobic tail groups would tend to cluster together. Evidence for this is that organometallic ethoxide complexes are usually soluble in ethanol, while long chain hydrocarbons are not.

In the second proposed pathway, B, the self-assembly occurs during propagation of the alkoxide hydrolysis and polycondensation. The self-assembly of polymers containing hydrophobic and hydrophilic regions during chain growth has been noted before. Although the niobium head group is initially hydrophobic, the hydrolytic replacement of ethoxide groups with hydroxide and oxide linkages may have given rise to progressively more hydrophilic head group assembly in forming the final mesoporous structure depicted.

A hexagonally-packed titanium oxide mesostructure (Ti-TMS1—Example 1) was prepared with titanium acetylacetonate tris-isopropoxide as a precursor and tetradecyl phosphate surfactant (10 wt. %) at pH 3–6 after five days aging at 80° C. The powder X-ray diffraction (XRD) pattern for isolated synthesized Ti-TMS1 gives the expected (100) peak at a d spacing of 32 Å. No amorphous or layered phases were observed in this material, shown in FIG. 1. TEM of the surfactant containing-Ti-TMS1 showed the hexagonal array of stacked tubes of approximately 27 Å in pore diameter.

The inner walls of this material were about 5 Å thick, corresponding to what was expected on the basis of the XRD data.

The B.E.T. surface area of calcined Ti-TMS1 was obtained using $N_2$ adsorption and found to be 150 m$^2$/g. When the surfactant was removed by treatment with KOH in ethanol/water at pH 9, the surface area was 420 m$^2$/g. This indicated that the mesostructure was preserved to a greater degree than in those samples of Ti-TMS1 in which the surfactant was removed by calcining. Also, the slightly smaller surface area (420 m$^2$/g) as compared to MCM-41 can be attributed almost exclusively to the molecular weight difference between $SiO_2$ and $TiO_2$.

Figure 8:
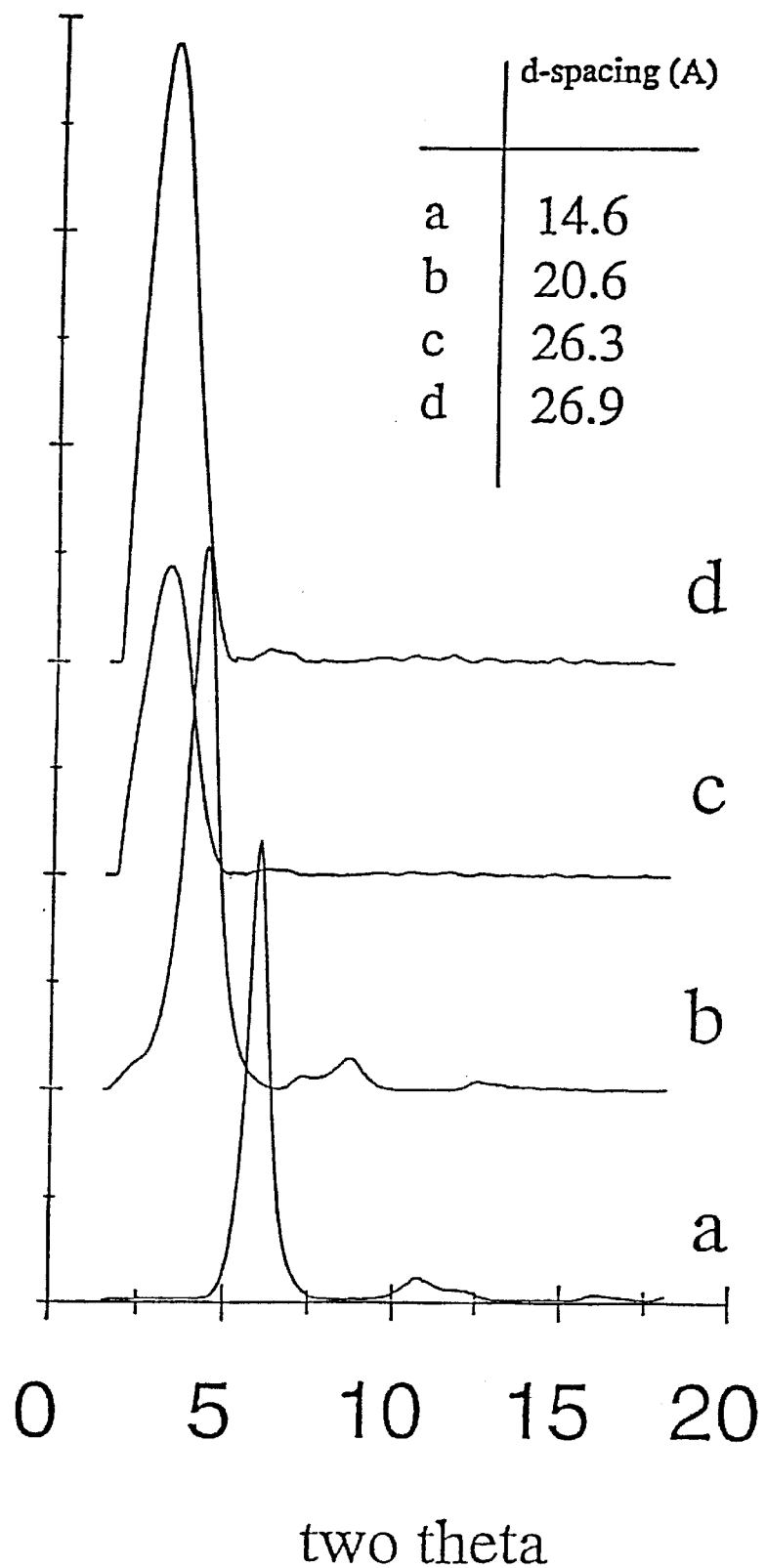
FIG. 8 is an XRD of as-prepared M-TMS5 (M is metal). (a) V-TMS5 synthesized by mixing $VOSO_4$ and propylphosphonic acid ($C_3H_5OPO_2H$) and aging at 96° C. for 2 days, (See Example 19) (b) Nb-TMS5 synthesized with niobium ethoxide and a hexylamine as a templating agent at 180° C. for 4 days (See Example 13), (c) Ti-TMS5 synthesized with titanium ethoxide and a hexylamine templating agent at 96° C. for 4 days (See Example 12), (d) Ta-TMS5 synthesized with tantalum ethoxide and hexylamine templating agent at 180° C. for 7 days (See Example 12).

Novel syntheses, presented below, illustrate that the addition of small organic templating agents to a sol-gel alkoxide precursor solution can lead to the formation of porous metal oxides with a well-defined crystal structure for a broad range of chemical compositions. Only amorphous metal oxides with a broad pore size distribution are obtained if no organic templating agent has been introduced during the hydrolysis and polycondensation of the alkoxides. As shown in FIG. 8, using a short-chain phosphonic acid or a short-chain amine, V-TMS5, Nb-TMS5, Ti-TMS5 and Ta-TMS5 were successfully prepared with a hexagonally-packed pore structure, analogous to that obtained to MCM-41 (C. T. Kresge, et al. Nature 359 (1992) 710; J. S. Beck et al. J. Am. Chem. Soc. 114 (1992) 10834) and TMS1 (U.S. Pat. Ser. No. 08/415, 695; D. M. Antonelli et al. Angew. Chem. Int. Ed. Engl. 35 (1996) 426; D. M. Antonelli et al. Angew. Chem. Int. Ed. Engl. 34 (1995) 2014; D. M. Antonelli et al. Chem. Mater. 8 (1996) 874; D. M. Antonelli et al. Inorg. Chem. 35 (1996) 3126). However, the d-spacings of the TMS5 materials are much smaller than those noted for mesoporous MCM-41 or TMS1, reflecting the microporous nature of the former. The X-ray diffraction patterns of V-TMS5 and Nb-TMS5 have distinct higher order diffraction peaks. Ti-TMS5 and Ta-TMS5 on the other hand, have fairly weak higher order diffractions beyond the (100) diffraction. This may be due to a lack of long-range packing of individual oxide tubes or a preferred crystal orientation along the (h00) direction.

Figure 9A:
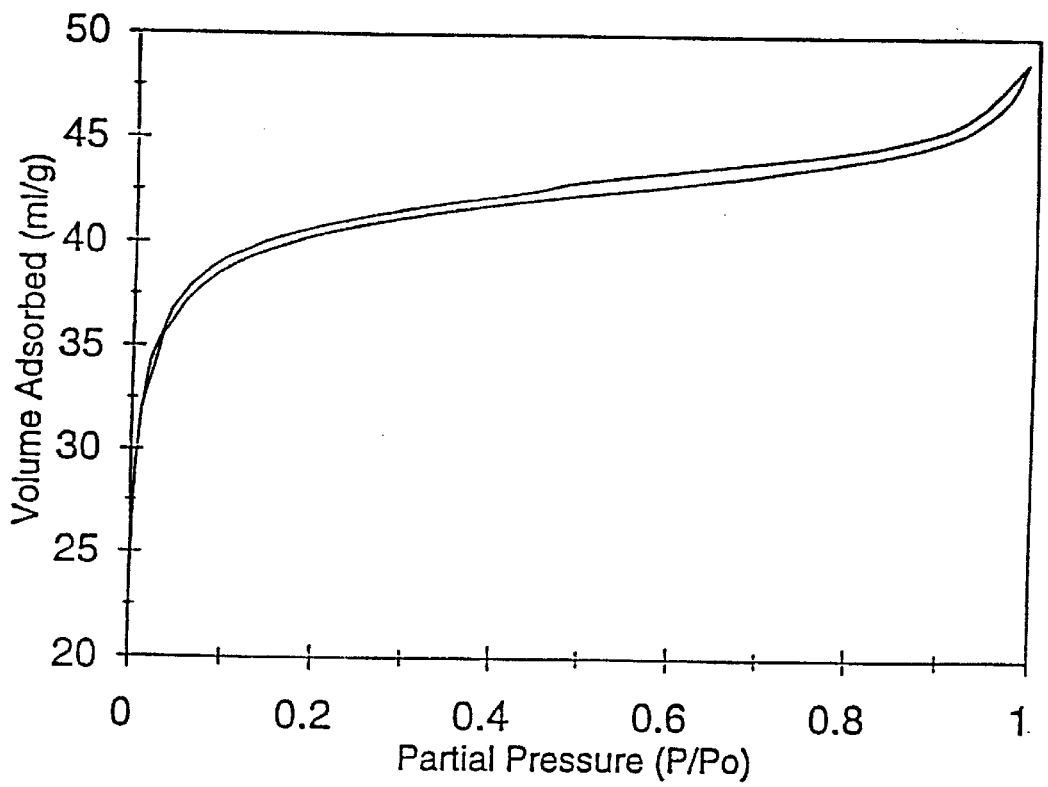
FIG. 9(a) shows $N_2$ adsorption and desorption isotherms of microporous Nb-TMS5. The sample was synthesized with a niobium ethoxide:hexylamine molar ratio of 1:0.75 (by the method of Example 13), aged at 180° C. for 4 days and subjected to template removal by acidic isopropanol-water wash (with the pH adjusted to 1.5 using nitric acid), (b) Pore size distribution of microporous Nb-TMS5 obtained by applying Horvath-Kawazoe method to a cylindrical pore model.
Figure 9B:
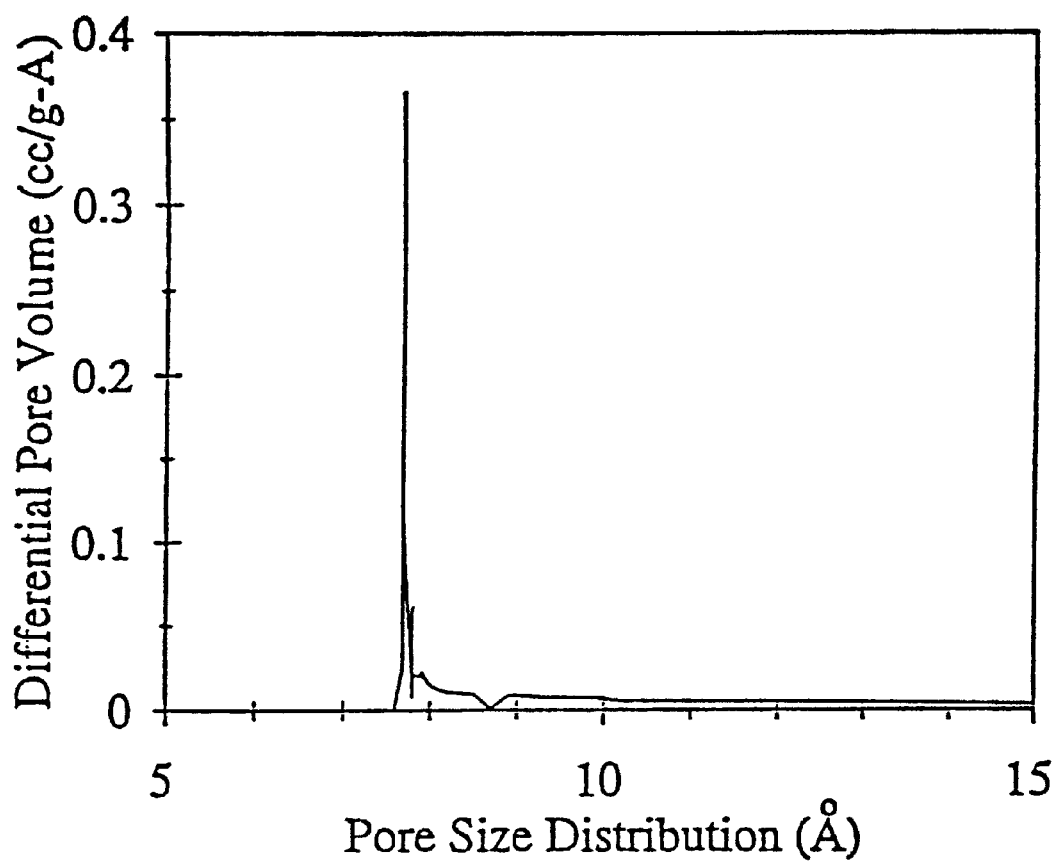
Figure 10A:
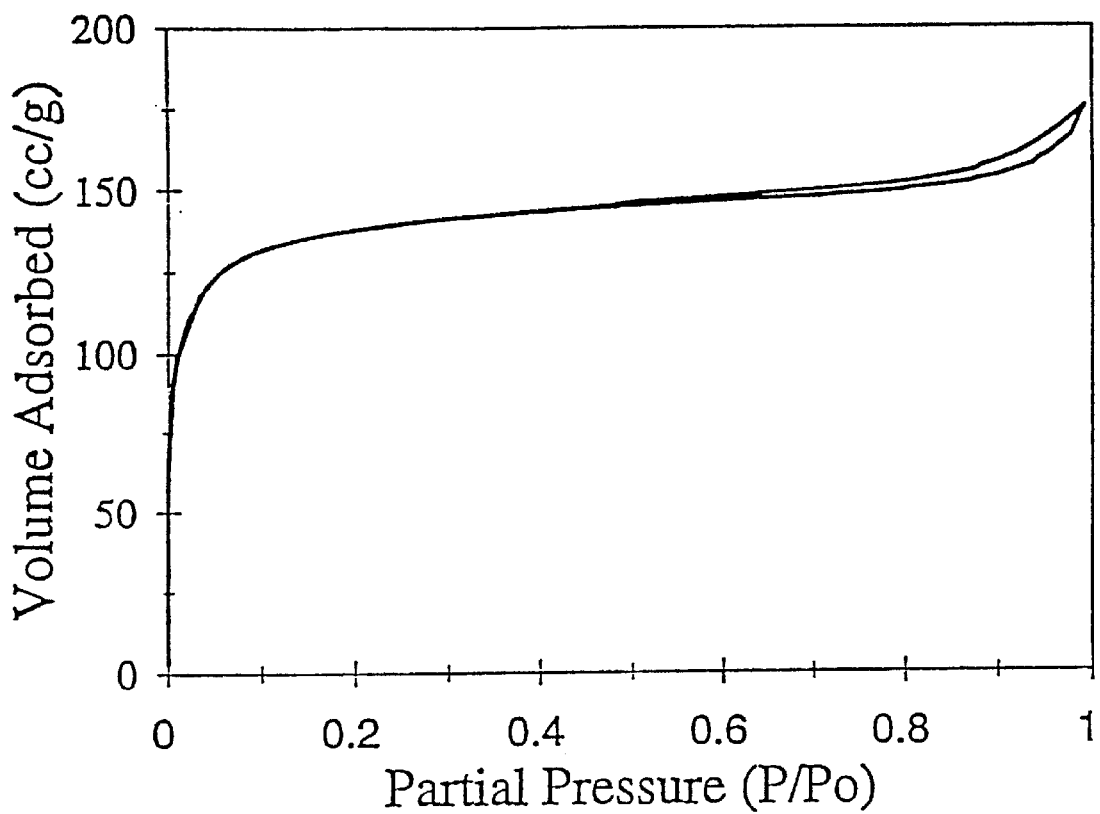
FIG. 10(a) shows $N_2$ adsorption and desorption isotherms of microporous Si-TMS5. The sample was synthesized with a silicon ethoxide:hexylamine molar ratio of 5:1 (by the method of Example 17), aged at room temperature for 48 hours and subjected to template removal by calcination at 500° C. for 2 hours, (b) Pore size distribution of microporous Si-TMS5 derived by applying Horvath-Kawazoe method to a cylindrical pore model.
Figure 10B:
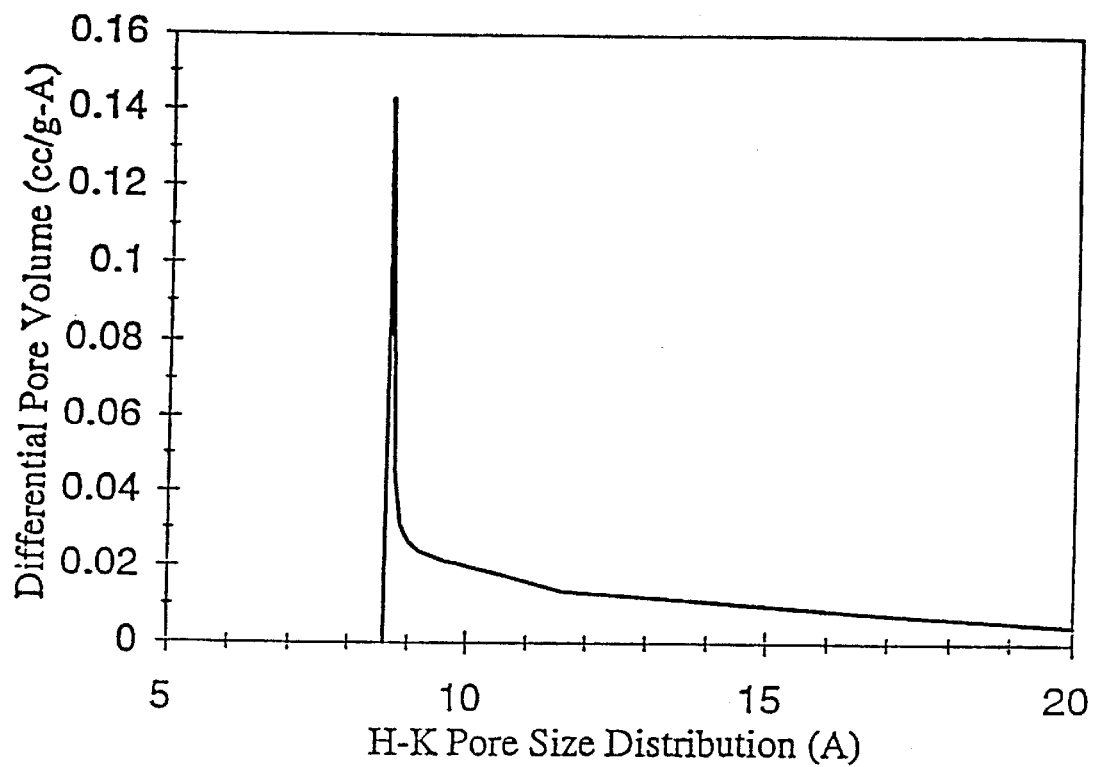

The porous nature of the materials was analyzed by $N_2$ adsorption and desorption. Following the synthesis procedure described in Examples 13 and 17, the as-prepared Nb-TMS5 and Si-TMS5 samples were subjected to template removal by an acidic organic wash and by 500° C. calcination, respectively. The materials obtained were degassed at 150° C. before characterization. The adsorption-desorption isotherms of FIGS. 9(a) and 10(a) illustrate the microporous nature of these oxide samples. The pore size distributions of Nb-TMS5 and Si-TMS5 were obtained by applying the Horvath-Kawazoe method to a cylindrical pore model. Using a templating agent of hexylamine, narrow pore size distributions centered at 7.4 Å and 8.7 Å were obtained for Nb-TMS5 (FIG. 9(b)) and Si-TMS5 (FIG. 10(b)), respectively. We noted that the templating amines captured in the pore structure of Nb-TMS5 were held strongly by the niobium oxides, and could only be removed at 80° C. by treating the nanocomposite powder (an arrangement of blocks of organic and inorganic material in nanometer scale) in an acidic 4:1 mixture of isopropanol and deionized water. Nitric acid was found to be most effective for protonating and dissociating amine templating agents from the niobium oxide network. Isopropanol was used to facilitate the removal of the templating agent during the treatment by enhancing the solubility of the protonated amines in the liquid form.

Transmission electron microscopy (TEM) was also employed to examine the structure of the metal oxides synthesized. $Nb(OC_2H_5)_5$ was first hydrolyzed in water to produce a loosely bound niobium oxide gel to which hexylamine templating agents were added. The resulting nanocomposite was hydrothermally aged at 180° C. for 30 days and dried at room conditions. The microstructure of the Nb-TMS5 material obtained appeared to feature well-aligned planes with detailed texture in the form of discrete bright spots, representing the presence of well packed micropores. Although it is difficult to resolve the exact crystalline phase of the pore packing and the atomic arrangement of metal oxide in the pore walls of these materials by TEM, there were no difficulties in indexing this material to a hexagonal structure by XRD. A similar microstructure was revealed for Ta-TMS5 by TEM.

The materials described herein can be utilized as catalysts in partial oxidation reactions, combustion, $NO_x$ decomposition, hydrodesulfurization, photocatalytic decomposition of organic compounds, absorbants and/or solid acid catalysis, by methods generally known in the art. The material of the invention can also be incorporated into a matrix, such as a matrix derived from alumina, silica, silica-alumina, titania, zirconia, clay or combination thereof. Such a matrix can improve the crush strength of the catalyst. In this embodiment, the matrix material is added to the hexagonally-packed metal oxide mesostructure in colloidal form and then extruded as a bead or pellet. The content of the mesostructure within the matrix generally ranges from about 1 to about 90 weight percent and more particularly from about 2 to about 80 weight percent.

The invention will now be further and specifically described by the following examples. All parts and percentages are by weight unless otherwise stated.

EXAMPLE 1

Ti-TMS1 Preparation by the Aqueous Route

Tetradecyl phosphate (5.20 g, 17.6 mmol) was dissolved in 25 ml of water with KOH (0.49 g, 17.6 mmol) and the pH adjusted to 5.0 with 12.5M HCl. In a separate beaker, titanium isopropoxide (5.0 g, 17.6 mmol) was treated with acetylacetone (0.9 mL, 17.6 mmol). The solution immediately turned yellow and heat was liberated. This solution was cooled and then added to the surfactant solution with vigorous stirring. The resultant thick yellow meringue was then aged at ambient temperature for two hours and then at 80° C. for five days. The resulting fawn powder was collected by filtration, washed with three 100 ml portions of water, and subsequently dried in an oven at 120° C. overnight. This product was calcined at 300° C. in air for twelve hours to remove the surfactant. When calcination was conducted in a pure oxygen atmosphere, a light-off occurs at about 170° C. leading to substantial pore collapse.

The above experiment was repeated except that the surfactant was removed from the product by reflux in EtOH/$H_2O$ at pH 12 for 24 h. Washing the product with water, ethanol, and acetone gives Ti-TMS1 with surface areas in excess of 420 m$^2$/g.

FIG. 1 is XRD (powder X-ray diffraction) data of Ti-TMS1 with a first d-spacing of 32 Å, obtained using a phosphate surfactant with a chain length of 14 carbon atoms.

TEM's of Ti-TMS1 showed the hexagonal array of stacked tubes of approximately 27 Å in pore diameter. The inner walls of this material are approximately 5 Å thick, corresponding to what is expected on the basis of the XRD data.

EXAMPLE 2
Ti-TMS1 Preparation by the Non-aqueous Route

Titanium isopropoxide (5.0 g, 17.6 mmol) and tetradecyl phosphate (5.20 g, 17.6 mmol) were mixed with evolution of heat. After 1 h of stirring at room temperature, methanol (10 ml) was added and the resulting solution was cooled to $-78°$ C. Dilute hydrochloric acid (pH 5, 20 ml) was added dropwise to this suspension. The solution was warmed gradually to room temperature and left at ambient temperature for two hours. After addition of 1.0 g KCl, the solution was heated to 80° C. for five days. The product was similar to that obtained in Example 1.

EXAMPLE 3
Zr-TMS1 and Ce-TMS1 Preparation

Examples 1 and 2 were repeated, except zirconium n-propoxide or cerium isopropoxide were used as the precursor in place of titanium isopropoxide and calcination was carried out at 400° C. in pure oxygen for ten hours.

EXAMPLE 4
Nb-TMS1 and Ta-TMS1 Preparations

Niobium ethoxide (5.0 g, 15.7 mmol) was warmed with tetradecylamine (3.4 g, 15.7 mmol) until a homogeneous yellow solution was obtained (~5 min, 50° C.). To this solution was added 1 g KCl in 25 ml water with the immediate formation of a precipitate. The heavy solid was broken up with a spatula. The solid and supernatant were kept at room temperature for 2 h prior to heating the mixture at 95° C. for five days. The product was collected by suction filtration and washed with three 100 ml portions of water. The solid was then dried at 120° C. for 1 day and calcined in oxygen at 500° C. for 5 h to give stable Nb-TMS1 with a B.E.T. surface area of 61 $m^2/g$.

The experiment was again repeated, except surfactant was removed from the product by refluxing the solid in a mixture of 3:1 EtOH:$H_2O$ ratio and nitric acid at pH below 1 for 24 h. The Nb-TMS1 obtained after washing with water, ethanol and acetone had a surface area in excess of 434 $m^2/g$.

This experiment was repeated except that Ta(OEt)$_5$ was used in place of Nb(OEt)$_5$ resulting in stable Ta-TMS1. For a sample of Ta-TMS1 made with hexadecylamine aged at 150° C., treated for 3 days and then treated with $HNO_3$, the surface area was 380 $m^2/gm$.

Figure 2:
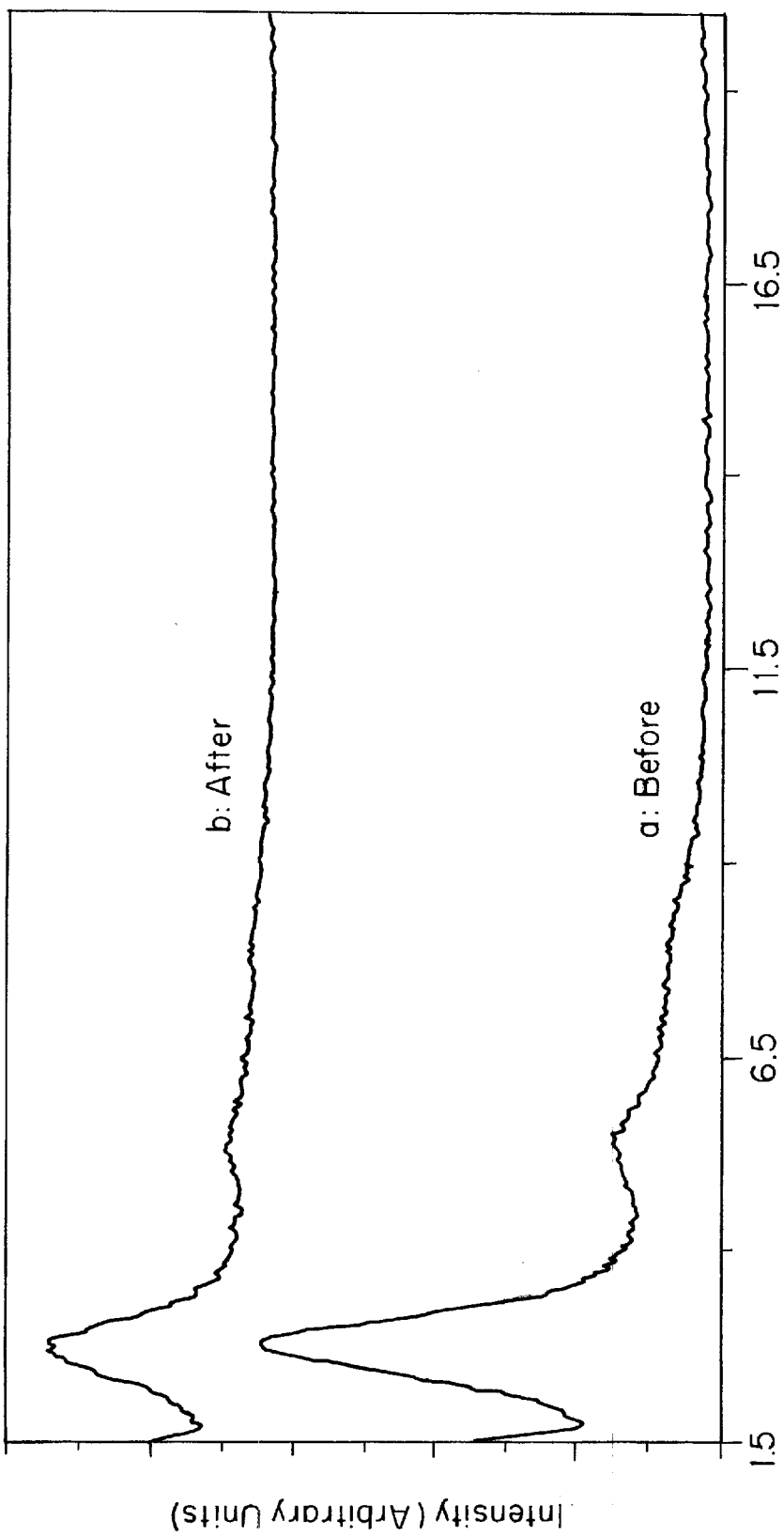
FIG. 2 illustrates the XRD (powder X-ray diffraction) patterns of Nb-TMS1 synthesized with tetradecylamine. The d-spacing for the (100) reflection appears at 31 Å, the secondary (110), (200), and (210) reflections appear between 4° and 7° 2θ, however the (110) and (200) peaks are not well resolved. Pattern (a) represents the result of surfactant removal by calcination. Pattern (b) represents the result of surfactant removal by washing with ethanol/$H_2O$/$HNO_3$ at 40° C. and pH=2.

FIG. 2, pattern a, is an XRD (powder X-ray diffraction) pattern of Nb-TMS1 synthesized with tetradecylamine. This data was recorded on a Siemens D-5000 diffractometer using CuKα radiation and a scintillation detector at 2.2 kW. The d-spacing for the (100) reflection appears at 31 Å, which is slightly smaller than the approximate value of 35 Å observed for as-synthesized MCM-41 made with tetradecyl trimethylammonium bromide, possibly reflecting the greater degree of extension of the trimethylammonium head group over the amine head group for the same surfactant chain length. The secondary (110), (200), and (210) reflections appear between 4° and 7° 2θ as expected, however the (110) and (200) peaks are not well resolved. This effect was observed before in samples of MCM-41 and Ti-doped MCM-41, and has been attributed to the small particle size and/or the regions of local disorder where the nanometer-sized tubes are not stacked in a perfectly hexagonal array.

FIG. 2, pattern b, is an XRD pattern of the same sample of Nb-TMS1 after ethanol/$HNO_3$ washes, which demonstrates that although the peaks are not as intense, the overall hexagonal structure was maintained after successful surfactant removal.

High resolution TEM micrographs of Nb-TMS1 synthesized using tetradecylamine were obtained with a JEOL 200 CX transmission electron microscope operated at 200 kV. Samples were prepared by sonication in isopropanol and suspension on carbon-coated copper grids. The pores were hexagonally packed, with an opening of approximately 27 Å and wall thickness of approximately 8 Å. The sum of these numbers agrees well with the value of 35 Å calculated for the hexagonal repeat distance, $a_o$ ($a_o=2d_{100}/3^{1/2}$), from XRD.

Figure 3A:
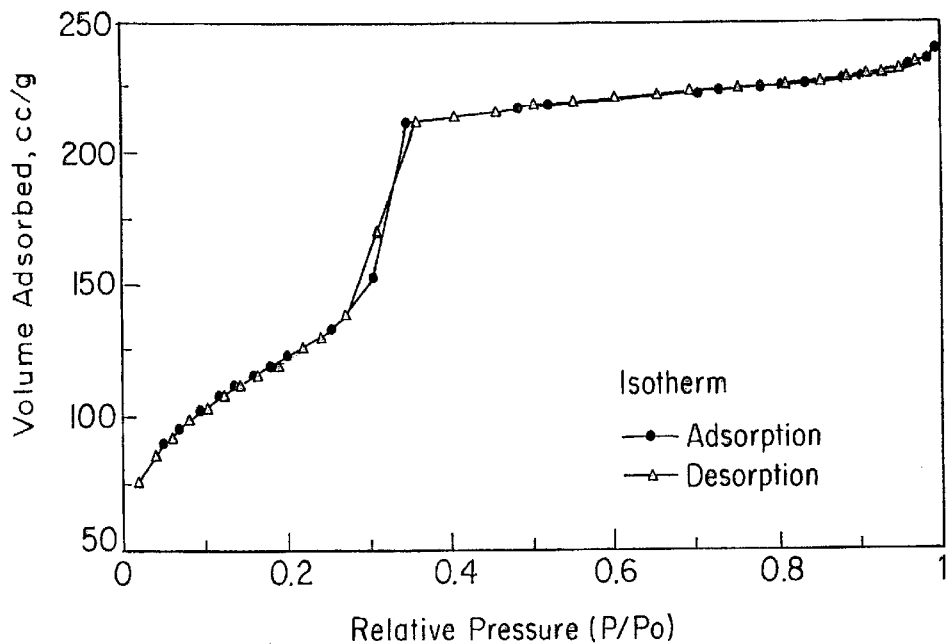
FIG. 3a is the $N_2$ adsorption-desorption isotherms for Nb-TMS1 synthesized with tetradecylamine after surfactant removal. The lack of hysteresis in the isotherms indicates the cylindrical nature of the pores.

FIG. 3a is the $N_2$ adsorption-desorption isotherms for Nb-TMS1 synthesized with tetradecylamine and washed three times with ethanol/$HNO_3$ at 40° C. This data was obtained on a Micromeritics ASAP 2000 Sorption Analyzer using standard procedures. The isotherms display the sharp incline at values of P/Po in the 0.3 to 0.5 range which is typical of the mesoporous materials produced with similar surfactant chain length. The absence of hysteresis also supports the cylindrical nature of the mesopores.

Figure 3B:
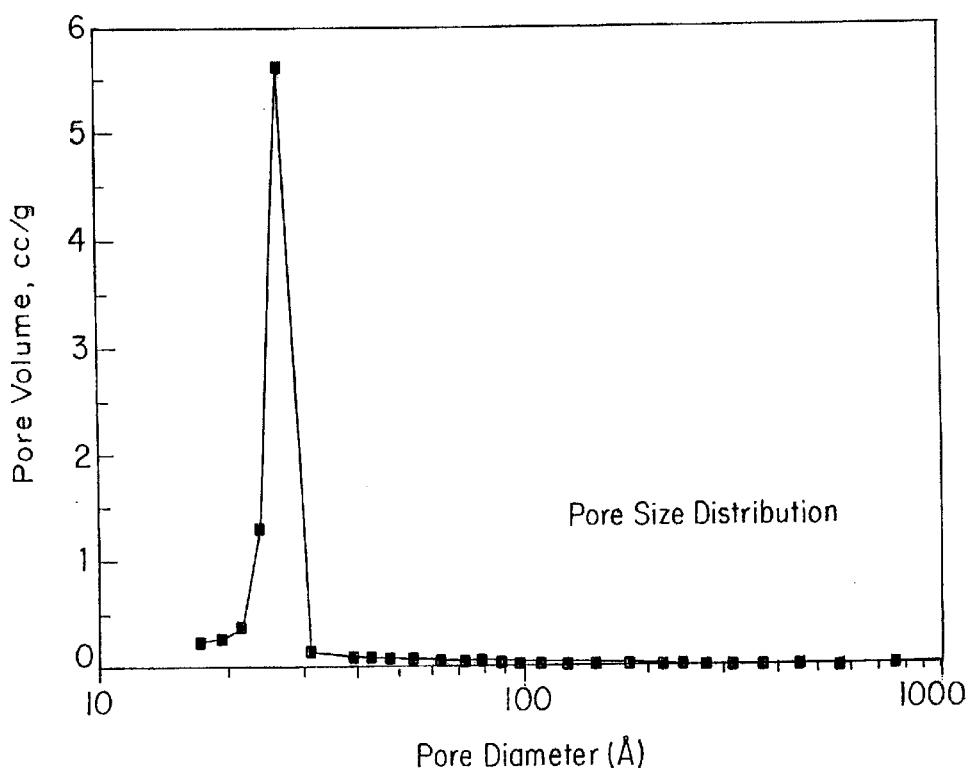
FIG. 3b depicts the pore size distribution of Nb-TMS1, illustrating the narrow pore opening range, centered at 27 Å.

FIG. 3b depicts the pore size distribution of the same Nb-TMS1 sample, illustrating the narrow pore opening range, centered at 27 Å.

EXAMPLE 5
Y-TMS1 Preparation by the Aqueous Route

Yttrium isopropoxide (5.0 g, 18.8 mmol) was dissolved in isopropanol (10 mL) with acetylacetone (1.93 ml, 18.8 mmol). The resulting solution was added to an acidic solution (pH=4.5, HCl) of sodium n-tetradecyl sulfate (5.94 g, 18.8 mmol). The resulting mixture was heated overnight at 70° C., collected by filtration and washed with three 50 ml portions of water. The product was dried in the open at ambient temperature to afford the desired Y-TMS1 with a first d-spacing of approximately 30 Å. The material was not stable at calcination temperatures greater than 200° C.

EXAMPLE 6
Aqueous Preparation Optimization Studies
Synthesis Optimization

A series of 120 experiments were conducted to determine the optimal pH, molar ratio of surfactant, and molar ratio of acetylacetone in the synthesis of Ti-TMS1. The pH was varied in integer steps from 2–6, the acetylacetone-to-Ti ratio was varied from 0–3 in one integer steps, and the surfactant-to-Ti ratio was studied at levels of 1:9, 1:6, 1:4, 1:3, 1:2, and 1:1. In all cases, one parameter was changed while the other two were held constant. The aging temperature and time were held constant at 80° C. and five days, respectively. The weight percent of surfactant used was 7–10% depending on the pH. This slight variation was necessary because the surfactant is less soluble at lower pH and higher ionic strength. In the appropriate weight percent and pH ranges, liquid crystal micelle formation for phosphates of chain length greater than 10 carbon atoms is favored (Cooper *J. Am. Oil. Chem. Soc.* 40:642 (1960)). The quality of the materials was assessed by XRD which elucidates the presence and crystallinity of the hexagonal mesoporous phase in the synthesized materials. The parameters which seemed most critical were the acetylacetone concentration and the surfactant-to-Ti ratio. The effect of the pH was not dramatic in the precursor compositions which favor the formation of mesoporous structures.

Surfactant-to-Ti Ratio Studies

Figure 5:
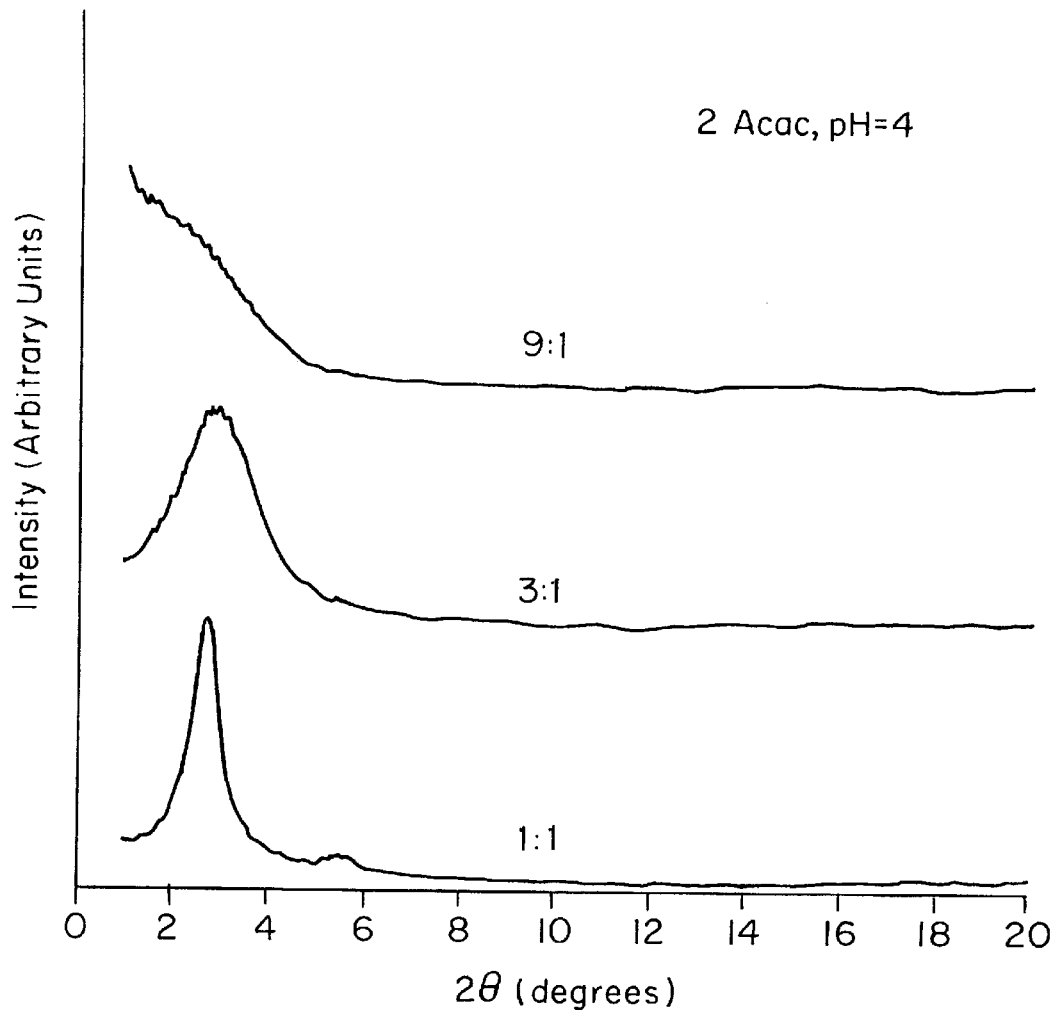
FIG. 5 shows the XRD patterns of Ti-TMS1 synthesized at pH=4 and 2:1 acetylacetone:metal ratio, with varying metal:surfactant ratios.

The optimum surfactant-to-Ti ratio under all conditions examined was 1:1. FIG. 5 shows the XRD patterns obtained for samples synthesized with Ti-to-surfactant ratios of 1:1, 3:1 and 9:1, respectively. Hexagonal structures with poorly defined XRD patterns were obtained for Ti-to-surfactant ratios of 2:1–4:1, while the materials were largely amorphous at 6:1. At 9:1, the surfactant effect was so small that only anatase was observed in all pH and acetylacetone concentrations.

Acetylacetone-to-Ti Ratio Studies

Figure 6:
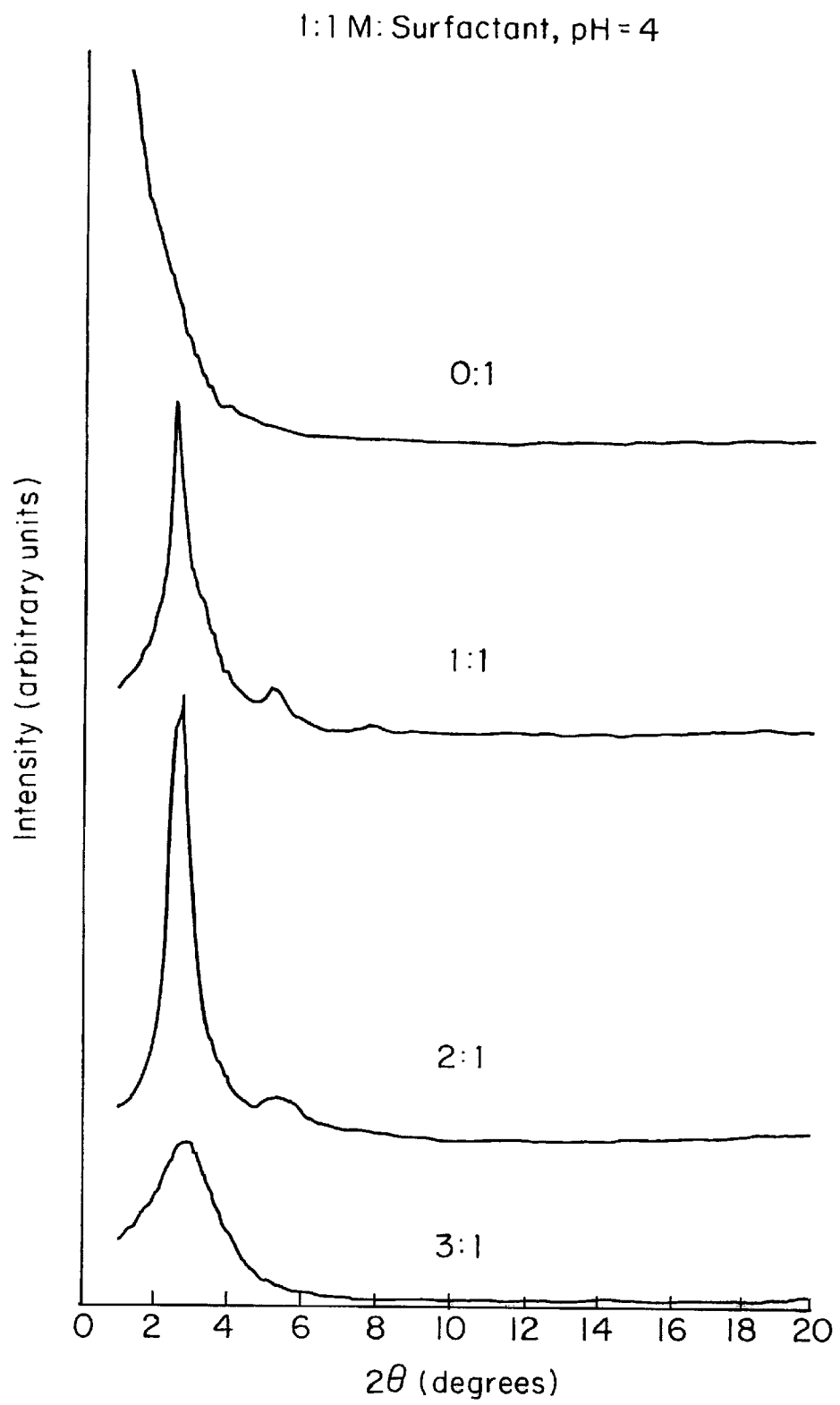
FIG. 6 shows the XRD patterns of Ti-TMS1 synthesized at pH=4 and 1:1 metal alkoxide:surfactant ratio, with varying acetylacetone:metal ratios.

The optimal molar ratio of acetylacetone to Ti was established at 1:1 as shown in FIG. 6. In the absence of acetylacetone only amorphous materials or anatase were formed in all surfactant-to-Ti ratios and pH ranges. With one equivalent of acetylacetone, the results were best at pH of 4–6, while at two equivalents the results were best at pH of 2–3, and the time it took for precipitation of the product increased from <5 minutes to over 1 day. Lower pH was required to complete the hydrolysis when two equivalents of acetylacetone per mol Ti are used. Since the phosphate surfactant was not soluble at pH of less than 3, a higher pH was used with only 1 equivalent of acetylacetone. At three equivalents of acetylacetone, precipitation did not occur.

pH Studies

The alteration of the pH had little effect on the system in acetylacetone and surfactant ratio domains where Ti-TMS1 formation was preferred. The main effect noted was acceleration or deceleration of the hydrolysis process and the requirement of further aging. At very low pH however, there was a tapering off of the product crystallinity. The experiments showed that the best conditions for Ti-TMS1 synthesis was a molar ratio of surfactant-to-Ti of 1:1, a molar ratio of acetylacetone-to-Ti of 1:1, and a pH of 4–6.

Effect of Ionic Medium

It was determined that the addition of potassium chloride to the aging solution greatly accelerated crystallization. In the absence of any KCl, using the diprotic form of the surfactant (pH~2.0 at 10 wt. % in water) only poorly crystalline materials were formed. Addition of one equivalent of KCl to this same mixture gives an XRD pattern similar to that obtained when using the potassium salt of the surfactant at pH 2, where the pH of the mixture was lowered by addition of HCl. Use of sulfuric acid or nitric acid leads to less crystalline products in general. The alkali halide induced crystallization rate enhancement has been noted previously for zeolites (Crea et al. *Proceedings of the Ninth International Zeolite Conference*, Montreal, R. Von Ballmoos et al. Eds., Butterworth and Heinemann, N.Y. (1993)).

EXAMPLE 7

Surfactant Head Group Studies

In order to determine the ideal surfactant head group for the synthesis of Ti-TMS1 and related materials, a series of studies were conducted using $C_{14}$ hydrocarbons functionalized at the terminal position with trimethylammonium, sulfate, carboxylate, phosphate, amine, and actylacetone. Two general approaches were utilized. The first was to dissolve the mono-potassium salt of the anionic surfactant or the bromide salt of tetradecyl trimethylammonium bromide in water at a concentration above the critical micelle concentration (cmc) for that particular system followed by adjustment of the pH and addition of the Ti alkoxide acetylacetonate precursor (the aqueous route). The route was not applicable to the amine and acetylacetone surfactants because of the very low $pK_b$ of the deprotonated form. The second approach involved first mixing the protic form of the anionic or neutral surfactant in ethanol with the Ti alkoxide acetylacetonate precursor (note: although acetoacetonate was not added normally in the non-aqueous approach, it was added in this example for comparison) followed by hydrolysis with water of a preadjusted pH from −78° to room temperature and subsequent aging. This approach was not used for tetradecyl ammonium bromide since it does not have a conjugate acid. Metal alkoxides react quickly with a wide variety of donor ligands. Below is a depiction demonstrating that the head group is chemically bonded to the Ti-alkoxide fragment.

Figure 7:
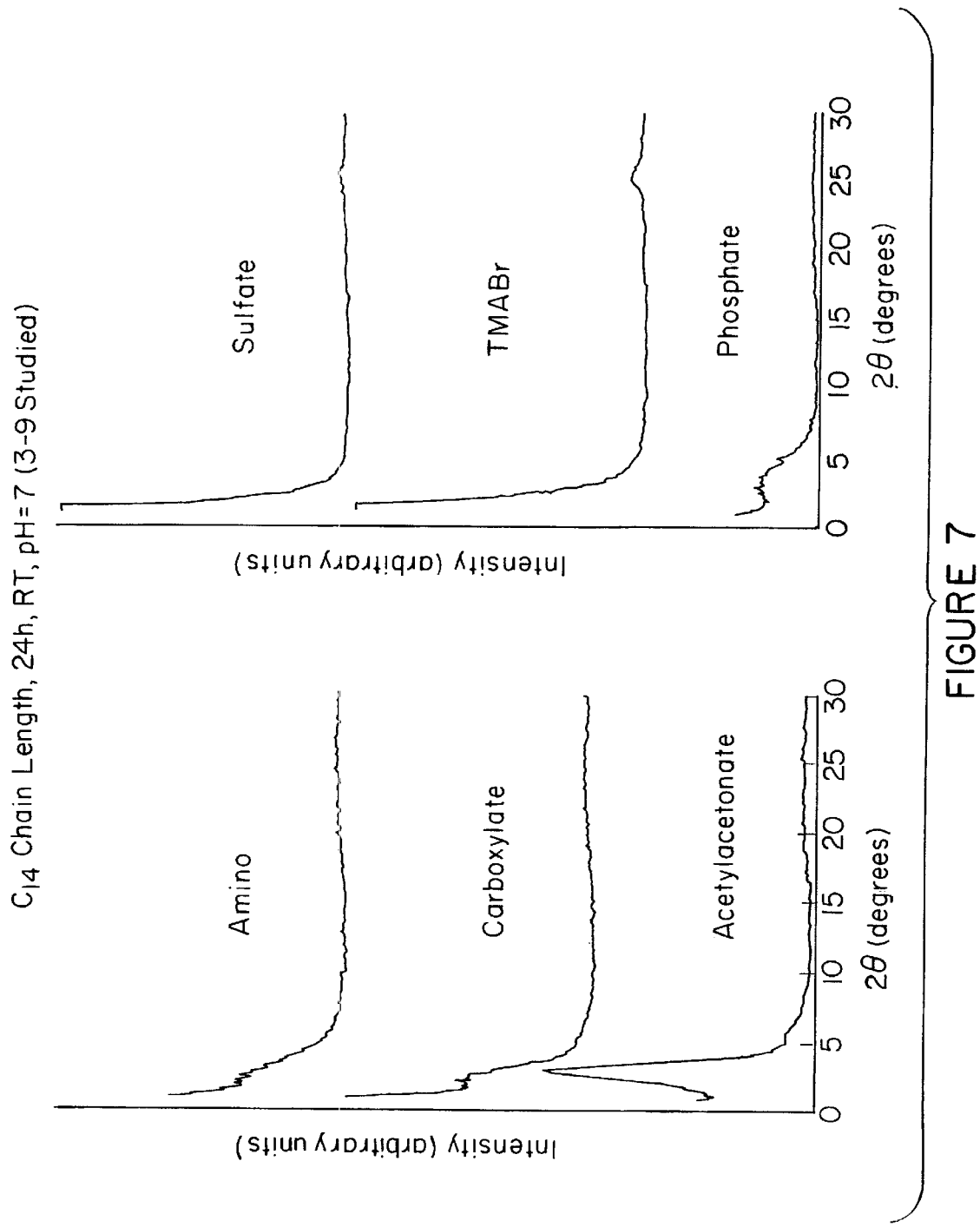
FIG. 7 shows the XRD patterns of Ti-TMS1 synthesized at pH=7 and 1:1 metal alkoxide:surfactant ratio, and 1:1 acetylacetone:metal ratio, with varying $C_{14}$ surfactant head groups.

In general the strength of the resulting metal-ligand interaction decreases according to the trend: acetylactonate>carboxylate>phosphate>sulfate. Amino ligands are difficult to place on this scale because they can form amino, amido, and imido complexes, the stability of which is largely dependent on the metal center and ancillary ligands. In all cases, the surfactant-to-Ti ratio was held at 1:1. The crystallinity of the materials were characterized by XRD, as shown in FIG. 7.

Systems involving tetradecyl trimethyl ammonium bromide or sodium sulfate gave no mesoporous materials at pH ranging from 2–9 using both the room temperature and low temperature routes. The room temperature carboxylate system gave anatase at basic pH and could not be extended to acidic pH because the surfactant was not very soluble under those conditions. Using the low temperature route, however, low-crystallinity hexagonal materials were isolated at room temperature from pH 4–7. Further aging at 80° C. led to phase separation and isolation of amorphous materials.

The acetylacetonate-functionalized surfactant (3-tetradecyl-2,5-pentanedione) worked the best in the series studied using the low temperature route, giving materials with broadened hexagonal patterns at room temperature. Further heating led to leaching away of the insoluble surfactant as a separate phase on top of the water layer. Since neither the carboxylate nor acetylacetonate surfactants are soluble in water to any degree, the equilibrium between the aqueous form and the unsolvated form of the surfactant lies heavily in favor of the latter, drawing the surfactant out of the system into a separate phase on the surface of the supernatant. In accordance with the low solubility of the surfactant and LeChatlier's principle, the organic is leached out of the biphasic liquid crystal micelles.

Potassium hydrogen tetradecyl phosphate works almost as well as tetradecyl acetylacetone in the low-temperature preparation, but vastly surpasses it during the aging process. While acetylacetone is a much better ligand to Ti than phosphate (Johansson, *Coord. Chem. Rev.* 12:241 (1974)), the fact that the phosphate surfactant is soluble at pH 2–12 makes it possible to age these materials without phase separation induced surfactant loss from the liquid crystal phase. The materials produced by the low temperature route are identical to those obtained using the room temperature aqueous surfactant route as long as KCl is added to the mixture after warming to room temperature. The quality of the materials obtained using the low temperature route without any further aging follow the trend of the head group's donor abilities listed above, i.e. acetylacetonate>carboxylate>phosphate. Further aging, however, favors the phosphate system, presumably because of solubility of the free surfactant in the supernatant.

The amine surfactant works extremely well for the low-temperature synthesis of Nb-TMS1 and Ta-TMS1 at neutral pH using $M(OEt)_5$ (M=Nb, Ta) as a precursor. However, it leads only to amorphous materials in the case of titanium.

In summary, the preferred synthesis conditions for Ti-TMS1 involve either: a) the prior addition of tetradecyl phosphate to titanium acetylacetonate tris-isopropoxide, followed by hydrolysis from −78° C. to 80° C. at pH 4–6 at a 1:1 surfactant-to-Ti ratio in the presence of 1 equivalent of KCl, or b) the addition of titanium acetylacetonate tris-isopropoxide to a 10 weight % solution of the monopotassium salt of the surfactant at pH 4–6 followed by aging at 80° C. for several days.

EXAMPLE 8

Aging Studies

In a series of experiments, it was found that the Ti-TMS1 materials isolated at room temperature generally had broad humps at around 2° 2θ in the XRD. This is also observed in the synthesis of MCM-41 (Chen et al., *Micropor. Mater.* 2:27 (1993)) and has been attributed to low hexagonal order of the nano-tubes. When the temperature was increased over 100° C., transformation of the structure into first amorphous material and finally anatase was observed. Similar transformation of hexagonal mesoporous structures has been noted for MCM-41, however it occurs at temperatures in excess of 150° C., leading to zeolitic phases whereby the surfactant is believed to have curled up inside a microporous cavity (Beck et al., *Chem. Mater.* 6:1816 (1994)).

EXAMPLE 9

Doping with Another Alkoxide $Nb(OEt)_5$ (4.5 g, 0.0141 mol) was warmed to 60° C. with octadecylamine (4.22 g, 0.0157 mol) and vanadium oxide isopropoxide (0.380 g, 0.0016 mol) for ten minutes. The resulting yellow oil was cooled to ambient temperature and then water (25 ml) was added with stirring, causing the immediate precipitation of an off-white mass. This mixture was left at ambient temperature overnight and then aged at 80° C. for 1 day and 150° C. for five days. The resulting beige solid was collected by filtration and washed with two fifty ml portions each of water, acetone, and ether to give a sample of 10 mol % $V_2O_5$-doped Nb-TMS1 with a (100) peak at a XRD d-spacing of 38 Å. The surfactant was removed as described in previous examples.

EXAMPLE 10

Doping with Metal Salts $Nb(OEt)_5$ (4.5 g, 0.0141 mol) was warmed to 60° C. with octadecylamine (4.22 g, 0.0157 mol) for ten minutes and then cooled to ambient temperature. To this oil was added a solution of $AuCl_3$ (0.120 g, 0.0016 mol) in water (25 ml), causing the immediate precipitation of a white solid. This mixture was left overnight at ambient temperature and then aged at 80° C. for 5 days to give a deep maroon solid which was collected by filtration and washed with two fifty ml portions each of water, acetone, and ether. The resulting 10% $Au_2O_3$-doped Nb-TMS1 displayed the d-spacing for the (100) peak in the XRD at 38 Å. The surfactant was removed as described in other examples.

EXAMPLE 11

Swelling Agents $Nb(OEt)_5$ (5.0 g, 0.0157 mol) was warmed to 60° C. with octadecylamine (4.22 g, 0.0157 mol) and mesitylene (3.0 g, 0.0250 mol) for ten minutes. The resulting solution was then cooled to ambient temperature and water (25 ml) was added with stirring. At this point a white solid mass separated from the solution. The mixture was left overnight at ambient temperature and then aged with addition of 1.0 g KCl for 1 day at 80° C. followed by five days at 150° C. The resulting solid was collected by filtration and washed with two fifty ml portions each of water, acetone, and ether. The material thus synthesized has a (100) peak at a d-spacing of 55 Å as recorded by XRD. The surfactant was removed as described in previous examples. Without the addition of mesitylene swelling agent, the d-spacing of the product would have been 38 Å.

EXAMPLE 12

A typical route for synthesizing microporous metal oxides is described as follows. Two grams of niobium ethoxide, $Nb(OC_2H_5)_5$, was directly mixed with 0.6 grams of hexylamine at ambient conditions to prepare an organic-inorganic nanocomposite. Fourteen grams of deionized water was then added to the nanocomposite with stirring to produce a loosely bounded niobium oxide network surrounding a supermolecular template. Immediate precipitation was observed following the addition of water. The suspension was continuously stirred at room temperature for 2 hours before being hydrothermally aged at 180° C. for 2 to 30 days. (The term "hydrothermally," as used herein, means the material was heated in a sealed vessel in an aqueous environment, whereby pressure develops in the sealed vessel.) The aged product was recovered by filtration, washed with water, ethanol and acetone, and then dried at ambient conditions. The organic templating agent could be removed by stirring 0.5 grams of the nanocomposite for 24 hours at 80° C. in 500 mL of a 4:1 isopropanol-water mixture, with a pH of 0.5–1.5 adjusted by nitric acid addition. The resulting material was then washed with water and ethanol before drying. The microporous niobium oxide thus obtained was designated Nb-TMS5 and had a pore size of 7.4 Å.

Other microporous oxide systems can be prepared following a similar procedure. Selection of organic templating agent, molar ratio of alkoxide to templating agent, sol pH, aging conditions, and the surfactant removal procedure may need to be adjusted to optimize the crystallinity of the final products. The aging temperature could be varied from ambient to 180° C. and the aging period needed for crystallizing stable mesostructures can range from 2 hours to months. For example, in the synthesis of microporous tantalum oxide (Ta-TMS5), 2 grams of tantalum ethoxide, $Ta(OC_2H_5)_5$, was mixed directly with 0.37 grams of hexylamine at ambient conditions to prepare an organic-inorganic nanocomposite. Twenty two grams of deionized water was then added to the nanocomposite with stirring to produce a loosely-bounded tantalum oxide network surrounding the organic supermolecular template. Immediate precipitation was observed following the addition of water. The suspension was aged under the desired conditions, washed with water, ethanol, and acetone, and then dried at ambient conditions. The organic templating agent could be removed by stirring the nanocomposite in ethanol for 12 hours at 80° C.

EXAMPLE 13

An alternative route was also developed for the synthesis of TMS5 using a freshly prepared and loosely bound metal oxide gel as metal precursors. Three grams of niobium ethoxide, $Nb(OC_2H_5)_5$, was first hydrolyzed in 41 grams of deionized water to prepare a suspension consisting of loosely bound niobium oxide gel, following which 0.96 grams of hexylamine was added with stirring. The resulting nanocomposite was then stirred at room temperature for 2 hours before it was hydrothermally aged at the desired temperature of 180° C. for 7 days. The aged product was recovered and subjected to surfactant removal as described in Example 12 for the first route.

EXAMPLE 14

Beside hexylamine, alkyl amines of carbon atom chain lengths of about three to twenty, can also be used in the supermolecular templating approach described in Examples 12 and 13. This provides a flexible basis for tailoring the pore size in a range of between about 3 Å to about 50 Å. For example, 2 grams of niobium ethoxide was mixed with 27 grams of deionized water at ambient conditions for 2 hours to prepare a loosely bound niobium oxide gel to which was added 0.34 g of butylamine. The gel solution which was generated was stirred at room temperature for 2 hours prior to subjecting the material to hydrothermal treatment at 180° C. for 4 days. Similarly, 0.42 grams of amylamine, 0.48 grams of hexylamine or 0.54 gram of heptylamine was used in place of 0.34 grams of butylamine to prepare Nb-TMS5.

EXAMPLE 15

Beside mono-amines, diamines can be used in the supermolecular templating approach described in Examples 12 and 13. For a given hydrocarbon chain length, a diamine give rise to a smaller pore size than a mono-amine. This is most likely due to the folding of the molecule such that both amine heads interact with the inorganic oxide precursor. Alkyl diamines of a carbon atom chain length of between about three and 20 carbon atoms can be used in the synthesis of mesoporous oxides to enable flexible tailoring of the pore size in a range of about 3 Å to about 30 Å For example, 0.42 grams of 1,7-diaminoheptane were dissolved in 3 mL of ethanol followed by the addition of 2 grams of niobium ethoxide to this surfactant solution to prepare a niobium surfactant complex solution. This complex was hydrolyzed in 27 grams of deionized water at ambient conditions for 2 hours and then hydrothermally crystallized at 180° C. for 4 days. Similarly, 0.46 g of 1,8-diaminooctane, 0.55 g of 1,10-diaminodecane or 0.64 grams of 1,2-diaminododecane was used in place of 0.42 grams of 1,7-diaminoheptane to prepare Nb-TMS6.

EXAMPLE 16

Beside linear alkyl amines, bulky adamantanamine was also employed in the supermolecular templating synthesis of microporous metal oxides. A typical preparation is described as follows. 3.8 grams of adamantanamine solids was dissolved in 10 mL of ethanol at 80° C. The resulting clear solution was then cooled to ambient conditions before 8 grams of niobium ethoxide was added to produce a self-assembled organic-inorganic nanocomposite solution. 56 grams of deionized water was subsequently introduced to the solution with stirring to hydrolyze the niobium ethoxide. Immediate precipitation was observed on hydrolysis of the alkoxide precursor and the suspension was subjected to aging under hydrothermal conditions at 180° C. for 4 days. The solid sample was recovered by filtering the suspension and washed with ethanol and water to remove any physically adsorbed organic templating agents on the external surface of the particles.

EXAMPLE 17

Microporous silica can also be prepared by the supermolecular templating approach. 4 grams of $Si(OC_2H_5)_4$ was mixed with 0.97 grams of hexylamine at ambient conditions, followed by addition of 42 mL of deionized water, producing an aqueous suspension. After aging at ambient conditions with stirring for 1 to 2 days, the precipitate was collected by filtration. It was then subjected to washing with water and dried overnight at 120° C. Besides alkyl amines, adamantanamine (Aldrich Chemical Co.) could also be used in this approach as a templating agent. The templating molecules were removed by calcination in air at 500° C. for 2 hours.

EXAMPLE 18

Figure 22:
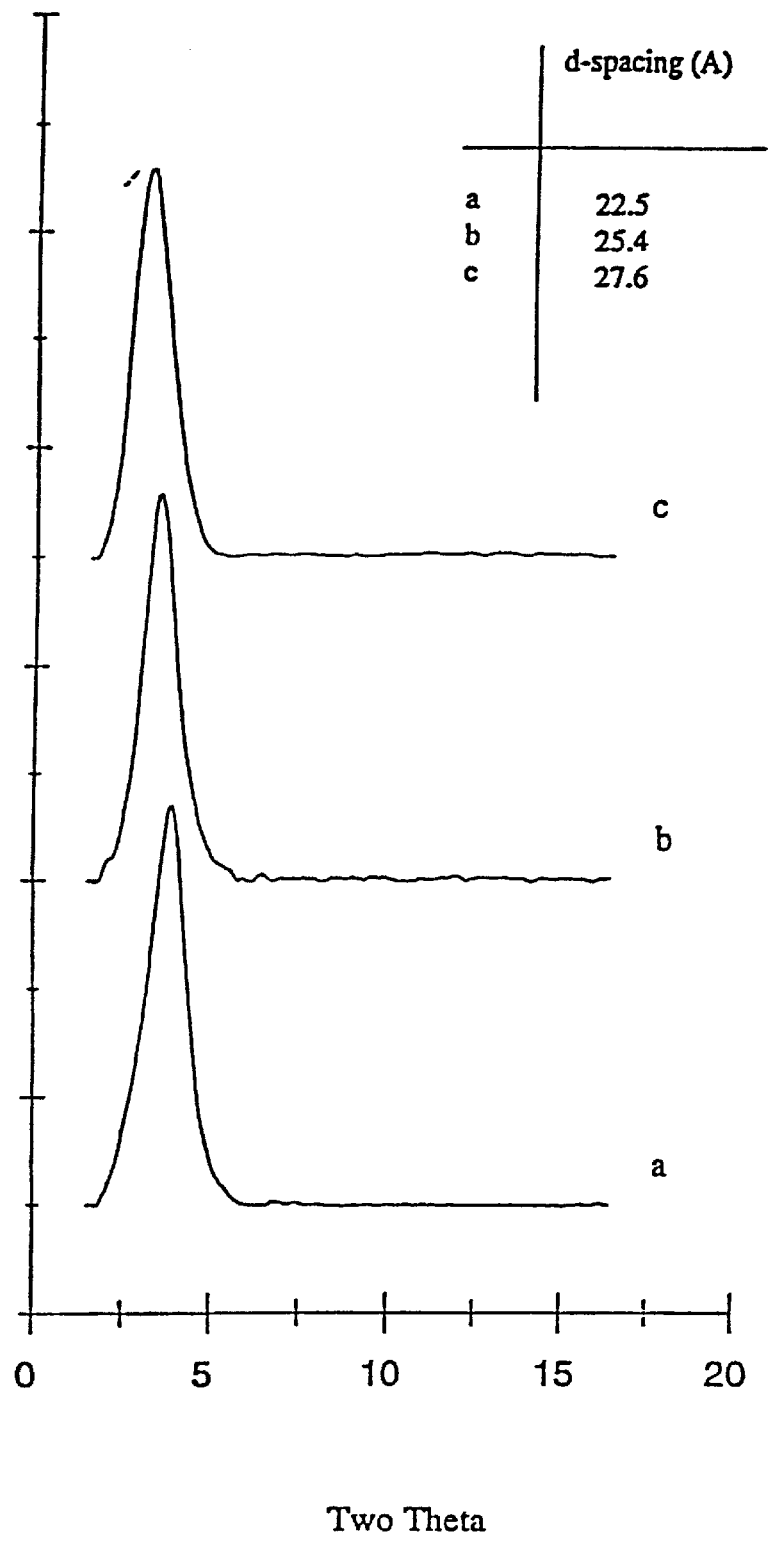
FIG. 22 shows XRD patterns of as-prepared Si-TMS5 synthesized with (a) $Si(OC_2H_5)_4$, (b) $Si(i-OC_3H_7)_4$, and (c) $Si(OC_4H_9)_4$. The samples were prepared with a Si:hexylamine ratio of 5:1 and aged at room temperature for 48 hours (see synthesis of Example 18).

The pore size of the metal oxides synthesized by the supermolecular templating approach can be varied not only by changing the size of the templating agent, but also by using different metal oxide precursors. Silicon ethoxide, isopropoxide and butoxide were used as metal precursors for the synthesis of microporous silicon oxides (as described in Example 17). The X-ray diffraction d-spacing of the silica-amine nanocomposite derived was found to increase with the chain length of the alkoxy group as shown in FIG. 22.

EXAMPLE 19

Phosphate acids having carbon atom chain lengths between three and twenty carbon atoms can be used in place of alkyl amines in the templating synthesis of porous oxides of a wide range of pore sizes. This can be applied to various different metal oxide systems. For example, in preparing a nanocomposite of vanadium oxide and organic molecules, 0.5 grams of $VOSO_4$ was dissolved in 10 mL of deionized water and then mixed with 0.29 grams of $C_3H_7OPO_2H$ at ambient conditions for 2 hours. The resulting gel was subjected to aging at 96° C. for 2 days. The powdery precipitates were then recovered by filtration, washed with water and ethanol and air dried.

EXAMPLE 20

Swelling agents, such as mesitylene and cyclohexane, could be used in conjunction with the organic templating molecules to expand the pore size of the oxide materials derived. For example, 1 gram of $Si(OC_2H_5)_4$, 0.1 gram of hexylamine, 11 g of deionized water and 0.12 grams of mesitylene were mixed by stirring the mixture at ambient conditions for 2 days. The resulting suspension was aged at ambient conditions with stirring for 48 hours and the precipitate was collected by filtration. This synthesis provides a method for obtaining mesoporous materials with pore sizes as large as 200 Å.

EXAMPLE 21

To 0.54 grams of N-methylhexylamine was added 2 grams of niobium ethoxide at room temperature followed by 27 grams of deionized water with immediate formation of gel. The gel was aged at room temperature for 2 hours before being hydrothermally treated at 180° C. for 4 days. Similarly, 0.61 grams of N,N-dimethylhexylamine was used in place of N-methylhexylamine to prepare Nb-TMS5.

EXAMPLE 22

To 1 gram of tantalum ethoxide was added 0.37 grams of hexylamine followed by 21 grams of deionized water at ambient conditions. The resultant gel was aged at ambient conditions for 2 hours. Sufficient hydrochloric acid was added to adjust the pH of the mixture to a pH of 3. The acidified mixture was stirred for 2 hours prior to hydrothermal treatment at 180° C. for 4 days. Similarly, samples were prepared at pH 5, 7, 11 and 13 by the addition of a sufficient quantity of hydrochloric acid or ammonium hydroxide.

Characterization

Powder X-ray diffraction (XRD) patterns of the products were recorded on a Siemens D5000 diffractometer using CuK$\alpha$ radiation at 2.2 kW and a scintillation detector. The samples were scanned from 1.5° to 20° (2θ) in steps of 0.04°. Narrow incident and diffracted beam slits were used to protect the detector from the high energy of the incident X-ray beam and to obtain a better resolution on low angle peaks.

The surface area and pore size distribution of the mesoporous metal oxides were characterized by a nitrogen adsorption-desorption analysis on a Micromeritics ASAP 2010 unit. Prior to analysis, all samples were degassed at 150° C. under vacuum. To better characterize the mesoporous structure of the materials, only 0.5 mL doses of nitrogen gas were introduced in the low pressure range at 2-hour intervals. The long interval was used to ensure that the equilibration surface coverage was reached.

The weight percentage of the organic templating agents in the mesoporous metal oxides was analyzed by thermogravimetric analysis (TGA) using a Perkin Elmer TGA7. Each sample was purged with nitrogen for 1 hour at 25° C. prior to analysis. Weight loss measurements between 25 and 500° C. were performed at a programmed heating rate of 5° C./min under nitrogen.

Raman spectra of some of the liquid and solid samples were collected with a Bio-Rad Fourier-transform Raman spectrometer. The excitation source was a Nd-YAG laser operated at 1064 nm with an input power of 60 mW. The signal was detected with a liquid nitrogen-cooled Ge detector.

Photoacoustic Fourier-transform infrared (PA-FTIR) spectra of the liquid and solid samples were obtained with a MTEC Model 200 photoacousticcell on a Bio-Rad FTS-60A spectrometer. The spectra were collected using 2.5 kHz rapid scans at 4 $cm^{-1}$ resolution.

The Effect of the Metal/Templating Agent ratio

In the synthesis of mesoporous metal oxides, such as Nb-TMS5, increasing the ratio of organic templating agent (i.e. surfactant) to metal precursor from 0.3 to 2 led to the formation of different liquid crystalline phases; hexagonal, cubic and lamellar mesostructures. Such a structure variation was attributed to the change in charge matching equilibration between metal precursors and surfactant species in the synthesis solution.

Figure 12:
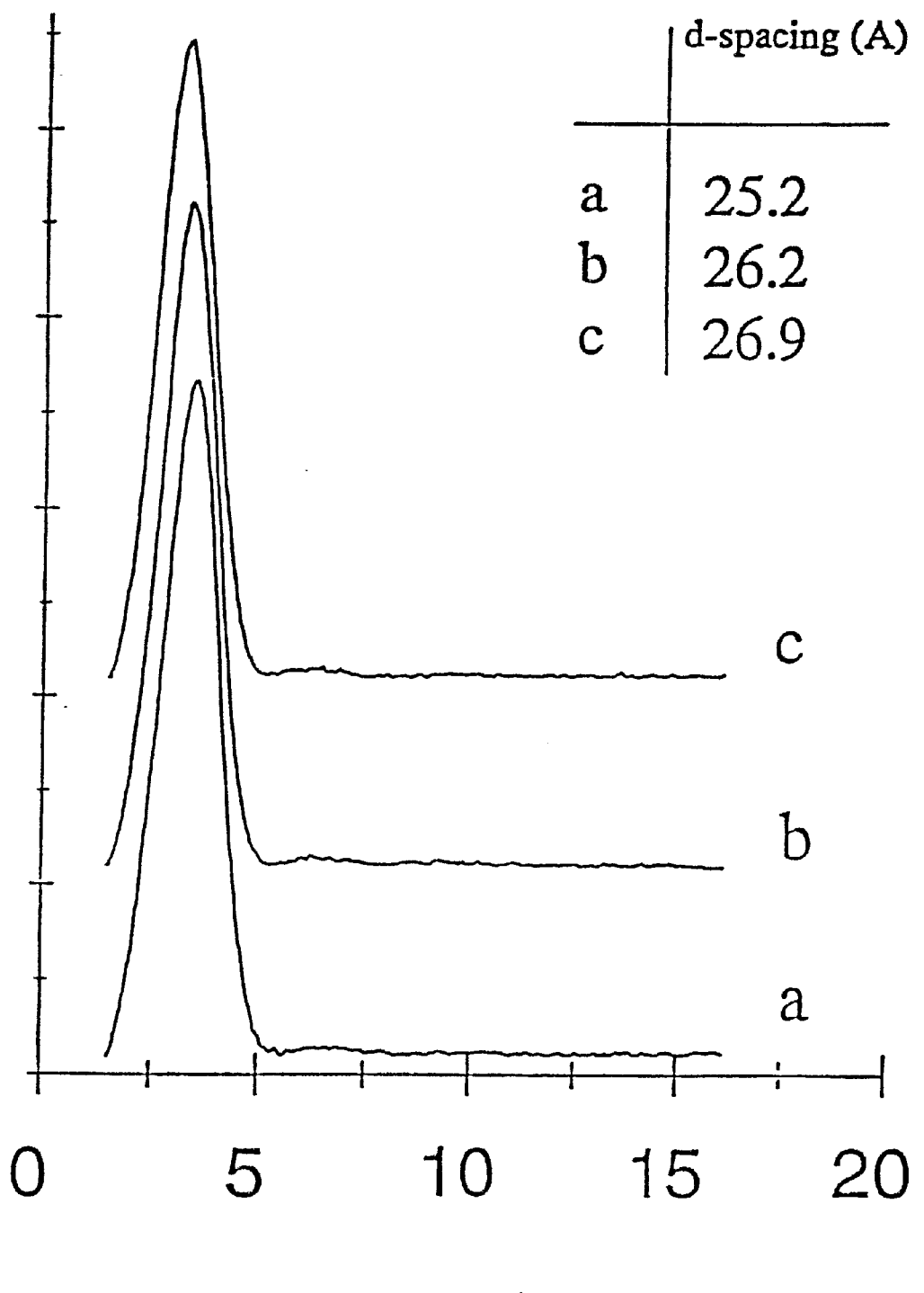
FIG. 12 shows XRD patterns of as-prepared Ta-TMS5 synthesized with a tantalum ethoxide:hexylamine molar ratio of (a) 1:1, (b) 0.75:1 and (c) 0.5:1. The samples were aged at 180° C. for 7 days (see synthesis of Example 12).

In the present syntheses of microporous transition metal oxides (Examples 12 and 13), the ratio of metal to hexylamine was found to have no effect on the crystalline phase of the final products. As shown in XRD patterns of Ta-TMS5 in FIG. 12, there was negligible change in the d-spacing and no change in crystalline phase when the Ta-to-hexylamine molar ratio was decreased from 1 to 0.5. A similar phenomenon was observed in the synthesis of microporous Nb-TMS5.

Figure 13:
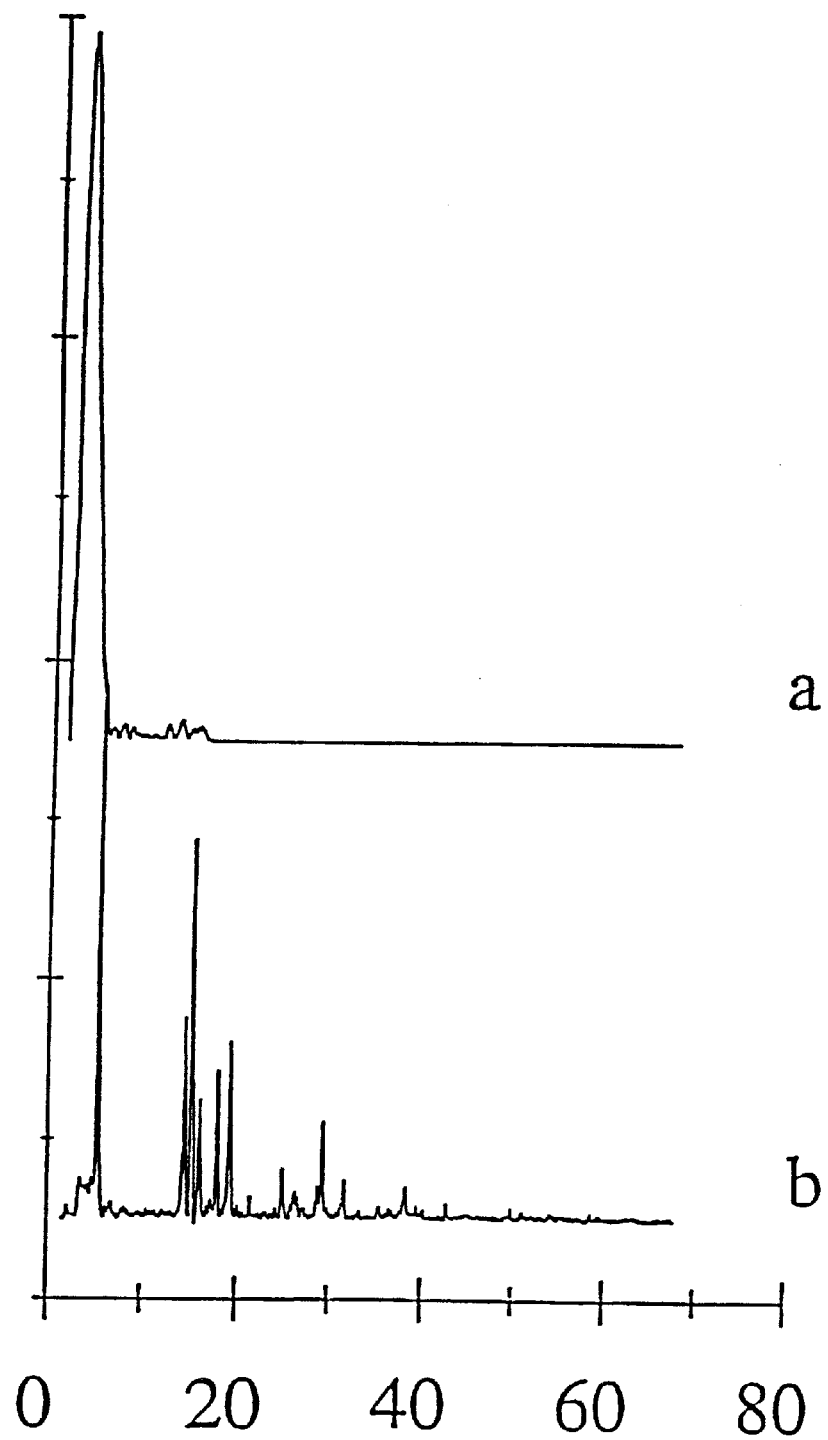
FIG. 13 shows XRD patterns of as-prepared microporous silica synthesized with a Si:adamantanamine molar ratio of (a) 5 (Si-TMS5) and (b) 2.5 (Si-TMS7). Both samples were aged at room temperature for 48 hours (see synthesis of Example 17).
Figure 14:
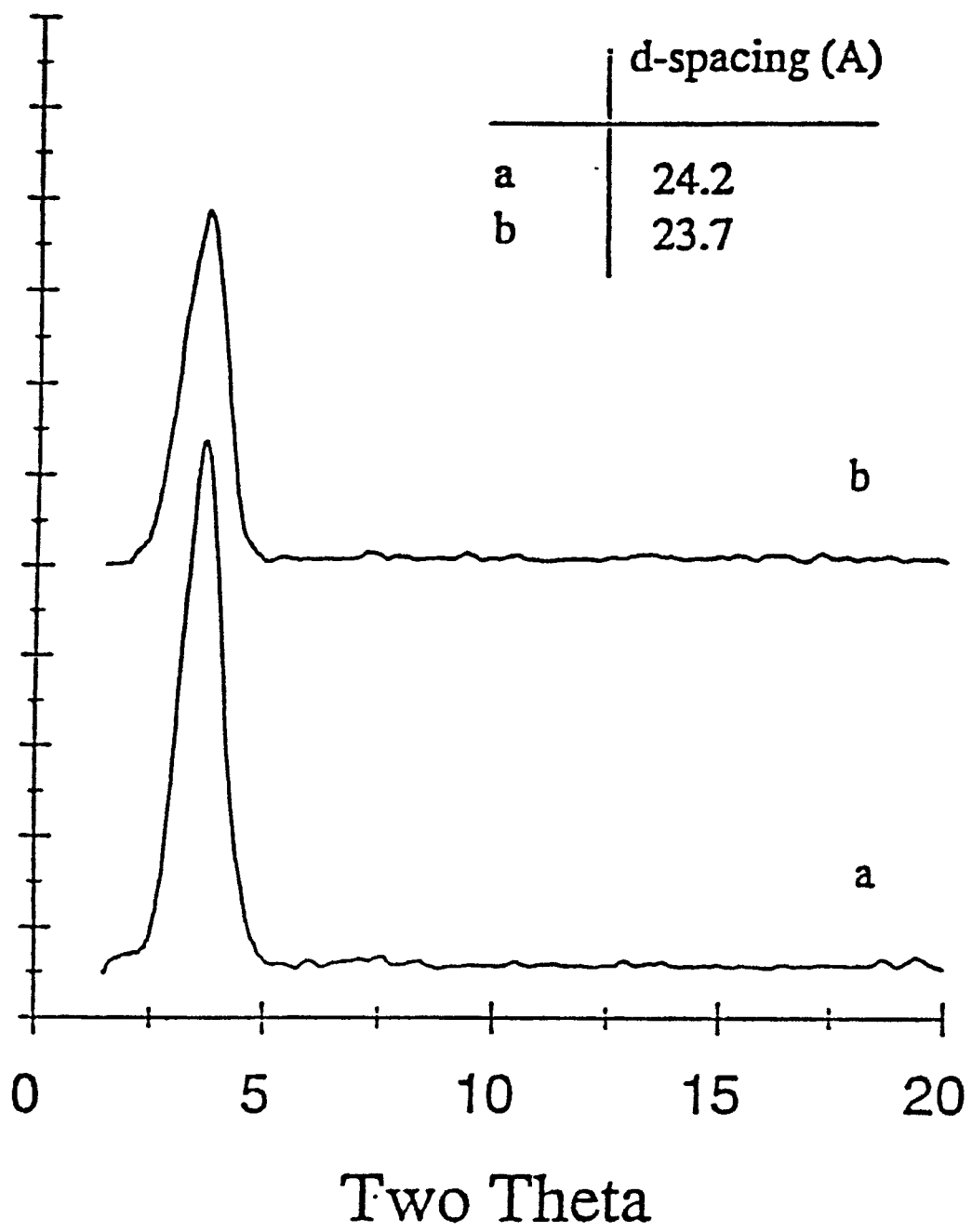
FIG. 14 shows XRD patterns of as-prepared Si-TMS5 synthesized with a Si:hexylamine ratio of (a) 5:1 and (b) 1:1. Both samples were aged at room temperature for 48 hours (see synthesis of Example 17).

For silica-based microporous materials, a hexagonally-packed TMS5 phase (FIG. 13($a$)) was obtained when the molar ratio of Si to adamantanamine was greater than 2.5. As the ratio was decreased to 2.5 and lower, a new highly crystalline TMS7 phase was obtained (FIG. 13($b$)). In contrast, using straight chain amine templating agents, the TMS5 phase was always obtained as the Si-to-amine ratio was varied between 1 and 5 (FIG. 14). It was noted that the optimal Si:amine ratio for Si-TMS5 formation was between 1 and 5, a value much larger than the optimal metal:amine ratio of 0.75 to 1.25 for Ta-TMS5, Nb-TMS5, Ti-TMS5 formation. A possible explanation for such a high metal:hexylamine ratio requirement in Si-TMS5 synthesis is that the silicon alkoxide precursors are present in polymer form (e.g. tetramer or pentamers) in the partially hydrolyzed gel. Some of these polymers could be directly incorporated into the wall of the inorganic oxide framework while others remained solubilized in the aqueous medium.

The Effect of the Hydrothermal Aging Temperature

For a given oxide composition, the aging temperature represents a critical processing parameter that governs the crystalline phase formation of an organic-inorganic nanocomposite. Temperature can also affect the kinetics of the gel condensation and the oxide crystallization processes.

Figure 15:
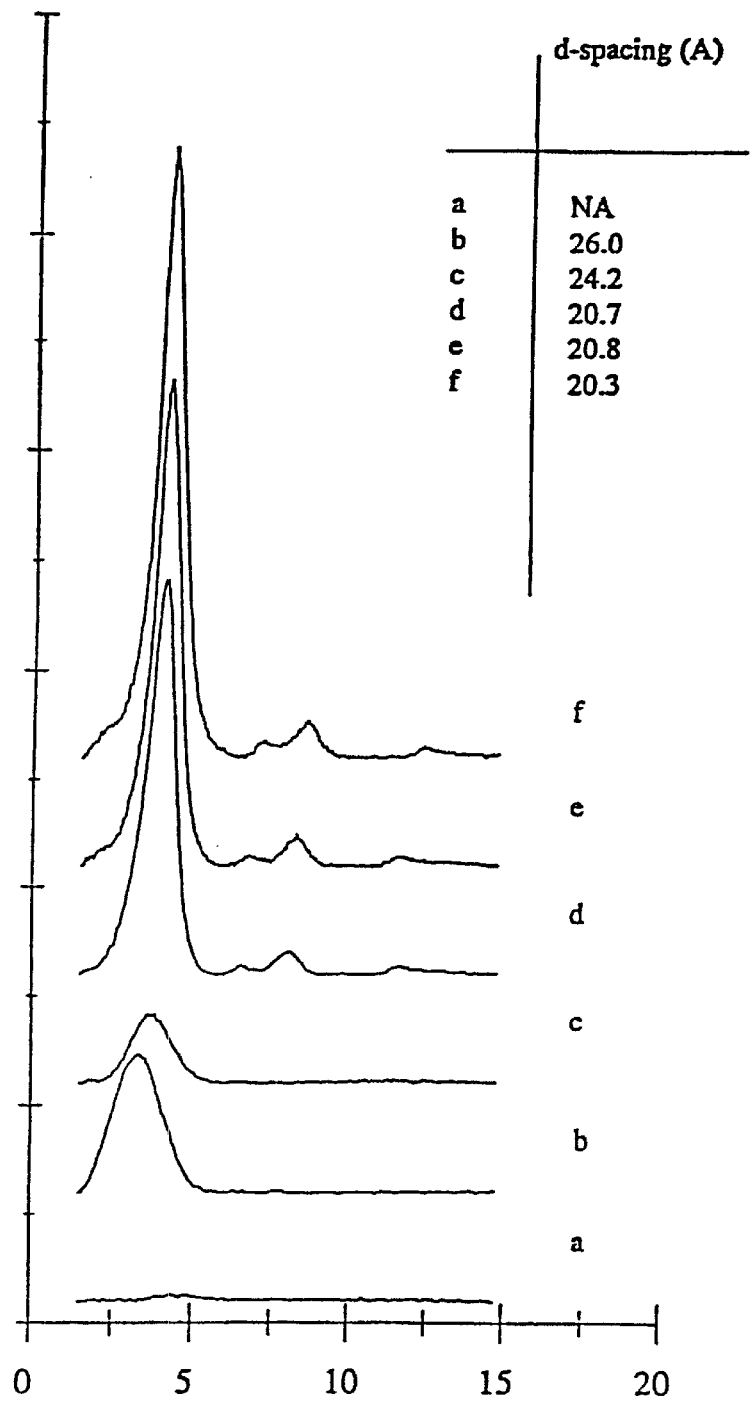
FIG. 15 shows XRD patterns of as-prepared niobium oxide samples derived from hydrolysis of $Nb(OC_2H_5)_5$ without amine templating agent (a) and with subsequent hexylamine addition (b)–(f). The samples were analyzed after subjecting each to different aging conditions (a) and (b) at 25° C. for 24 hours, (c) 96° C. for 24 hours, (d) 180° C. for 24 hours, (e) 180° C. for 48 hours and (f) 180° C. for 96 hours. The samples in (b)–(f) were prepared with a Nb:hexylamine molar ratio of 1:0.75 (see synthesis of Example 13).

FIGS. 15($b$)–($f$) illustrate the XRD patterns of niobium oxide-hexylamine nanocomposites derived using different aging temperatures. For comparison, a product prepared by direct hydrolysis of niobium ethoxide in the absence of an amine templating agent is shown in FIG. 15($a$). As expected, the material derived without a templating agent was amorphous, with no distinct XRD peaks in the 2θ range of 1.5° to 15°. When hexylamine was introduced to the amorphous niobium oxide gel as described in Example 13, a broad, low-intensity (100) diffraction peak was developed upon aging at 25° C. for 24 hours. As the aging temperature was raised to 96° C., the (100) peak shifted to a higher 2θ angle. When the aging temperature was increased to 180° C., additional higher order peaks were noted, corresponding to the (110), (200) and (300) diffractions of a hexagonally ordered phase. An increase in the intensity of the diffraction peaks was also observed, along with further peak shifts to higher 2θ angles. Prolonged aging at 180° C. produced even more intense diffraction peaks with minor peaks shifts. There was no significant change in the structure of the materials produced after 96 hours versus 48 hours of aging at 180° C.

Figure 16:
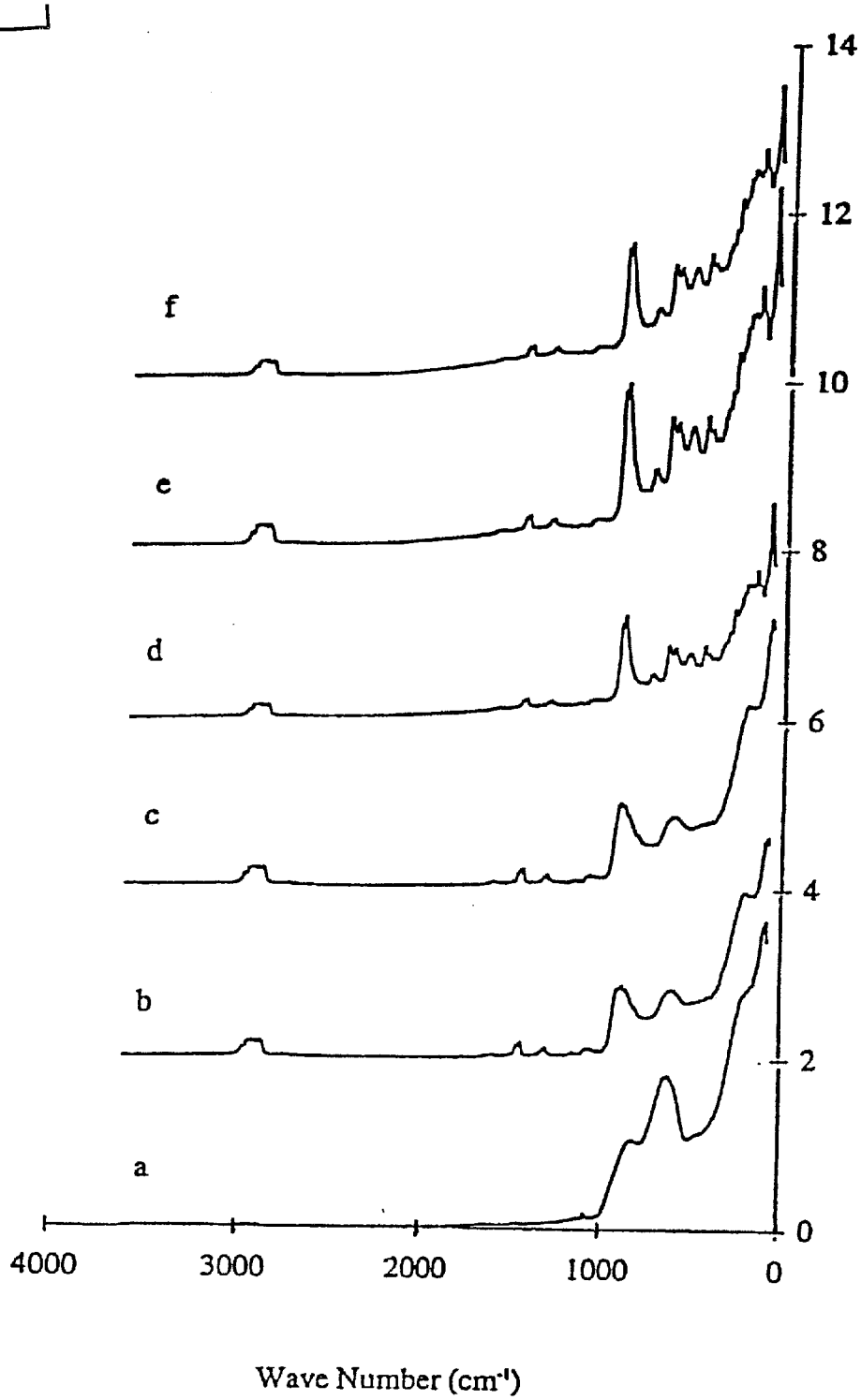
FIG. 16 shows Raman spectra of niobium oxide samples derived from hydrolysis of $Nb(OC_2H_5)_5$ without amine templating agent (a) and with subsequent hexylamine addition (b)–(f). The samples were analyzed after subjecting each to different aging conditions: (a) and (b) at 25° C. for 24 hours, (c) 96° C. for 24 hours, (d) 180° C. for 24 hours, (e) 180° C. for 48 hours and (f) 180° C. for 72 hours. The samples in (b)–(f) were prepared with a Nb:hexylamine molar ratio of 1:0.75 (see synthesis of Example 13).
Figure 17:
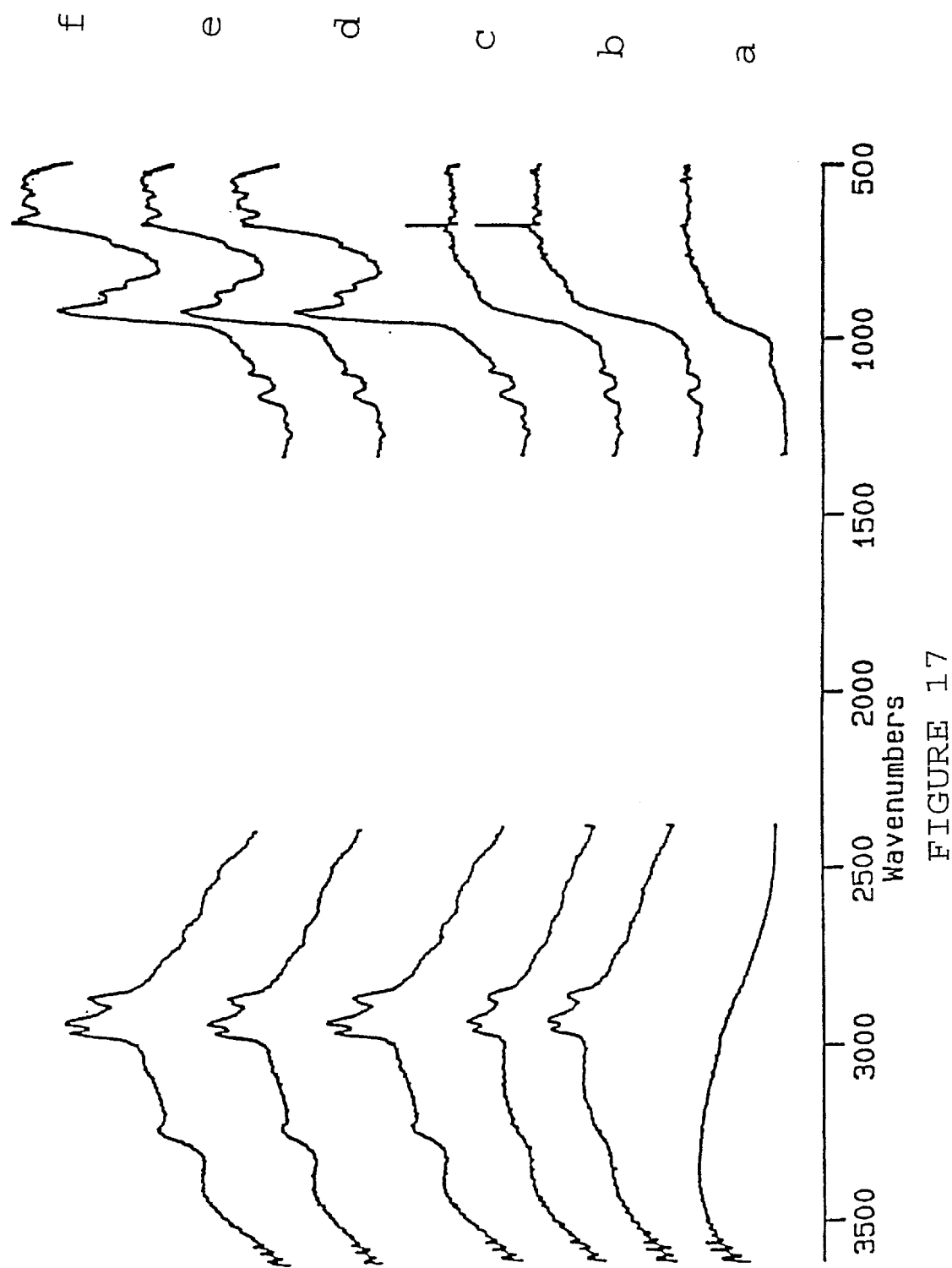
FIG. 17 shows PA-FTIR spectra of niobium oxide samples derived from hydrolysis of $Nb(OC_2H_5)_5$ without amine templating agent (a) and with subsequent hexylamine addition (b)–(f). The samples were analyzed after subjecting each to different aging conditions (a) and (b) at 25° C. for 24 hours, (c) 96° C. for 24 hours, (d) 180° C. for 24 hours, (e) 180° C. for 48 hours and (f) 180° C. for 72 hours. The samples in (b)–(f) were prepared with a Nb:hexylamine molar ratio of 1:0.75 (see synthesis of Example 13).

The effect of aging temperature on Nb-TMS5 formation was also followed by Raman and PA-FTIR spectroscopies. The weak C—H stretching bands at 2800–3000 $cm^{-1}$ and the vibration bands at 1300–1500 $cm^{-1}$ in both the Raman spectra (FIGS. 16($b$)–($f$)) and PA-FTIR spectra (FIGS. 17($b$)–($f$)) confirmed the presence of organic templating agents in the as-prepared samples. These peaks are absent in FIGS. 16($a$) and 17($a$) for the control sample synthesized without the hexylamine templating agents. In the templated synthesis of Nb-TMS5, aging temperatures of 25° C. and 96° C. led to broad Nb—O phonon bands (below 1000 $cm^{-1}$) in the Raman and PA-FTIR spectra. A well-developed inorganic phonon structure with distinct peaks was obtained only by aging the samples at a higher temperature of 180° C. This corresponds well with the development of higher order peaks in the XRD studies, confirming the high crystallinity of the Nb-TMS5 materials produced by the high-temperature hydrothermal treatment. The C—H Raman band at 800 $cm^{-1}$ also became better resolved, and appeared similar in feature as those corresponding to free hexylamine molecules. Infrared spectra also showed the emergence of an N—H band from hexylamine at 3200–3300 $cm^{-1}$ upon aging at 180° C., suggesting greater interaction between the amines and the niobium oxide framework.

Figure 18:
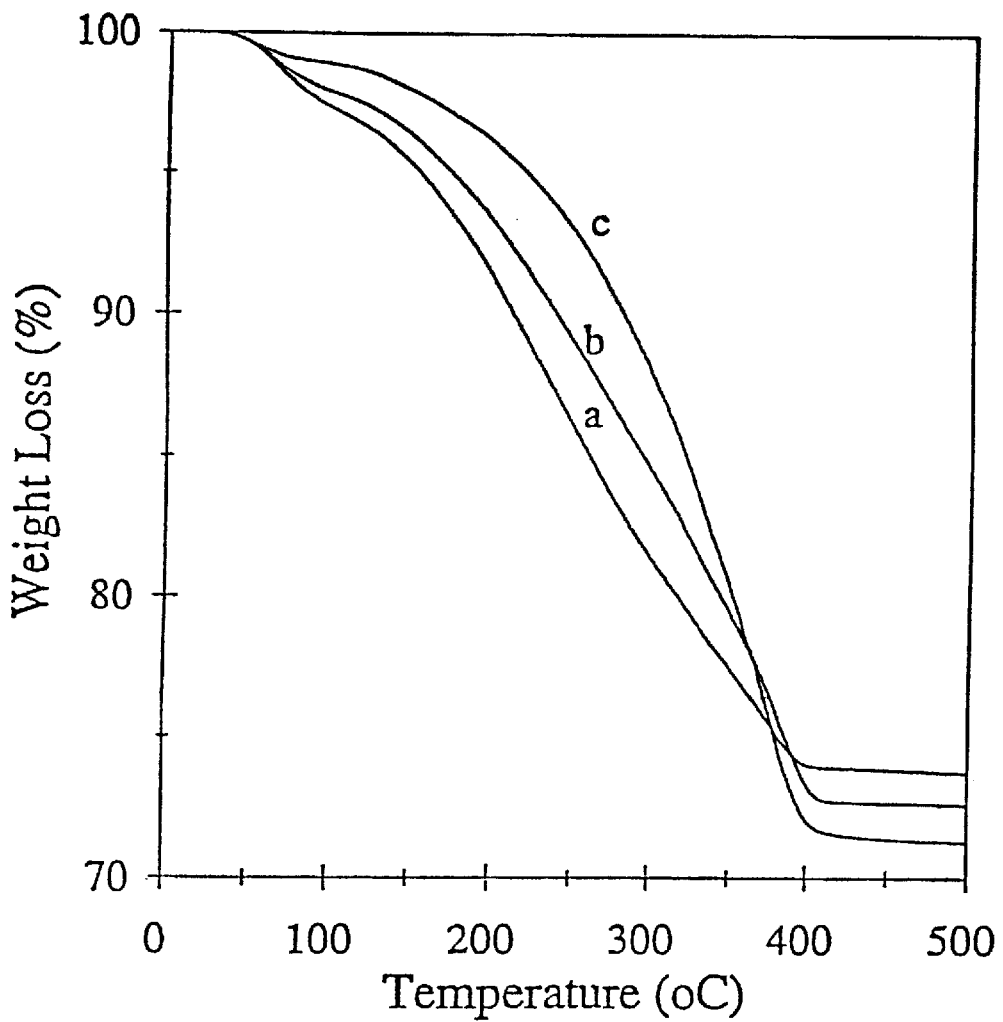
FIG. 18 shows TGAs of as-prepared Nb-TMS5 samples derived from hydrolysis of $Nb(OC_2H_5)_5$ with subsequent hexylamine addition. The samples were analyzed after subjecting each to different aging conditions: (a) 25° C. for 24 hours, (b) 96° C. for 24 hours and (c) 180° C. for 24 hours. The samples were prepared with a Nb:hexylamine molar ratio of 1:0.75 (see synthesis of Example 13).

Thermogravimetric analysis (TGA) was used to characterize the amount of templating agent captured in the Nb-TMS5 samples obtained from aging at different temperature (see FIG. 18). When the aging temperature was raised from 25° C. to 180° C., it was noted that more hexylamine was held in the nanocomposite. The molar ratio of niobium to hexylamine was calculated to have decreased from 4 to 2.4. The molar ratio of nobium to hexlamine organic templating agent in the as-prepared microporous materials was confirmed to be 2.25 by elemental analysis for the Nb-TMS5 sample aged at 180° C. This suggests that each amine molecule was primarily associated with a metal ethoxide dimer in the self-assembly of the hexagonally-packed nanocomposite structure.

Figure 19:
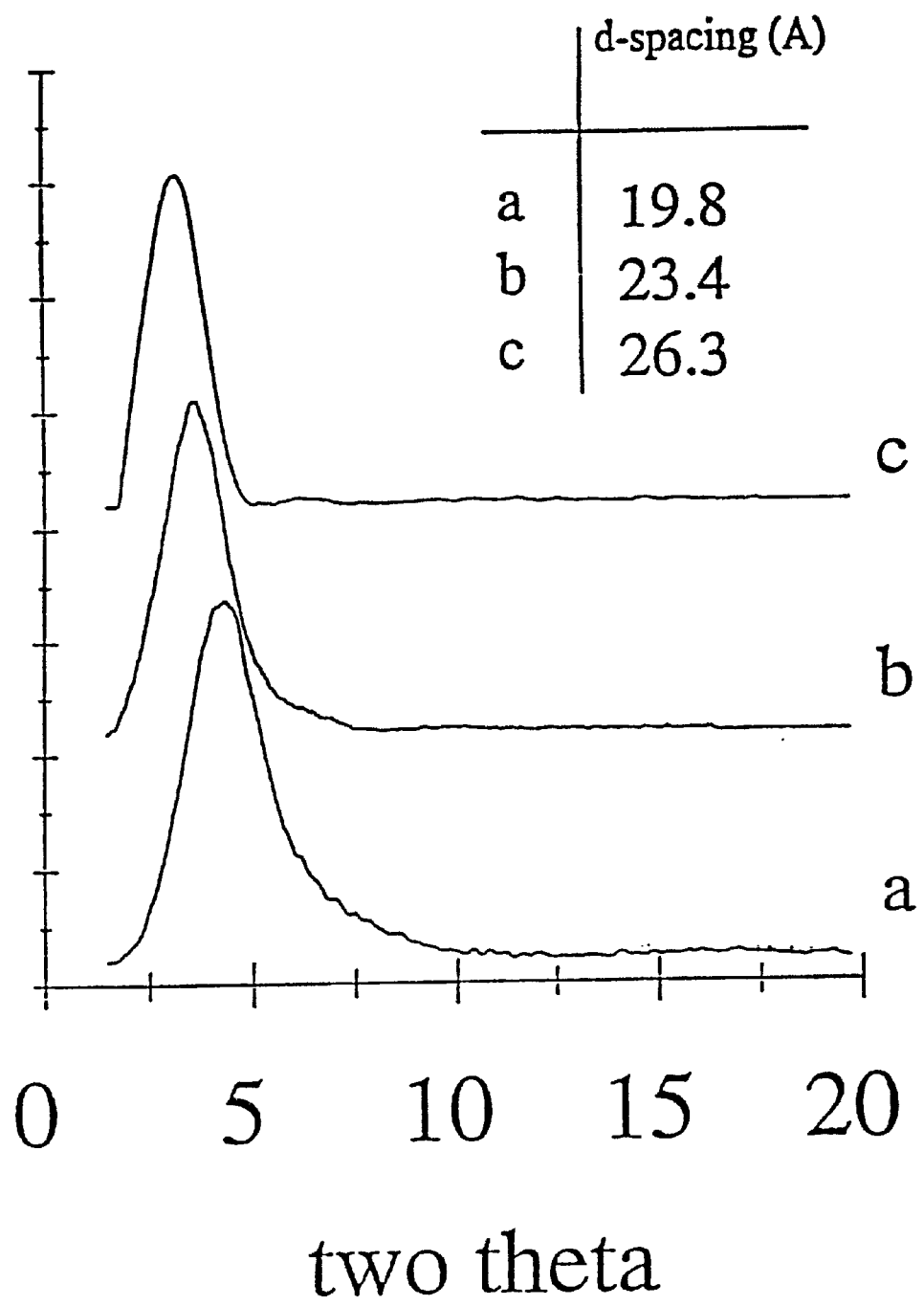
FIG. 19 shows XRD patterns of as-prepared Ta-TMS5 derived from hydrolysis of tantalum ethoxide in the presence of hexylamine (see synthesis of Example 12). The samples were analyzed after subjecting each to different aging conditions: (a) 25° C. for 48 hours, (b) 96° C. for 48 hours and (c) 180° C. for 4 days.

Aging temperatures of 25° C., 96° C. and 180° C. were examined for the processing of Ta-TMS5 with hexylamine by a similar approach described for Nb-TMS5 in Example 12. The different aging temperatures did not affect the crystalline phase of the tantalum oxide (FIG. 19). In all cases, only a strong (100) XRD peak was observed. However, increasing the aging temperature led to a significant increase in the d(100) spacing. A similar aging temperature effect was noted in the synthesis of silica-based mesoporous MCM-41 materials. This effect was attributed to the restructuring of the oxide framework associated with the dissolution of the inorganic species at high aging temperatures, and to an increase in the pore wall thickness (K. Khushalani et al. *Adv. Mater.* 7 (1995) 842).

Figure 20:
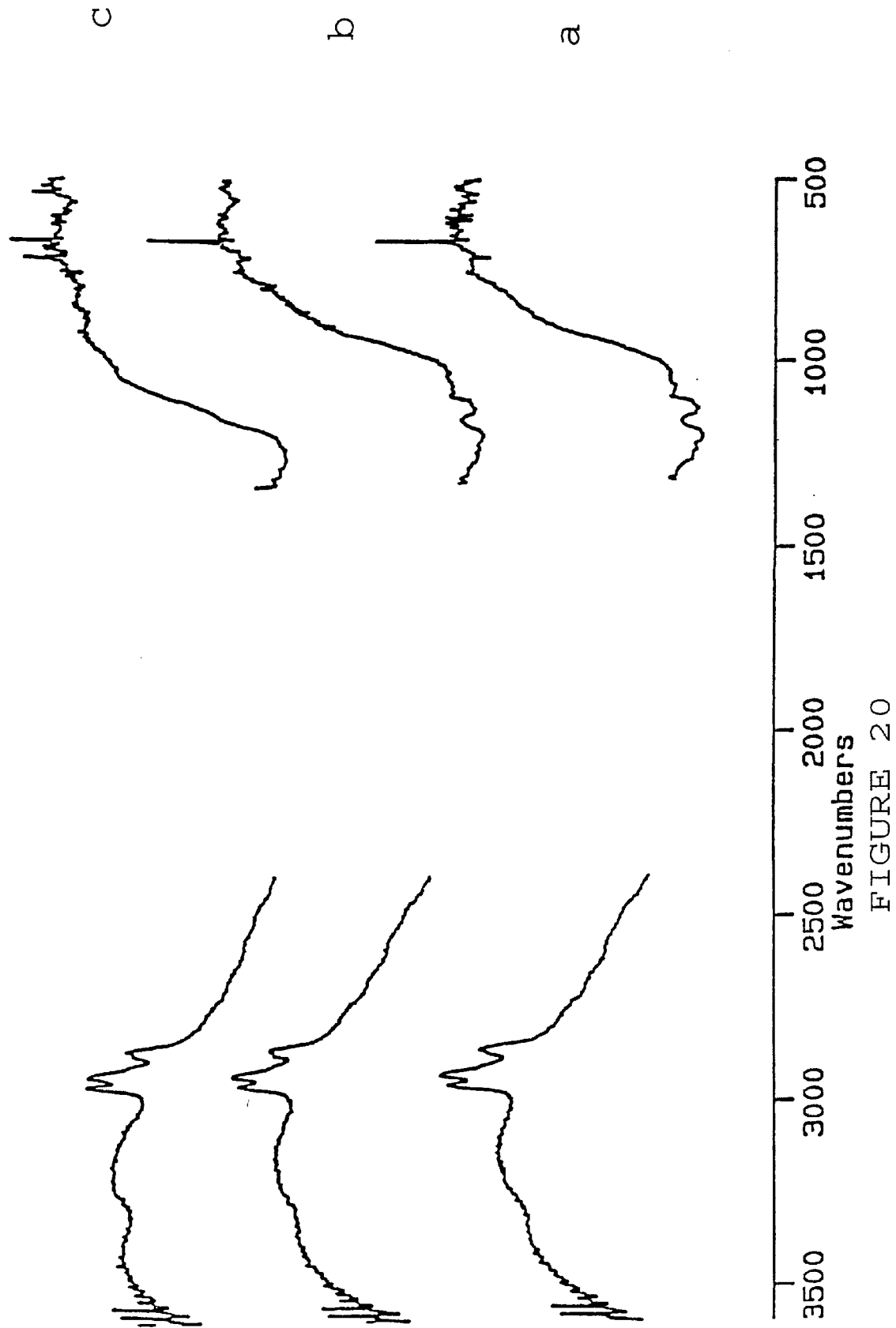
FIG. 20 shows PA-FTIR spectra of as-prepared Ta-TMS5 derived from hydrolysis of tantalum ethoxide in the presence of hexylamine (see synthesis of Example 12). The samples were analyzed after subjecting each to different aging conditions: (a) 25° C. for 48 hours, (b) 96° C. for 48 hours and (c) 180° C. for 4 days.

The effect of aging temperature on Ta-TMS5 synthesis was also followed by PA-FTIR spectroscopy. No emergence of distinct Ta-O peaks of N—H bands was noted in the PA-FTIR spectra when the aging temperature was raised from 25° C. to 180° C. (FIG. 20). Both the XRD and PA-FTIR studies showed that unlike Nb-TMS5, a high degree of crystallinity could not be achieved for Ta-TMS5 by aging at high temperatures.

The studies further showed that Si-TMS5 could only be obtained by aging at ambient conditions, while Ti-TMS5 could still be generated after aging at 96° C. At aging temperatures higher than 25° C. or 96° C., the well-defined pore structure of the respective Si-TMS5 and Ti-TMS5 collapsed, as indicated by the disappearance of distinct hexagonally XRD diffraction peaks. Since Si-TMS5 could retain its well-defined microporosity even after calcination at 500° C., the structural damage from the high aging temperature could not be attributed to Si-TMS5's lack of thermal stability. The damage may be due to the dissolution of inorganic species and the restructuring of the oxide framework without coordination with the supermolecular templating agents at high aging temperatures.

Figure 21:
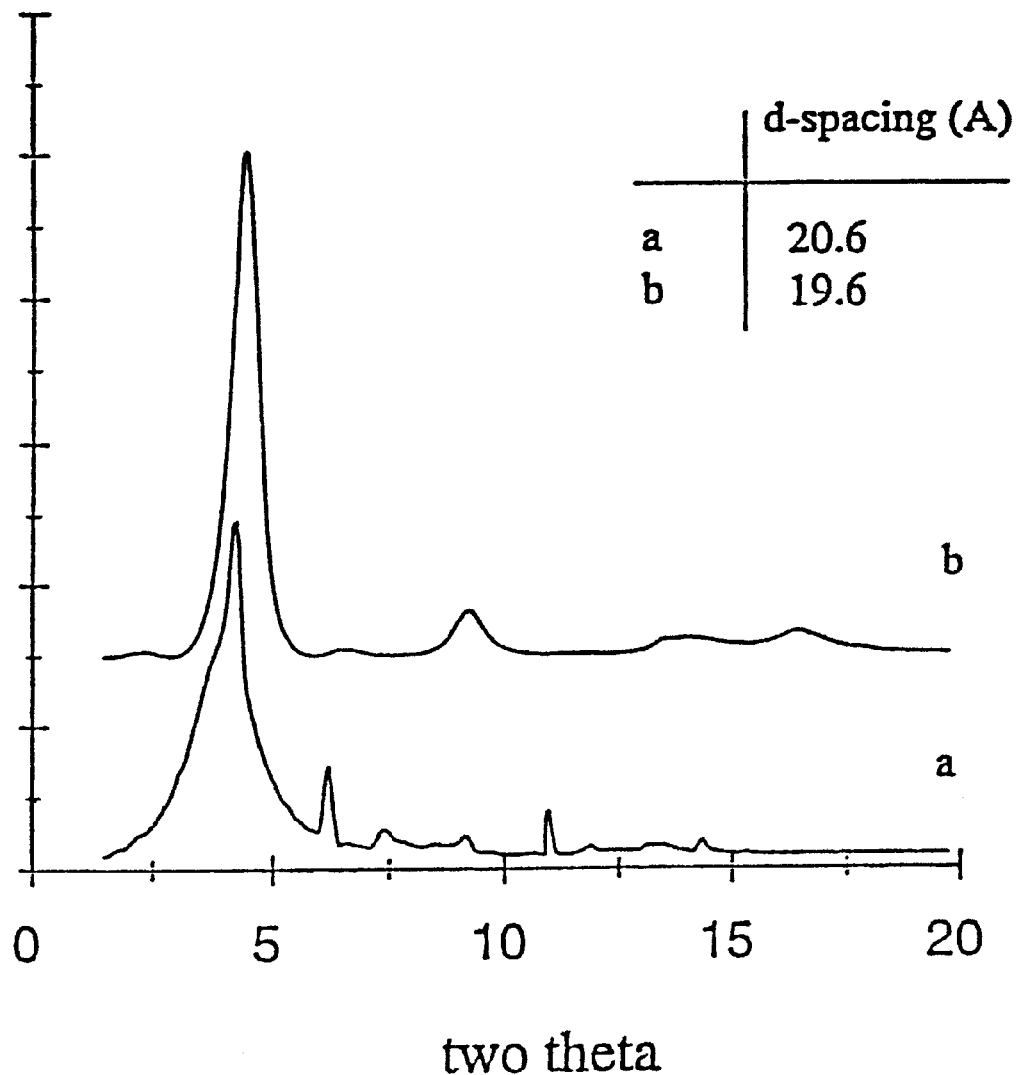
FIG. 21 shows XRD patterns of as-prepared niobium oxide nanocomposites from aging at (a) 96° C. for 4 days and (b) 180° C. for 4 days. Both samples were synthesized with a niobium ethoxide:adamantanamine ratio of 1:0.75 (see synthesis of Example 16).

When adamantanamine was used as a templating agent, two different crystalline phases were produced from hydrolysis and aging of niobium ethoxide at 96 and 180° C. (FIG. 21). A cubic (TMS8) phase was developed by aging the nanocomposite at 96° C. The hexagonally-packed NB-TMS5 material was produced at 180° C.

The Effect of the Metal Oxide Precursor

A variety of metal alkoxide precursors have been explored in the synthesis of microporous oxides. When different alkoxy groups were employed in the precursor, peak shifts were noted in the diffraction patterns of the resulting materials. The difference in using silicon ethoxide, isopropoxide and butoxide precursors in the synthesis of Si-TMS5 is illustrated in FIG. 22. The samples were prepared by introducing hexylamine before hydrolysis of the different niobium alkoxide, followed by aging at room temperature for 48 hours. It was noted that an alkoxy group with a longer chain length gave rise to large d-spacing. This may be an indication that the alcohol molecules produced from hydrolysis of the metal alkoxides participated in the process of self-assembly. Another explanation might be that the silicon alkoxides were not completely hydrolyzed when water was introduced into the reaction media. The remaining alkoxy groups of the partially hydrolyzed precursor would then lead to slight changes in the self-assembled structures as they would play a role in the interaction and/or coordination with the amine templating agents. The ability to fine tune the pore size of a variety of oxide systems by not only varying the size of the templating agent but also varying the metal alkoxide precursor represents a significant advance from the current possibilities in pore size control in zeolite synthesis.

The Effect of Organic Templating Agents

Organic templating agents have three major effects on the formation of porous structure form inorganic precursors: (i) the hydrocarbon chain length of the templating agents can be varied to tune the pore size of the oxide materials, (ii) the concentration of the templating agent in the synthesis solution can be adjusted to derive a variety of liquid crystalline phases, and (iii) the hydrophilic head group of the organic molecule can be changed to match the chemical affinity of the inorganic precursors. For hexagonally-packed mesoporous MCM-41 and TMS1 materials, it has been found that the pore size can be increased by using surfactants with longer hydrocarbon chain lengths. This flexibility does not typically exist in zeolite synthesis. For example, the pore diameter of ZSM-5 cannot be expanded by using a slightly larger templating agent. The pore size dependence of mesoporous oxides on the surfactant chain length can be understood as a simple steric effect: the metal oxide network has to provide enough space to accommodate the micellar structure assembled from the organic templating agents.

Figure 23:
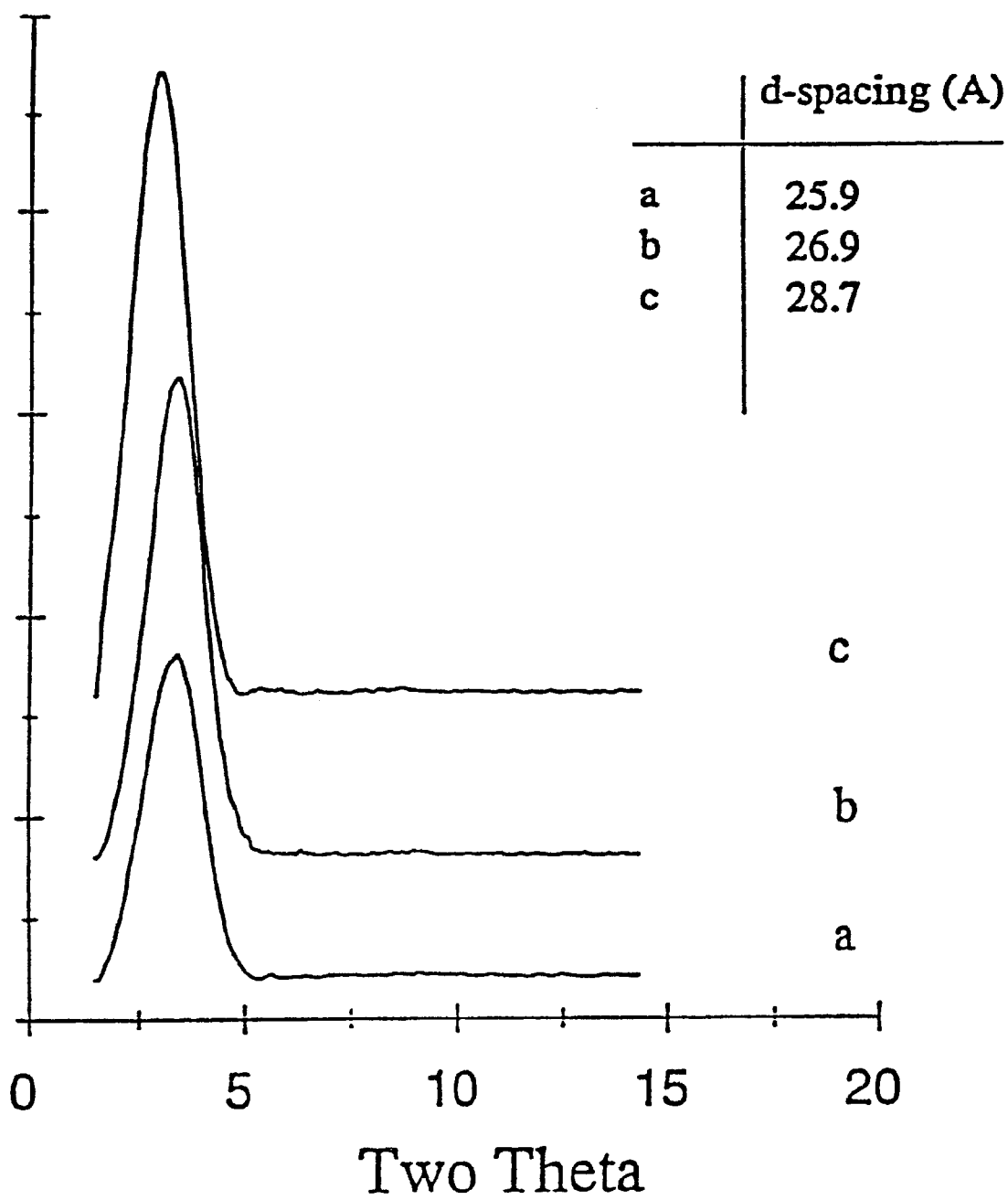
FIG. 23 shows XRD patterns of as-prepared Ta-TMS5 synthesized with amylamine, (b) hexylamine and (c) heptylamine as templating agents. The samples were prepared with a tantalum ethoxide:amine ratio of 1:0.75 and aged at 180° C. for 4 days (see synthesis of Example 12).

The steric effect of templating agents was also observed in the synthesis of microporous metal oxides, although the organic molecules were too small to be considered as surfactants. When the hydrocarbon chain length of the amine templating agents increased from a carbon atom chain length of 5 carbon atoms to 7 carbons atoms, the d-spacing of the microporous tantalum oxides increased from 25.9 Å to 28.7 Å while the hexagonally-packed crystal structure remained unchanged (Example 14 and FIG. 23). The crystallinity of Ta-TMS5 was also improved when larger amines were used. This may be due to an increased hydrophobicity in the amine templating agent with longer hydrocarbon chain lengths that would have assisted in the self-assembly of supermolecular templates.

Figure 24:
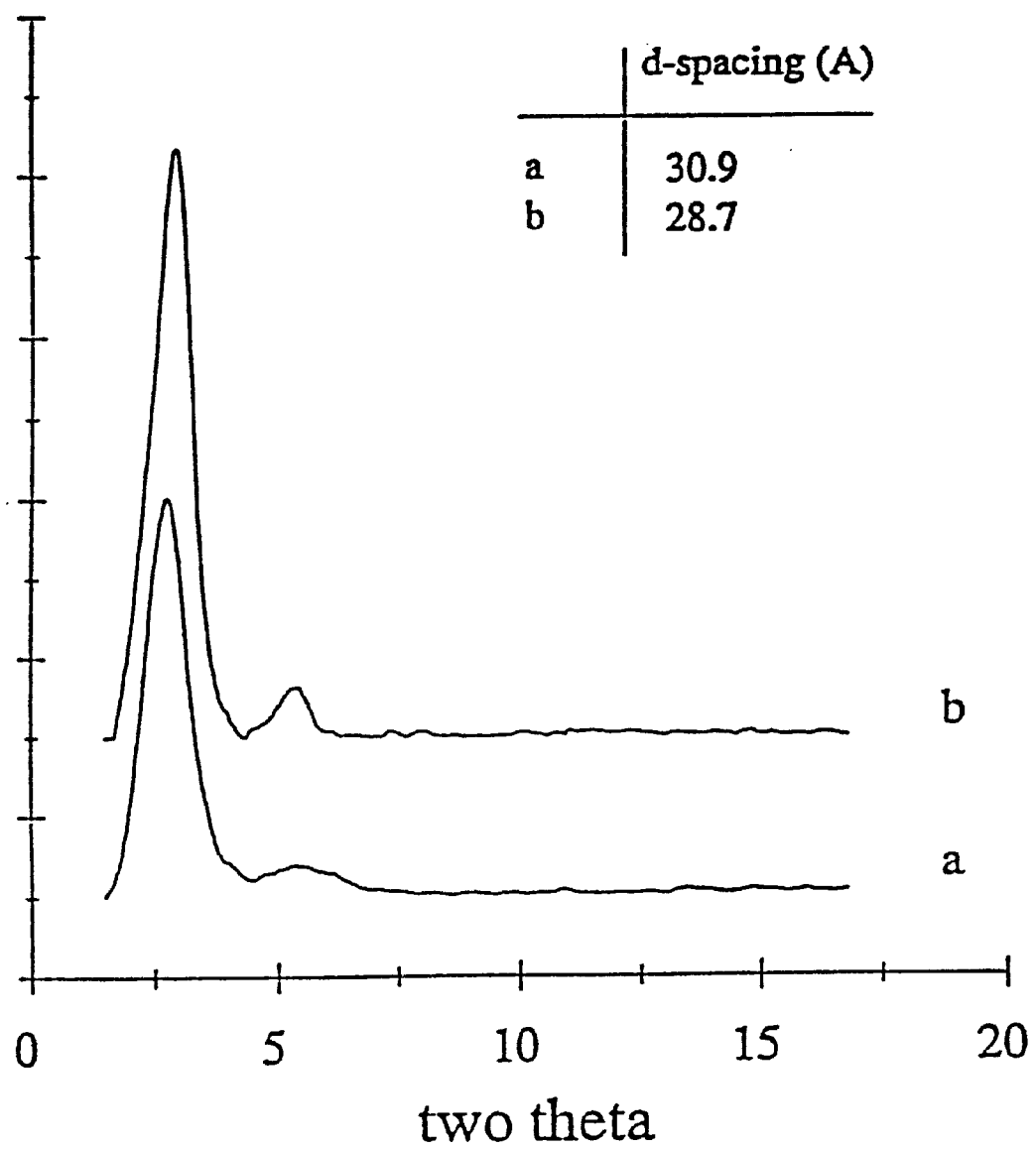
FIG. 24 shows XRD patterns of as-prepared niobium oxide nanocomposites which were synthesized with a niobium ethoxide:dodecylamine ratio of 1:0.75 and aged at 180° C. for 4 days. Using the long-chain amine surfactant, mesoporous materials with a hexagonally-packed mesoporous structure of TMS1 were obtained. They were generated by introducing dodecylamine to the inorganic precursor (a) before and (b) after the hydrolysis of the niobium ethoxide (by the methods of Examples 12 and 13, respectively).

It was found that alkyl amines having carbon atom chain lengths of between about three and twenty carbon atoms can be used in the synthesis route described in Examples 12 and 13 to obtain TMS5 materials in the range of 3 Å and 50 Å. Amines with chain lengths longer than eight carbon atoms may be considered as surfactants, and they give rise to mesoporous materials similar to TMS1 (see FIG. 24).

Figure 25:
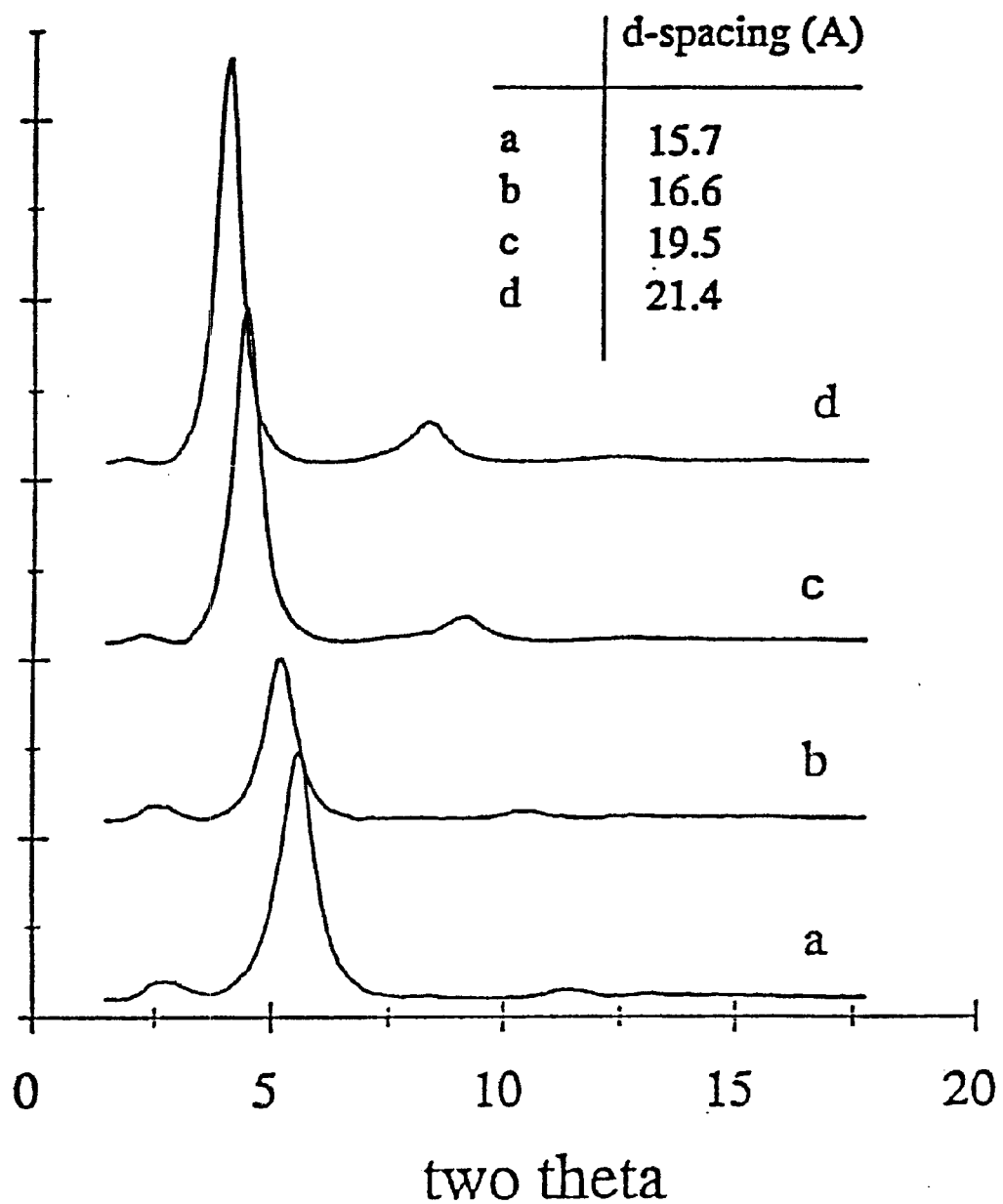

Large surfactant molecules can also be used to construct microporous oxides. For instance, diamines can be used in the supermolecular templating approach described in Examples 12 and 13. The success of such a synthesis was made possible because the hydrophilic affinity of the large surfactant molecules could be tailored by introducing more than one head group to the hydrocarbon chain. When a second hydrophilic group was introduced at the tail of the surfactant molecule, the middle of the hydrocarbon chain became the new tail of the molecule. This folding of the molecule occurred so that both amine heads could interact with the inorganic oxide precursor. Consequently, a diamine gave rise to a smaller pore size than a mono-amine of the same hydrocarbon chain length. For example, when an alcoholic solution containing niobium or tantalum ethoxide and 1,12-diaminododecane was hydrolyzed, a microporous TMS6 structure was generated instead of a mesoporous structure (Example 15 and FIG. 25). Alkyl diamines having a carbon atom chain length of between about three and twenty carbon atoms can be used in the synthesis of porous oxides to enable flexible tailoring of the pore size in the range of 3 Å and 30 Å. As the carbon atom chain length of the surfactant molecules is decreased, materials with a smaller d-spacing and a lower crystallinity were derived for both Nb-TMS6 and Ta-TMS6. The lower crystallinity associated with diamines of shorter carbon atom chain lengths may be due to the reduced hydrophobicity of the hydrocarbon tails.

Figure 26:
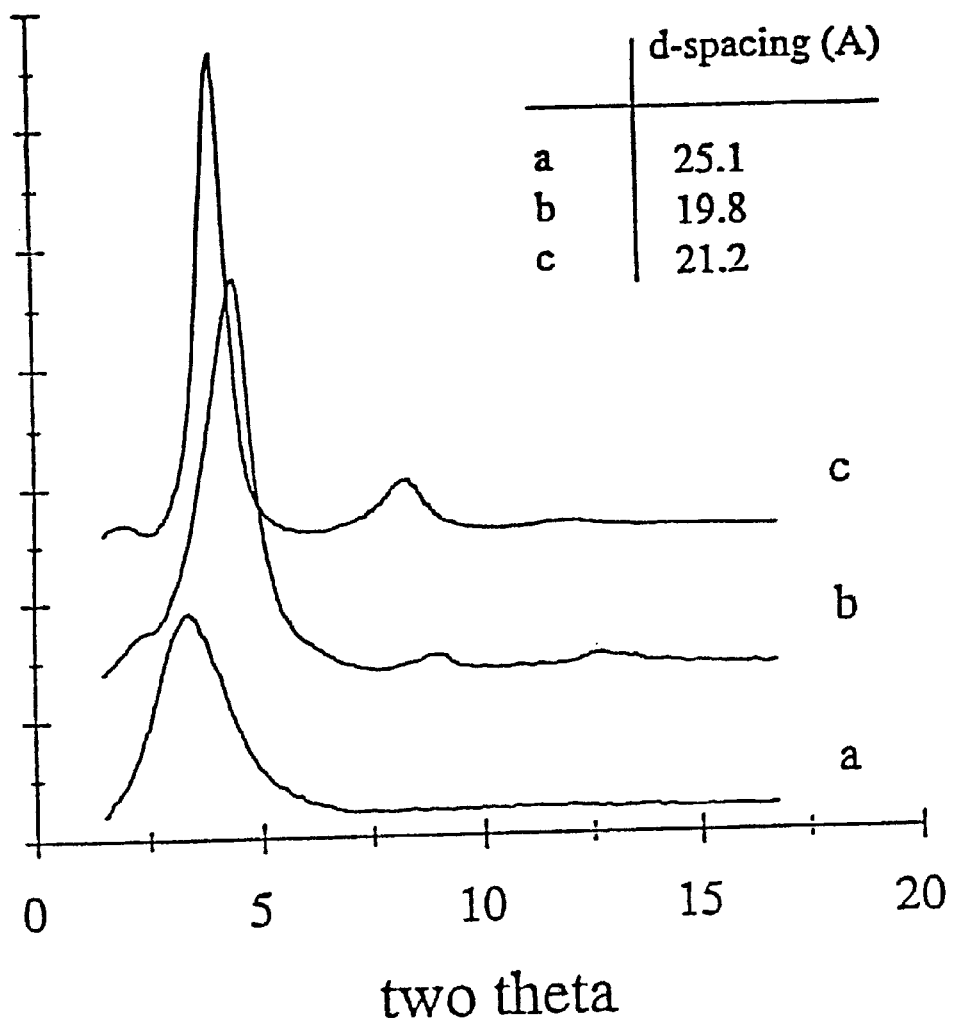

Substituted amines were also investigated to examine the effect of charge density of the template head groups on the formation of the porous inorganic framework. Unlike the mesoporous materials, synthesis in which both mono- or di-methyl substituted amine surfactants led to amorphous niobium oxides, methyl-substituted short-chain amines did lead to formation of hexagonally-packed microporous metal oxides. FIG. 26 (Example 21) shows that when methylsubstituted hexylamines were employed as templating agents, the microporous Nb-TMS5 phase was still produced in the hydrolysis of niobium ethoxides. However, the crystallinity of the microporous niobium oxides decreased with methyl substitution in the amine head group. This may be attributed to a weakening of the interaction between the niobium and the nitrogen of the amine molecule due to the steric hindrance of the methyl group. It may also be caused by a variation in the basicity and charge density of the different amine head groups. The varying steric effect and charge density imposed by the differently substituted amines may have also given rise to the peak shifts obtained in the XRD patterns of Nb-TMS5.

The crystal structure of the microporous materials was found to be dependent on the interaction between the inorganic precursor and the head groups of the organic templating agents. Combining straight chain phosphonic acid templating agents with metal ethoxides and aging in an aqueous medium led to the formation of amorphous materials for niobium oxide, but promoted a hexagonal TMS5 phase formation for vanadium oxide. When a linear amine was used as a templating agent, the hexagonal TMS5 could be readily obtained for niobium oxide, but only a lamellar phase was derived for vanadium oxide regardless of the metal: amine ratio or the amine chain length used.

Effect of the Solution pH

Figure 11:
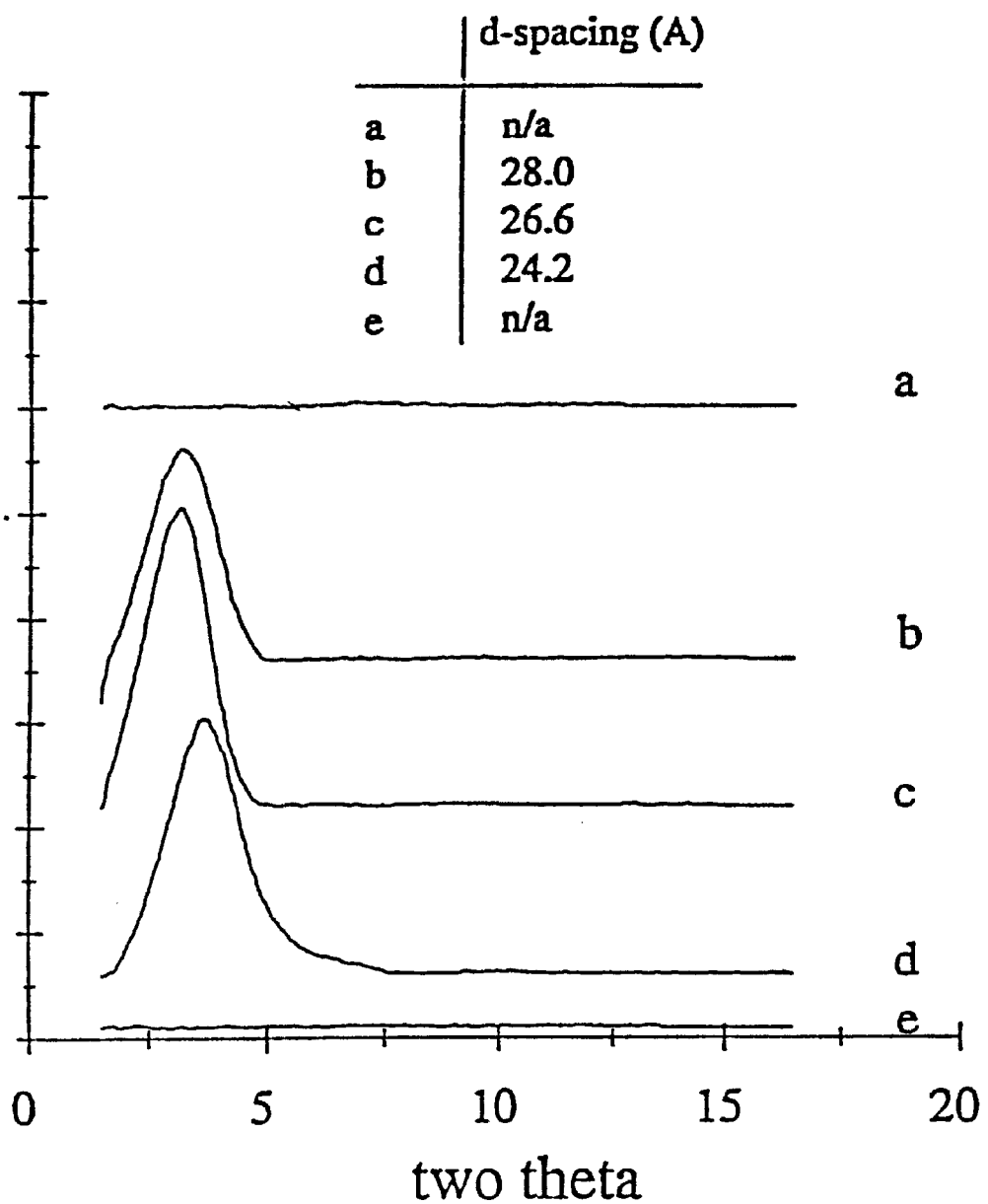
FIG. 11 shows XRD patterns of as-prepared Ta-TMS5 synthesized at a sol pH of (a) 3, (b) 5, (c) 7, (d) 11 and (e) 13. The samples were prepared with a tantalum ethoxide:hexylamine ratio of 1:0.75 and aged at 180° C. for 4 days (see synthesis of Example 12).

Control of pH in the reaction medium is critical for several reasons: pH can alter the surface charge and solubility of the inorganic species, the chemical nature and charge density of the templating agents, and the alkoxide hydrolysis and condensation rates. The effect of pH on the synthesis of microporous metal oxides was investigated. To successfully derive Ta-TMS5, the pH of the reaction medium had to be within a range of 5–11, or an amorphous tantalum oxide would be generated instead (Example 22 and FIG. 11). The lack of crystallinity in a tantalum oxide synthesized from a sol pH of less than 5 could be attributed to the protonation of amines, producing positively charged R—$NH_3^+$ species that may not have interacted as strongly with the Ta precursor.

Equivalents

Those skilled in the art will recognize, or be able to ascertain using no more than routine experimentation, many equivalents to the specific embodiments of the invention described specifically herein. Such equivalents are intended to be encompassed in the scope of the following claims.

What is claimed is:

1. A method of producing a stable hexagonally-packed metal oxide mesostructure comprising the steps of:
    a) reacting in the substantial absence of water a transition metal oxide precursor, or lanthanide metal oxide precursor and a surfactant having a head group, under conditions suitable for the head group of the surfactant and the metal oxide precursor to form a metal-surfactant complex;
    b) subjecting the complex of step (a) to conditions suitable for micelle formation and hydrolysis of the complex; and
    c) aging the product of step b) for a period of time and at a temperature suitable for causing the formation of a hexagonally-packed metal oxide mesostructure.

2. The method of claim 1 wherein the transition metal oxide precursor or the lanthanide metal oxide precursor is a transition metal alkoxide or a lanthanide metal alkoxide.

3. The method of claim 1 wherein a sufficient quantity of a metal salt is added to the product of step b) to accelerate the formation of the hexagonally-packed metal oxide mesostructure.

4. The method of claim 3 wherein about 0.1–20.0 equivalents of an alkali metal halide are added to the product of step b) in step c).

5. The method of claim 2 wherein the product of step (b) is aged in step (c) for about 1 minute to about 14 days and the temperature is maintained at a temperature from about 15° C. to about 200° C.

6. The method of claim 2 wherein the transition metal alkoxide is titanium isopropoxide, zirconium n-propoxide or cerium isopropoxide and the surfactant has a phosphate head group.

7. The method of claim 2 wherein the transition metal alkoxide is niobium ethoxide or tantalum ethoxide and the surfactant has a neutral amine head group.

8. The method of claim 2 wherein the metal alkoxide is yttrium isopropoxide and the surfactant has a sulfate head group.

9. The method of claim 1 further comprising:
    a) removing the surfactant from the product of step c) to produce a mesoporous hexagonally-packed metal oxide mesostructure.

10. The method of claim 9 wherein the surfactant is removed by washing.

11. The method of claim 9 wherein the surfactant is removed by calcination.

12. The method of claim 11 wherein the surfactant is removed by calcination at a temperature below about 600° C. in an oxidizing atmosphere.

13. The method of claim 1 wherein a swelling agent is added to step (a).

14. The method of claim 13 wherein the swelling agent is selected from the group consisting of mesitylene, xylene, toluene and ethanol.

15. A method of producing a stable hexagonally-packed metal oxide mesostructure comprising the steps of:
    a) reacting a transition metal oxide precursor, or lanthanide metal oxide precursor and a chelating agent;
    b) combining the product of step (a) with a surfactant and a quantity of $B_2$ water under conditions suitable for the head group of the surfactant and the metal oxide precursor to form a metal-surfactant complex;
    c) subjecting the complex of step (b) to conditions suitable for micelle formation and hydrolysis of the complex; and
    d) aging the product of step (c) for a period of time and at a temperature suitable for causing the formation of a hexagonally-packed metal oxide mesostructure.

16. The method of claim 15 wherein the chelating agent is a 2,4-diketone.

17. The method of claim 16 wherein the chelating agent is acetylacetone.

18. The method of claim 17 wherein the transition metal oxide precursor or the lanthanide metal oxide precursor is a transition metal alkoxide or a lanthanide metal alkoxide, thereby forming a transition metal alkoxide acetylacetonate or a lanthanide metal alkoxide acetylacetonate in step (a).

19. The method of claim 15 wherein a sufficient quantity of a metal salt is added to the product of step b) to accelerate the formation of the hexagonally packed metal oxide mesostructure.

20. The method of claim 19 wherein about 0.1–20.0 equivalents of an alkali metal halide is added to the product of step b) in step c).

21. The method of claim 15 further comprising:
 a) removing the surfactant from the product of step d) to yield a hexagonally-packed mesoporous metal oxide.

22. The method of claim 21 wherein the surfactant is removed by washing.

23. The method of claim 21 wherein the product of step d) is aged for about 1 minute to about 14 days and the temperature is maintained at a temperature from about 15° C. to about 200° C.

24. The method of claim 18 wherein the transition metal alkoxide is titanium tris-isopropoxide acetylacetonate, zirconium n-propoxide acetylacetonate or cerium isopropoxide acetylacetonate and the surfactant has a phosphate head group.

25. The method of claim 18 wherein the metal alkoxide is yttrium isopropoxide acetylacetonate and the surfactant has a sulfate head group.

26. The method of claim 21 wherein the surfactant is removed by calcination.

27. The method of claim 26 wherein the surfactant is removed by calcination at a temperature below about 600° C. in an oxidizing atmosphere.

28. The method of claim 15 wherein a swelling agent is added to step (a).

29. The method of claim 28 wherein the swelling agent is selected from the group consisting of mesitylene, xylene, toluene and ethanol.

30. The method of claim 1 wherein the transition metal oxide precursor or the lanthanide metal oxide precursor, upon hydrolysis, forms a corresponding metal oxide wherein the metal oxide is present at a concentration of at least 50 mol % of the composition.

31. The method of claim 15 wherein the transition metal oxide precursor or the lanthanide metal oxide precursor, upon hydrolysis, forms a corresponding metal oxide wherein the metal oxide is present at a concentration of at least 50 mol % of the composition.

32. A method of producing a crystalline porous metal oxide having a dimensionally consistent pore structure, comprising the steps of:
 a) combining in the substantial absence of water a metal oxide precursor and a small organic moiety having at least one head group, under conditions suitable for the formation of a complex between the head group of the small organic moiety and the metal oxide precursor;
 b) subjecting the complex of step (a) to hydrolysis of the metal oxide precursor; and
 c) aging the product of step b) for a period of time and at a temperature suitable for causing the formation of the crystalline porous metal oxide having a dimensionally consistent pore structure.

33. The method of claim 32 wherein said small organic moiety has a carbon atom chain length of between about two and ten carbon atoms.

34. The method of claim 33 wherein said carbon atom chain length includes linear and branched propyl groups, linear and branched butyl groups, linear and branched pentyl groups, linear and branched hexyl groups and linear and branched heptyl groups.

35. The method of claim 32 wherein said small organic moiety has at least one head group selected from the group consisting of acetylacetonate, amide, carboxylate, oxime, phosphate, sulfate and neutral amines.

36. The method of claim 32 wherein said small organic moiety has at least one neutral amine head group.

37. The method of claim 32 wherein said small organic moiety has a phosphate head group.

38. The method of claim 32 wherein said small organic moiety is 2-aminoadamantane.

39. The method of claim 32 wherein said metal oxide precursors are selected from transition metal oxide precursors and lanthanide metal oxide precursors.

40. The method of claim 39 wherein the transition metal oxide precursor or the lanthanide metal oxide precursor is a transition metal alkoxide or a lanthanide metal alkoxide.

41. The method of claim 40 wherein the alkoxide portion of the metal alkoxide is selected from the group consisting of ethoxide, isopropoxide, butoxide and pentoxide.

42. The method of claim 32 wherein a sufficient quantity of a metal salt is added to the product of step b) to accelerate the formation of the crystalline porous metal oxide having a dimensionally consistent pore structure.

43. The method of claim 42 wherein about 0.1–20.0 equivalents of an alkali metal halide are added to the product of step b) in step c).

44. The method of claim 32 wherein the product of step (b) is aged in step (c) for about 10 minutes to about 30 days and the temperature is maintained at a temperature from about 15° C. to about 200° C.

45. The method of claim 32 further comprising:
 a) removing the small organic moiety from the product of step c) to produce a crystalline porous metal oxide having a dimensionally consistent pore structure.

46. The method of claim 45 wherein the small organic moiety is removed by washing.

47. The method of claim 45 wherein the small organic moiety is removed by calcination.

48. The method of claim 45 wherein the small organic moiety is removed by calcination at a temperature below about 900° C. in an oxidizing atmosphere.

49. The method of claim 32 wherein a swelling agent is added to step (a).

50. The method of claim 49 wherein the swelling agent is selected from the group consisting of mesitylene, xylene, toluene, cyclohexane and ethanol.

51. The method of claim 32 wherein the metal oxide precursor is selected from the group consisting of a metal alkoxide, a metal ester, a metal phosphate, a metal ketone, a metal amide and a metal amine ketone.

52. A method of producing a crystalline mesoporous transition metal oxide or crystalline mesoporous lanthanide metal oxide having a dimensionally consistent pore structure, comprising the steps of:
 a) combining a transition metal oxide precursor or a lantnanide metal oxide precursor with water for a sufficient period of time to form a gel;
 b) combining the product of step (a) with a surfactant having at least one head group, under conditions suitable for physical interaction between a head group of the surfactant and the gel; and
 c) aging the product of step b) for a period of time and at a temperature suitable for causing the formation of the crystalline mesoporous transition metal oxide or crystalline mesoporous lanthanide metal oxide having a dimensionally consistent pore structure.

53. A method of producing a crystalline porous transition metal oxide or crystalline porous lanthanide metal oxide having a dimensionally consistent pore structure, comprising the steps of:
 a) combining a metal oxide precursor or a lanthanide metal oxide precursor with water for a sufficient period of time to form a gel;
 b) combining the product of step (a) with a small organic moiety having at least one head group, under conditions suitable for physical interaction between the head group of the small organic moiety and the gel; and c) aging the product of step b) for a period of time and at a temperature suitable for causing the formation of the crystalline porous transition metal oxide or crystalline porous lanthanide metal oxide having a dimensionally consistent pore structure.

54. A method of producing a crystalline porous metal oxide having a dimensionally consistent pore structure, comprising the steps of:

a) combining a metal oxide precursor with a non-polar organic solvent;

b) combining a compound, having at least one head group, with an aqueous alcohol solution;

c) combining the mixture of step a) with the mixture of step b) with stirring to create an oil-in-water emulsion; and d) aging the product of step c) for a period of time and at a temperature suitable for causing the formation of the crystalline porous metal oxide having a dimensionally consistent pore structure.

55. The method of claim 54 wherein said compound is a surfactant.

56. The method of claim 54 wherein said compound is a small organic moiety.

* * * * *

UNITED STATES PATENT AND TRADEMARK OFFICE
CERTIFICATE OF CORRECTION

PATENT NO. : 5,958,367
DATED : Sep. 28, 1999
INVENTOR(S) : Jackie Y. Ying, David M. Antonelli and Tao Sun It is certified that error appears in the above-identified patent and that said Letters Patent is hereby corrected as shown below:

At Claim 5, line 10, delete "." following "15° C".
At Claim 12, line 32, delete "." following "C".
At Claim 15, line 43, delete "$B_2$" and, after "water", insert --such that the concentration of the surfactant is above the critical micelle concentration--.
At Claim 23, line 9, delete "." following "C".
At Claim 27, line 21, delete "." following "C".
At Claim 44, line 21, delete "." following "15° C".
At Claim 48, line 32, delete "." following "C".
At Claim 52, line 47, delete "lantnanide" and substitute --lanthanide-- therefor.
At Claim 53, line 63, after "combining a", insert --transition--.

Signed and Sealed this

Ninth Day of January, 2001

Attest:

Q. TODD DICKINSON

*Attesting Officer*     *Commissioner of Patents and Trademarks*